(12) United States Patent
Miller et al.

(10) Patent No.: US 8,526,200 B2
(45) Date of Patent: Sep. 3, 2013

(54) CONNECTION LUG

(75) Inventors: Douglas Wayne Miller, Post Falls, ID (US); Konstantinos Samaras, Athens (GR); Kelly Rae Richards, Post Falls, ID (US); Anastasios Fragkos, Athens (GR); Daniel Joseph Sullivan, Post Falls, ID (US); Megaklis Marathias, Athens (GR)

(73) Assignee: Raycap, S.A., Athens (GR)

( * ) Notice: Subject to any disclaimer, the term of this patent is extended or adjusted under 35 U.S.C. 154(b) by 9 days.

(21) Appl. No.: 13/339,241

(22) Filed: Dec. 28, 2011

(65) Prior Publication Data

US 2012/0092835 A1    Apr. 19, 2012

Related U.S. Application Data

(60) Division of application No. 13/301,720, filed on Nov. 21, 2011, and a continuation-in-part of application No. 12/984,304, filed on Jan. 4, 2011.

(60) Provisional application No. 61/440,609, filed on Feb. 8, 2011, provisional application No. 61/363,967, filed on Jul. 13, 2010.

(51) Int. Cl.
*H01R 9/00* (2006.01)

(52) U.S. Cl.
USPC ...... 361/824; 361/118; 361/679.58; 361/724; 439/384; 439/409; 439/578; 439/582; 439/617

(58) Field of Classification Search
USPC ........... 361/824, 118, 679.58, 724; 439/394, 439/409, 578, 582, 617
See application file for complete search history.

(56) References Cited

U.S. PATENT DOCUMENTS

| | | | |
|---|---|---|---|
| 3,976,351 A * | 8/1976 | Hopfe | 439/409 |
| 4,030,061 A | 6/1977 | Gaskell et al. | |
| 4,918,565 A | 4/1990 | King | |
| 5,030,128 A * | 7/1991 | Herron et al. | 439/372 |
| 5,311,397 A * | 5/1994 | Harshberger et al. | 361/679.58 |
| 5,530,215 A * | 6/1996 | Couvreur | 200/83 R |
| 5,651,698 A * | 7/1997 | Locati et al. | 439/578 |
| 6,535,369 B1 | 3/2003 | Redding et al. | |

(Continued)

FOREIGN PATENT DOCUMENTS

| EP | 1855365 | 11/2007 |
|---|---|---|
| JP | 2005317472 | 12/2002 |

OTHER PUBLICATIONS

"Relay" from Wikipedia. Downloaded Oct. 30, 2009.

(Continued)

*Primary Examiner* — Xiaoliang Chen
(74) *Attorney, Agent, or Firm* — Stolowitz Ford Cowger LLP

(57) ABSTRACT

A connection lug comprises an electrically conductive body, an electrically conductive blade connector extending from a first end of the body, and a cable hole located in a second end of the body configured to receive a cable. A clamping cam in the connection lug may rotate inside of the body and clamp against the cable. A screw hole may be configured to receive a clamping screw. A portion of the clamping cam may extend into the screw hole and insertion of the clamping screw into the screw hole may push against the portion of the clamping cam and rotate the clamping cam into the cable hole.

15 Claims, 50 Drawing Sheets

(56) References Cited

U.S. PATENT DOCUMENTS

| | | | |
|---|---|---|---|
| 6,623,315 B1* | 9/2003 | Roderick | 439/772 |
| 6,719,615 B1 | 4/2004 | Molnar | |
| 6,851,966 B1* | 2/2005 | Tomasino | 439/411 |
| 7,008,256 B2* | 3/2006 | Poiraud | 439/394 |
| 7,397,673 B1 | 7/2008 | Wilson | |
| 8,021,189 B2* | 9/2011 | Zayas et al. | 439/617 |
| 2002/0055306 A1* | 5/2002 | Jenks | 439/855 |
| 2002/0196593 A1 | 12/2002 | Kizis | |
| 2003/0027521 A1 | 2/2003 | Yip | |
| 2005/0042920 A1* | 2/2005 | Poiraud | 439/582 |
| 2006/0139836 A1* | 6/2006 | Anthony | 361/118 |
| 2008/0139045 A1* | 6/2008 | Ho | 439/578 |

OTHER PUBLICATIONS

Written Opinion for PCT/US11/064704; Date of mailing: May 16, 2012.

Written Opinion for PCT/US11/064717; Date of mailing: May 16, 2012.

International Search Report for PCT/US11/064704; Date of mailing: May 16, 2012.

International Search Report for PCT/US11/064717: Date of mailing: May 16, 2012.

Stolowitz Ford Cowger LLP, Listing of Related Cases, Aug. 9, 2012.

* cited by examiner

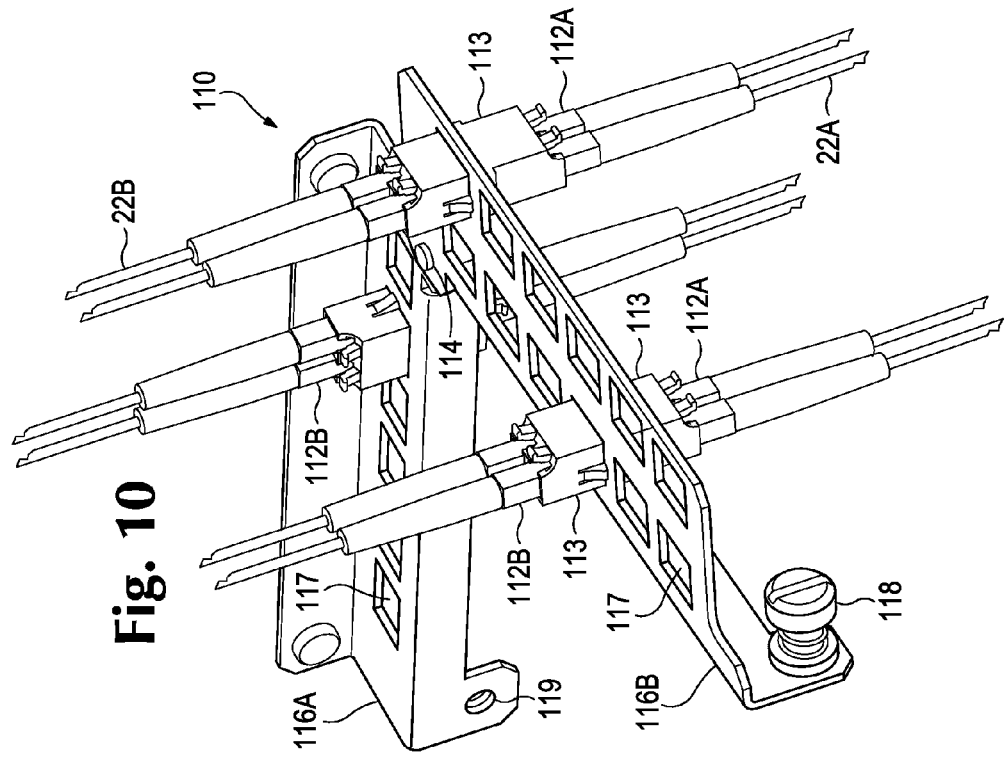
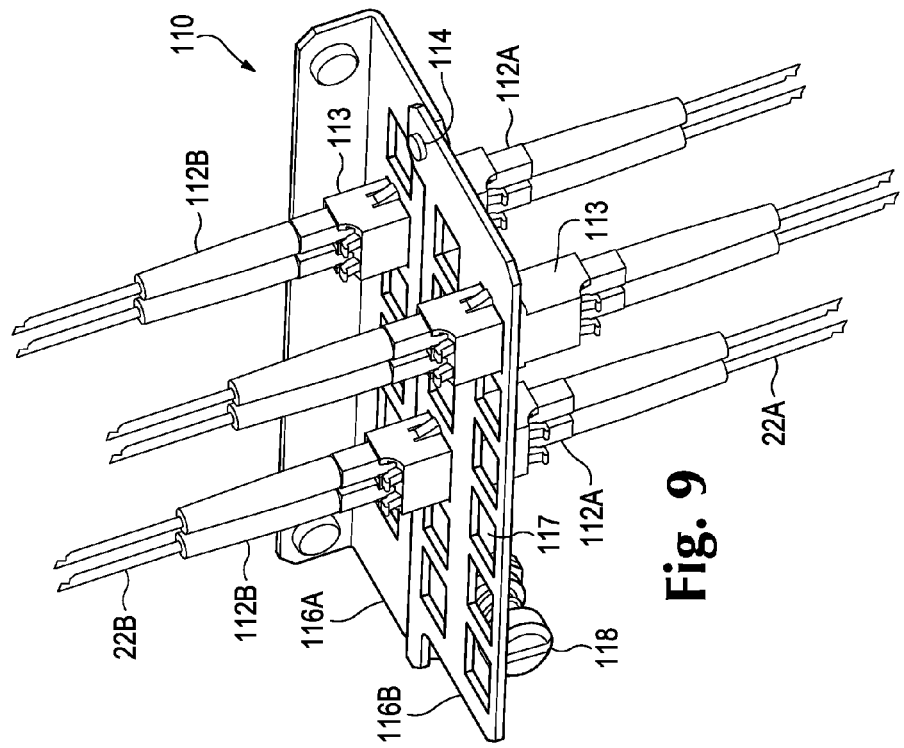

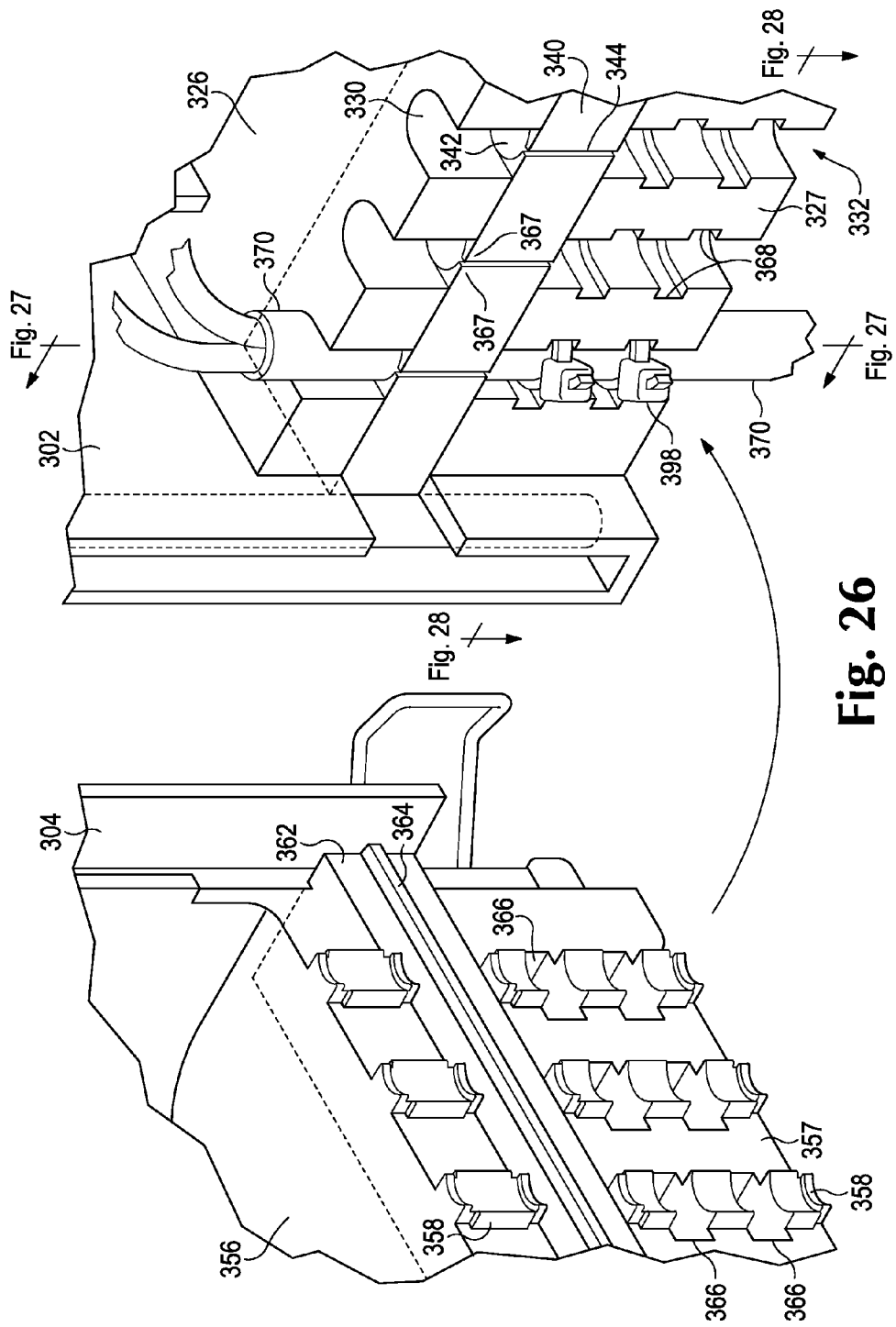

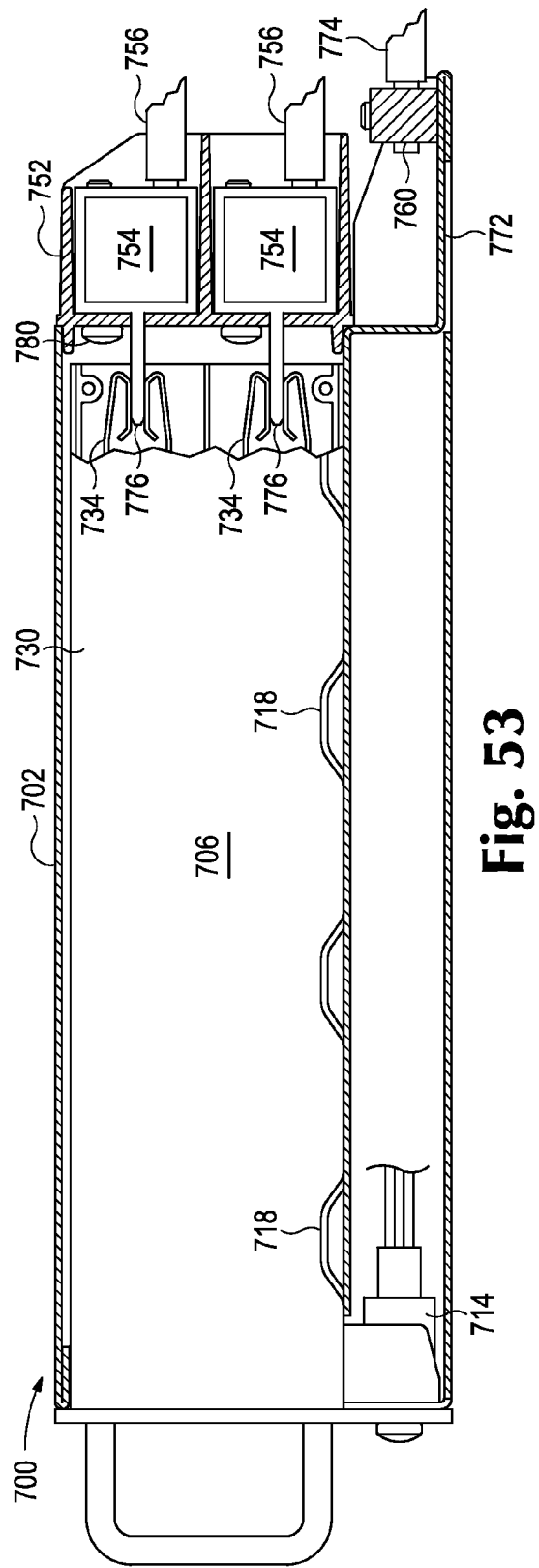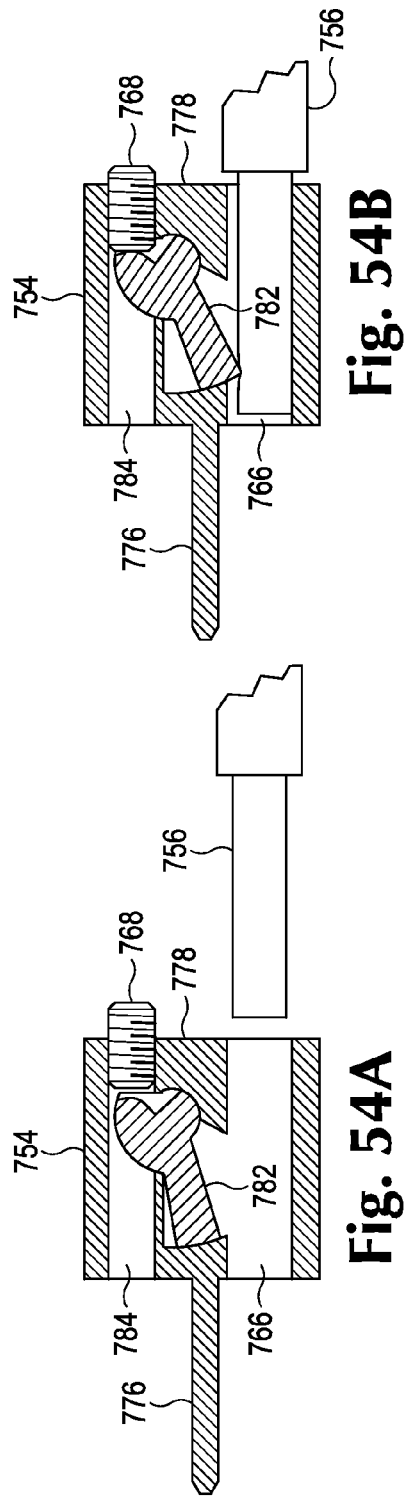
Fig. 53
Fig. 54A
Fig. 54B

CONNECTION LUG

The present application is a divisional of U.S. patent application Ser. No. 13/301,720, entitled OVERVOLTAGE PROTECTION SYSTEM FOR WIRELESS COMMUNICATION SYSTEMS, filed Nov. 21, 2011 that claims priority to U.S. Provisional Application No. 61/440,609, entitled MODULAR OVERVOLTAGE PROTECTION SYSTEM FOR WIRELESS COMMUNICATION SYSTEMS, filed Feb. 8, 2011; and is a continuation-in-part of U.S. application Ser. No. 12/984,304, entitled OVERVOLTAGE PROTECTION FOR REMOTE RADIO HEAD-BASED WIRELESS COMMUNICATION SYSTEMS, filed Jan. 4, 2011 that claims priority to U.S. Provisional Application No. 61/363,967, filed Jul. 13, 2010; which are all herein incorporated by reference in their entirety.

BACKGROUND

Latest generation wireless communications systems, referred to as distributed antenna systems (DAS), distributed DC radio systems, remote radio heads (RRH), 4G and long term evolution (LTE) cellular communication systems, now commonly locate the radios next to the antennas on the tower outside of the communications shelter. In these next-generation facilities, the baseband system module that controls the radio traffic is still located at the ground level shelter, but the actual radios are separated from the controllers up to several hundred feet and controlled by fiber optic links. The radios are powered directly by DC feeds from the DC power plant that extend up the tower and to the radios. In some cases, the DC cables and fiber optic cables are run separately up the tower and in other cases they are all bundled together in one large hybrid cable.

The radios located outside of the communications shelter on top of the tower are much more susceptible to damage from lighting strikes and other electrical power surge events. Individual power lines are run to each individual radio also increasing the amount of power cabling exposed to power surge events. Thus, the DC power plant and telecommunication equipment at communication stations with distributed power have more risk of being damaged due to direct lighting strikes and power surges.

OVERVIEW

A rack mountable surge suppression unit provides local in-line surge suppression protection for the electrical equipment located in the communication station. A unique surge suppression tray is hot swappable so that multiple surge suppression devices can be replaced at the same time without disrupting radio operation. A connection panel in the rack mountable surge suppression unit provides a common relatively short in-line contact point between the surge suppression devices in the tray and different power cables that are distributed out to the different radios.

Individual connection lugs may be used in the connection panel. The connection lugs provide a unique in-line pluggable interface between the surge suppression tray and the connection panel that allow the surge suppression devices to be insertably attached to the power cables. The connection lugs also allow the power cables to be more easily inserted and attached to the connection panel in a reduced front face footprint. The connection lugs are not limited to use with surge suppression devices and can be used for connecting to any type of electrical or non-electrical cable, wire, line, or the like, or any combination thereof.

BRIEF DESCRIPTION OF THE DRAWINGS

FIGS. 9 and 10 show a fiber optic cable tray in more detail.

FIG. 26 is a partial view of the interior bottom walls for the surge suppression unit of FIG. 21

FIG. 53 is a side sectional view of the surge suppression unit of FIG. 46.

FIGS. 54A and 54B are side sectional views of lugs.

DETAILED DESCRIPTION

Several preferred examples of the present application will now be described with reference to the accompanying drawings. Various other examples of the invention are also possible and practical. This application may be exemplified in many different forms and should not be construed as being limited to the examples set forth herein.

Figure 1:
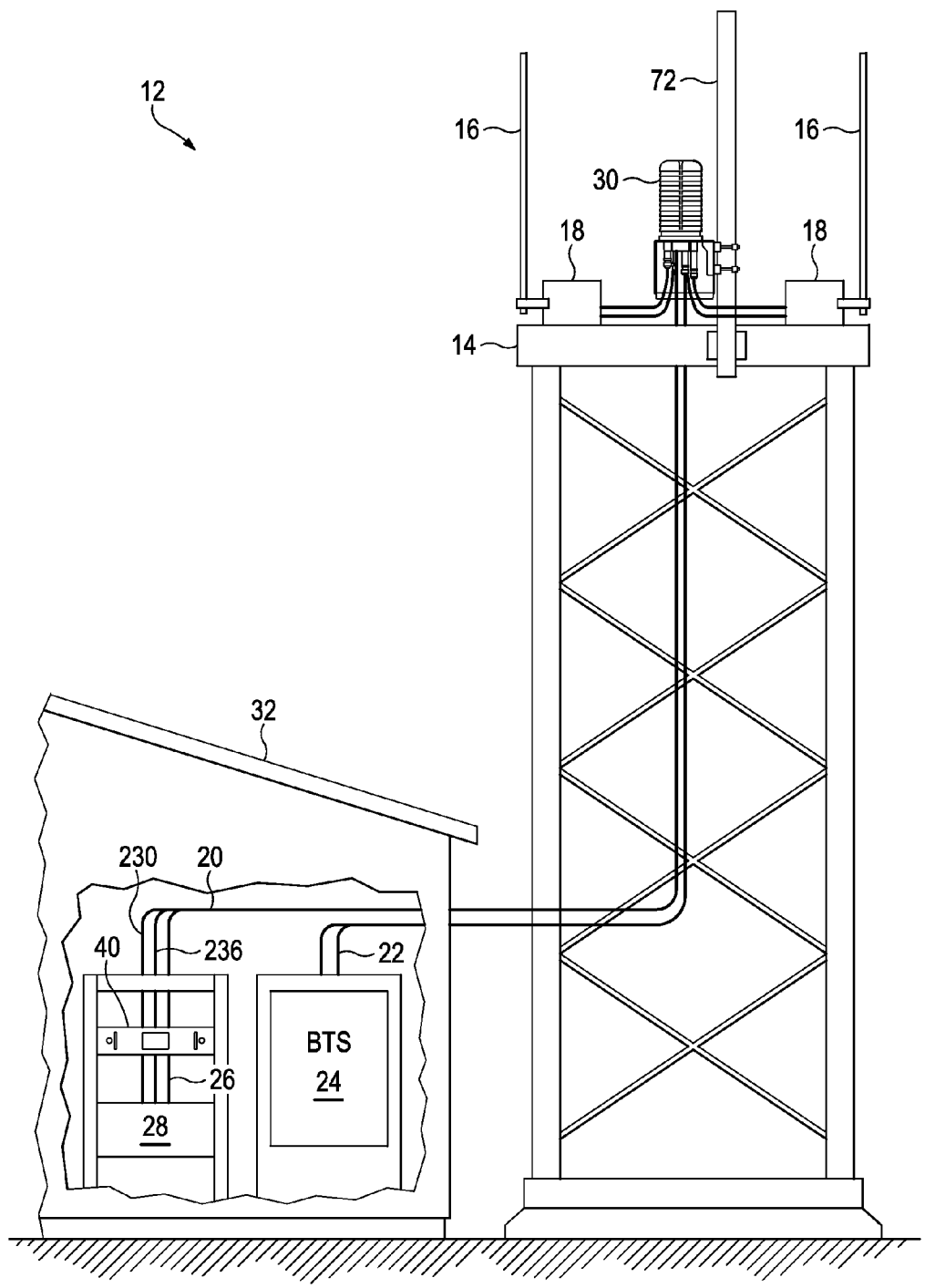
FIG. 1 shows a surge suppression system for a remote radio head-based wireless communication system.
Figure 2:
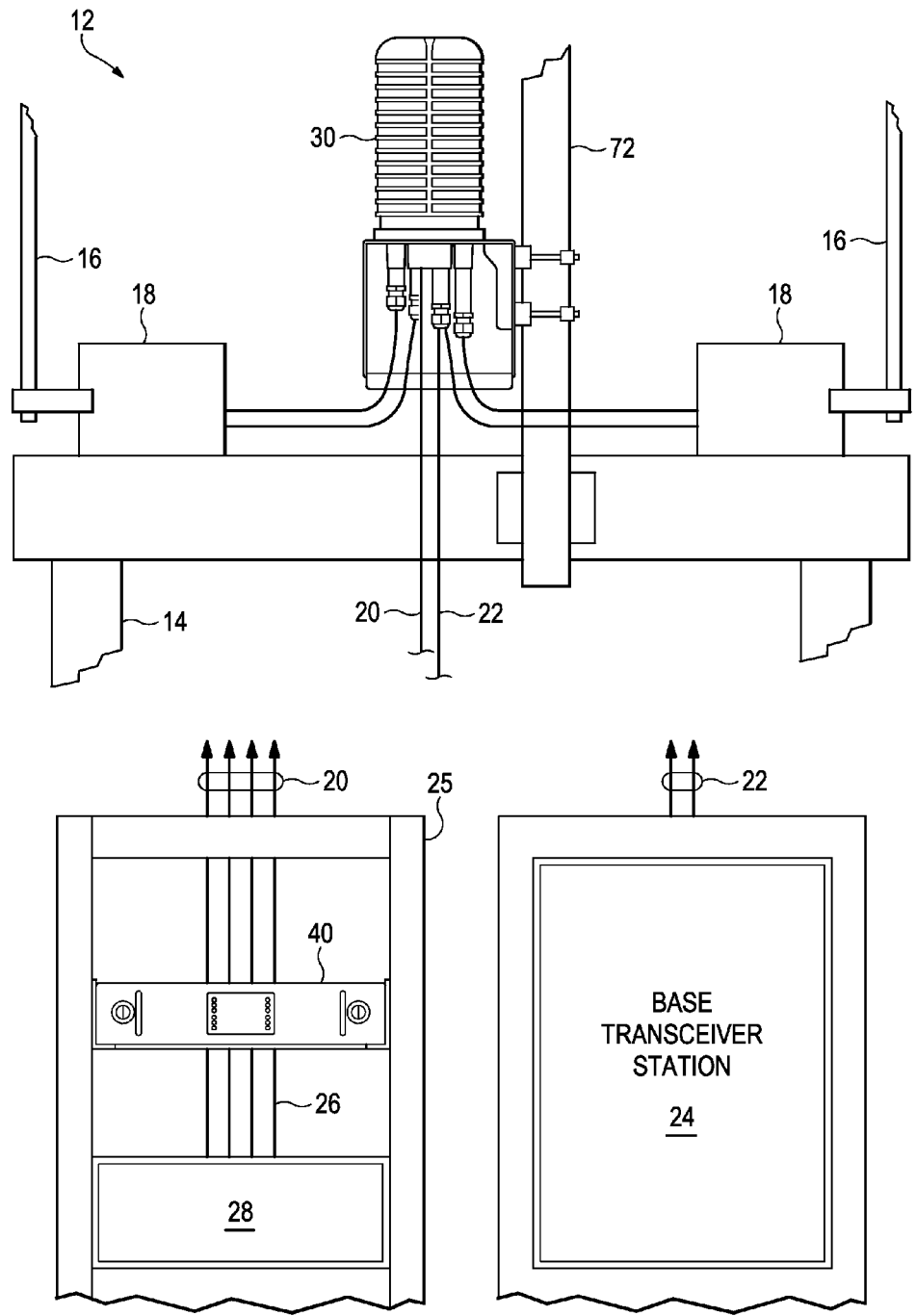
FIG. 2 shows the surge suppression system of FIG. 1 in more detail.

FIG. 1 illustrates one example of a surge suppression system 12 that provides surge suppression for a distributed wireless communication station. FIG. 2 shows some of the elements of the surge suppression system of FIG. 1 in more detail. Referring both to FIGS. 1 and 2, a building 32 contains computing equipment for a base transceiver station (BTS) 24. The communication station 24 is connected through fiber optic cables 22 to different radios 18 located on the top of a tower 14. A Direct Current (DC) power plant 28 is connected through a DC power bus 26 and DC power cables 20 to the different radios 18 on tower 14. The power bus 26 includes pairs of power cables 230 and 236 that are described in more detail below. The power cables 20 include sets of −48 DC volt power lines, return lines, and associated ground lines that extend out of the building 32 and run up the tower 14 to different associated radios 18. The radios 18 are connected to associated antennas 16.

This is just one example of a distributed communication system that uses the surge suppression system 12. It should be understood that the surge suppression system 12 can be used with any communication system or any other electrical system that may require overvoltage protection.

A dome shaped surge suppression unit 30 is attached to a support 72 on the top of the tower 14 and is connected to the ends of the power cables 20 proximate to the radios 18 and antennas 16. In one embodiment, the surge suppression unit 30 is located within 2 meters of the radios 18. A rack based surge suppression unit 40 is located inside of the building 32 and is connected to the opposite end of the power cables 20 relatively close to the DC power plant 28 and communication station 24. In one embodiment, the surge suppression unit 40 is located in a rack 25 that also contains the DC power plant 28. In an alternative embodiment, the surge suppression unit 40 is located in another rack or some other location next to power plant 28.

The radios 18 can be located outside of the building 32 at the bottom of the tower 14. In this arrangement, the surge suppression unit 40 may still be located in the rack 25. However, the surge suppression unit 30 may or may not be used for connecting to the opposite ends of the power cables 20 outside of the building 32.

In another communication station configuration, the radios 18 and associated antennas 16 are located at different corners on the roof of a building. Individual surge suppression boxes can be connected to individual power lines 20 close to the different radios 18 on the roof of the building. Each of the boxes may contain surge suppression devices for one or a few power cables and associated radios. In this configuration the surge suppression unit 40 may still be used but surge suppression boxes located on the roof may be configured differently than the dome shaped surge suppression units 30 shown in FIGS. 1 and 2.

In another configuration the radios 18 and antennas 16 are again located at different corners on a roof of a building. The power cables 20 and fiber optic cables 22 are run into the building and connected to the power plant 28 and communication station 24, respectively, located within a room of the building. In one embodiment, individual surge suppression boxes are connected to the individual power cables 20 and located next to the associated radios 18 on the roof of the building. A separate fiber/power connector on the top of the building provides a junction between the power lines 20 and fiber optic cables 22 extending inside the building and jumper cables that connect to the radios 18.

In another embodiment where the different radios 18 are located relatively close to each other, the dome shaped surge suppression unit 30 may be used both for containing surge suppression devices and as the junction box for the fiber optic cable jumpers that are distributed out to the radios 18. In another embodiment, the dome shaped enclosure of unit 30 may only be used as a junction box for the power cables 20 and/or fiber optic cables 22. The same rack mountable surge suppression unit 40 may be located in the building 32 and may have a same or different surge suppression configuration than the configurations shown in FIGS. 1 and 2.

External Surge Suppression Unit

Figure 3:
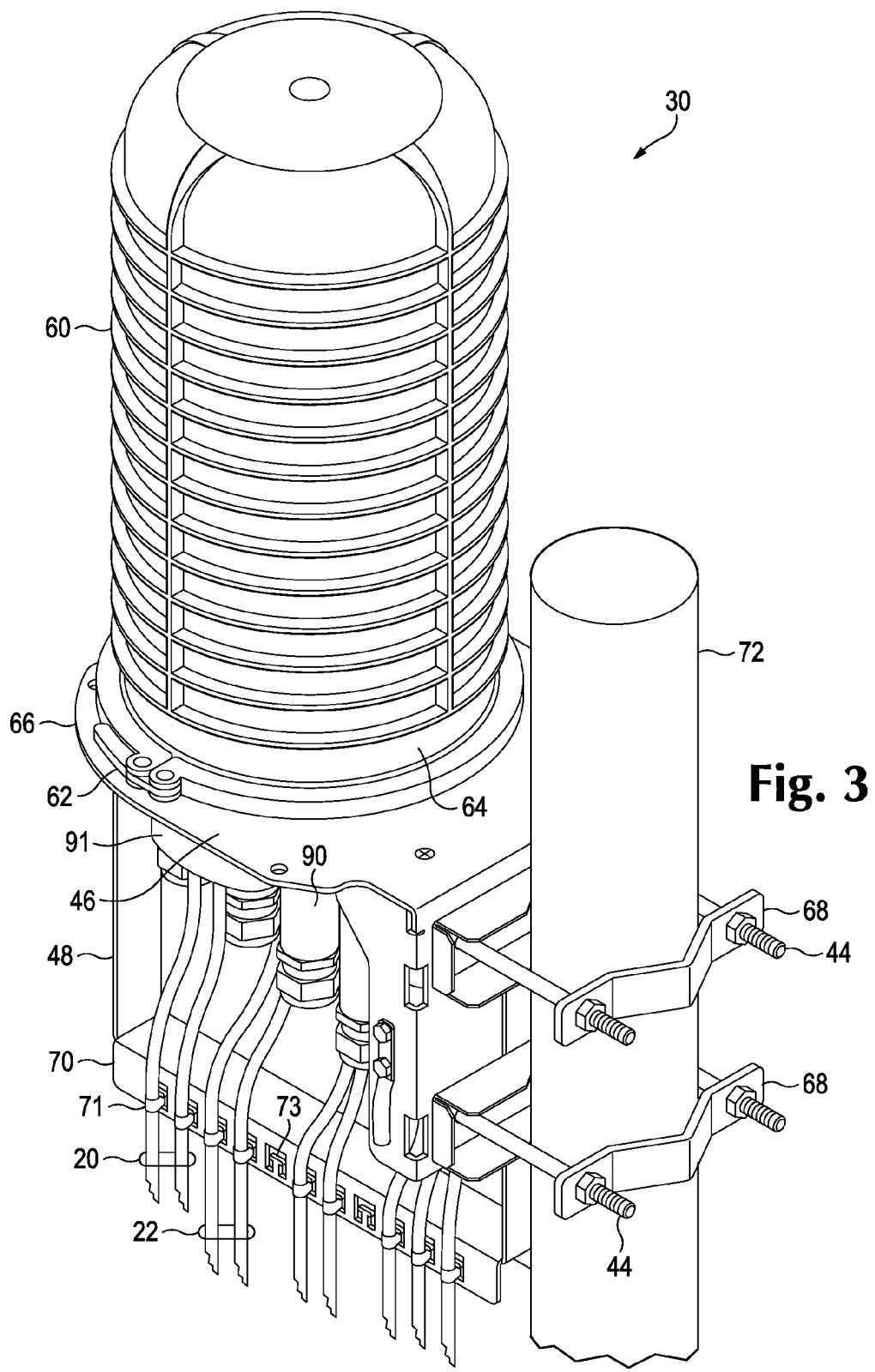
FIG. 3 shows a dome shaped surge suppression unit used in the surge suppression system of FIG. 1.

FIG. 3 shows in more detail the surge suppression unit 30 previously shown in FIGS. 1 and 2. A dome shaped plastic lid 60 sits over a base unit 64 that is shown in more detail in FIGS.

4-6. A ring clamp 62 provides a weather tight seal between the lid 60 and the base unit 64. In one embodiment, the entire suppression unit 30 is around 24 inches or 610 millimeters (mm) tall and has a diameter of around 11 inches or around 280 mm. Of course the suppression unit 30 can be other dimensions according to different surge suppression requirements.

The top of radio towers may have strict wind load, weight, and space limitations. The aerodynamic cylindrical shape of the dome lid 60 reduces wind load that the suppression unit 30 applies to tower 18 in FIG. 1. However, the lid 60 could also have other shapes such as an oval, rounded edge square, triangle, or any other shape that has relatively low wind resistance. One alternative shape is shown below in FIG. 21.

The lid 60 is vertically elongated to increase the amount of internal space available for containing surge suppression devices and fiber optic connectors. The surge suppression unit 30 also has a relatively small diameter to conserve space and further reduce wind load at the top of tower 14. In other embodiments where more space is available, the lid 60 may be shorter and have a larger diameter.

A mounting bracket 66 includes clamps 68 that attached to the support pole 72. The clamps 68 hold the mounting bracket 66 perpendicularly out from the side of the pole 72 on the tower 14 in FIG. 1. The bracket 66 has a mounting platform 46 with a circular ring shape that forms a circular internal opening 67 (FIG. 4) for receiving the circular base unit 64. A wiring bracket 70 extends underneath the mounting platform 46. Tie downs 71 are inserted into holes 73 in the wiring bracket 70 and used for securing the power cables 20 and fiber optic cables 22 that extend down from the bottom of base unit 64. Alternatively, the mounting bracket 66 could attach to a wall bracket or to a pole that extends up from the top of a roof. The mounting bracket 66 allows the surge suppression unit 30 to be mounted in a vertical elevated position in a large number of different support structures.

Figure 4:
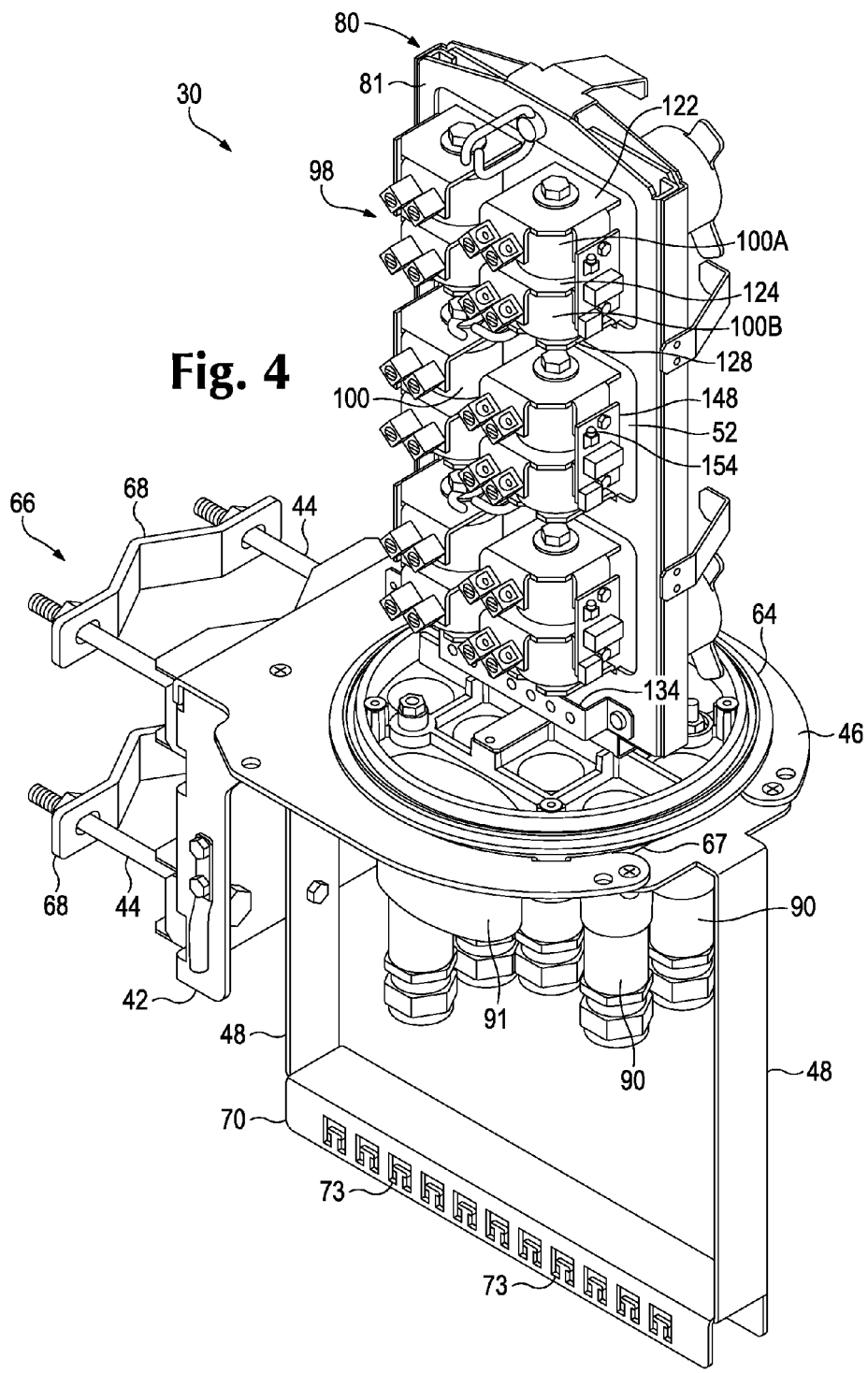
FIG. 4 shows the surge suppression unit of FIG. 3 with a lid removed.

FIG. 4 is a perspective view of the surge suppression unit 30 with the lid 60 removed. The two clamps 68 of mounting bracket 66 attach through bolts 44 to a back plate 42. The back plate 42 is aligned vertically and the mounting platform 46 extends horizontally out from the top of back plate 42. At mentioned above, the ring formed by mounting platform 46 forms a partial circular opening 67 that receives the base unit 64. Two vertical arms 48 extend down between opposite ends of the mounting platform 46 and opposite ends of the wiring bracket 70.

Figure 5:
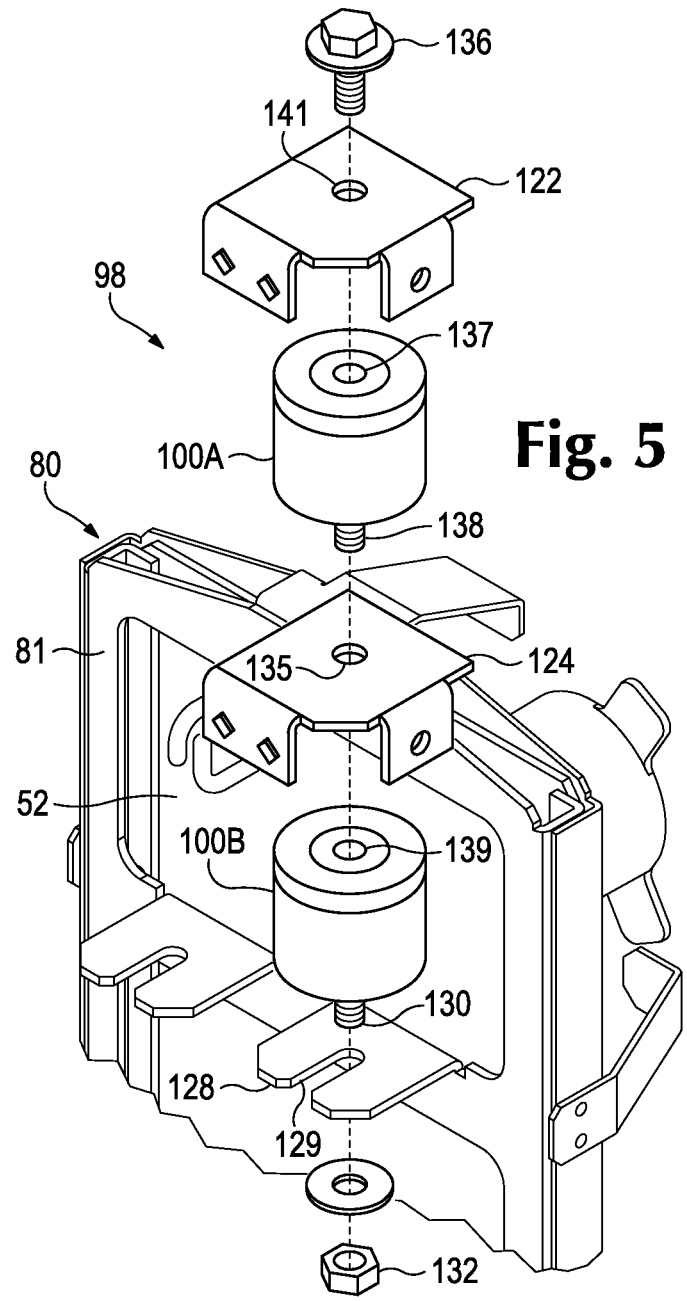
FIG. 5 shows a portion of a surge suppression assembly contained in the surge suppression unit of FIG. 4.

FIG. 5 is an exploded view showing one of multiple surge suppression assemblies 98 located inside of the surge suppression unit 30. Referring to FIGS. 4 and 5, a wall divider 80 extends vertically up from the middle of base unit 64 and forms two different chambers inside of the lid 60. Two columns of three surge suppression assemblies 98 are aligned vertically and in parallel next to each other on the power side of the divider wall 80.

Each surge assembly 98 includes a set of three bus bars 122, 124 and 128 connected to a pair of vertically stacked surge suppression devices 100A and 100B. In one embodiment, the surge suppression devices 100A and 100B have a cylindrical disc shaped. One example of the surge suppression devices 100 is the Strikesorb® surge suppression module manufactured by Raycap Corporation, 151 24 Marousi, Athens Greece. However, any type and shape of surge suppression device 100 can be used and the bus bars 122, 124, and 128 can be configured to connect together other types and shapes of surge suppression devices.

Figure 6:
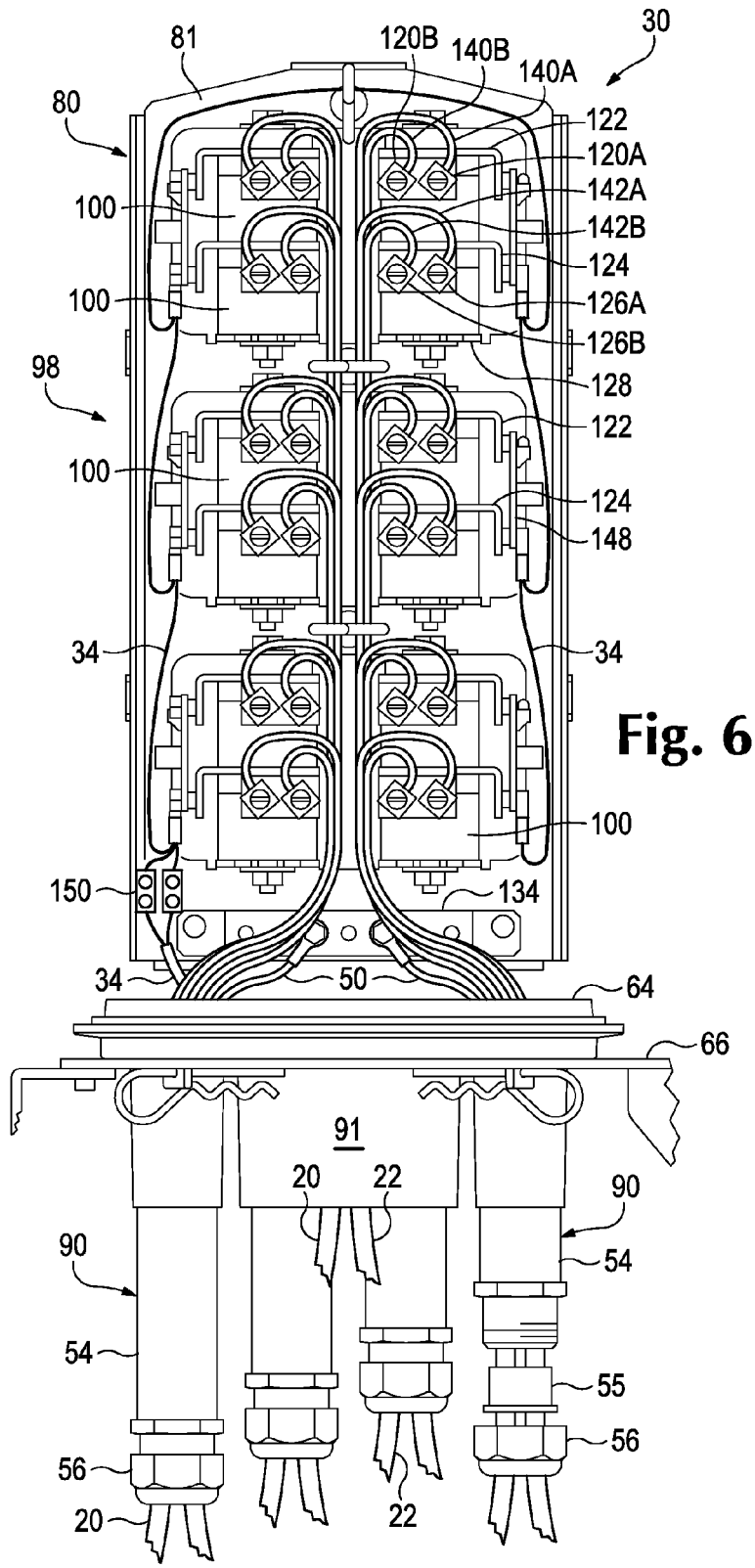
FIG. 6 is a front view of the surge suppression unit of FIG. 3 with the lid removed.

A ground terminal 134 connects to ground lines 50 in the power cables 20 (see FIG. 6). The ground terminal 134 is electrically coupled to an aluminum ground plate 81 that forms part of the wall divider 80. The ground plate 81 includes three pairs of tabs 128 that extend up from the bottom of three rectangular openings 52. The tabs 128 are bent 90 degrees into a horizontal position to form the ground bus bars 128 of the surge suppression assemblies 98. The ground plate 81 electrically couples together all the ground bus bars 128 and ground cables 50. This unique grounding configuration reduces the number of ground wires and other components used in the surge suppression unit 30.

The ground bus bars 128 operate as support platforms or shelves for the surge suppression assemblies 98 and allow the different components of the surge suppression assemblies 98 to be easily added or removed from the surge suppression unit 30. Each bus bar 128 extends horizontally and perpendicularly out from the side of the ground plate 81 and supports a pair of surge suppression devices 100A and 100B in a vertical stacked alignment. A connecting member 130 extends out of the bottom end of surge suppression device 100B and slides into a slot 129 formed in the bus bar 128. A nut 132 engages with a threaded end of connecting member 130 mechanically and electrically coupling the bottom end of surge suppression device 100B to the bus bar 128.

A bottom end of surge suppression device 110A and a top end of surge suppression device 100B each include holes 139 that receive a connecting member 138. The connecting member 138 inserts through a hole 135 in return bus bar 124 and mechanically and electrically couple the bottom end of surge suppression device 110A and the top end of surge suppression device 100B to return bus bar 124. A bolt or screw 136 inserts through a hole 141 in bus bar 122 and screws into a hole 137 in the top of the surge suppression device 100A electrically and mechanically coupling a top end of the surge suppression device 100A to the bus bar 122.

FIG. 6 is a side elevation view of the suppression unit 30 with the lid 60 removed. A first terminal 120A on the bus bar 122 is connected to a −48 VDC power line 140A contained in one of the power cables 20 that connect to the power plant 28 in FIG. 1. A second terminal 120B on bus bar 122 is connected to a second −48 VDC jumper power line 140B that connects to one of the radios 18 in FIG. 1. A first terminal 126A on the return bus bar 124 connects to a positive or return power line 142A that is also connected at the other end to the power plant 28 in FIG. 1. A second terminal 126B on return bus bar 124 is connected to a positive/return jumper power line 142B that connects to the same radio 18 connected to line 140B.

The unique arrangement of the vertically elongated ground plate 81 and the horizontally extending ground bus bars 128 allow multiple pairs of the surge suppression devices 100 to be supported vertically on top of each other in two columns. This compact design allows all of the surge suppression components to be supported on a single side of the divider wall 80 and only extend out from the ground plate 81 little more than the width of the surge suppression devices 100. In an alternative embodiment, the surge suppression devices 100 may be connected on both sides of divider wall 80.

Pairs of surge suppression devices 100A and 100B are readily accessible and easily removed and replaced by simply disconnecting the power lines 140 and 142 from the terminals 120 and 126, respectively. The bottom surge suppression device 100B can then be removed from ground bus bar 128. As mentioned above, the surge suppression devices 100A and 100B are aligned vertically one deep on divider wall 80 in two vertically aligned columns. This allows any individual surge suppression device 100, or any suppression assembly 98, to be easily replaced without obstruction by any other surge suppression devices 100. The surge suppression devices 110 and assemblies 98 can also be removed without disrupting operation of any other surge suppression assemblies 98. This easy accessibility is beneficial when maintenance operations are performed on the top of a tower 14 in FIG. 1 by technicians with limited mobility.

Multiple ports 90 and 91 extend down from the bottom of the base unit 64. The ports 90 and 91 receive the different power cables 20 and fiber optic cables 22 from the power plant 28, communication station 24, and radios 18 shown in FIG. 1. In one embodiment, the ports 90 comprise conduits 54 made from a semi-flexible polyvinyl chloride (PVC) pipe.

The different lengths of conduit 54 allow a larger number of ports 90 to extend out of the bottom of the circular base unit 64 and also allow relatively easy access by a technician. For example, the variable lengths allow a technician to more easily insert the cables 20 and 22 into the ports 90 and attach caps 56 onto the end of conduits 54. The elongated ports 90 also provide a long barrier zone between the internal chamber of the suppression unit 30 and the outside environment.

Each of the ports 90 has a circular cross sectional shape and contains a gasket 55 that receives the power cables 20 or fiber optic cables 22. The cables 20 or 22 are inserted along with the gasket 55 into the ports 90 and are then screwed tight inside of the conduits 54 by the caps 56. One of the ports 90 may receive an alarm monitoring cable 34. Other ports 91 have an oval cross-section shape and also extend down on opposite sides of the base unit 64 and receive some of the power cables 20 and/or fiber optic cables 22.

The suppression unit 30 has enough ports 90 and 91 to receive six different sets of power cables 20 for powering six different radios 18. In one embodiment there are two rows of four ports 90 that extend down from base unit 64 on opposite sides of the divider wall 80. There are also two oval ports 91 that extend down from the base unit 64 from opposite sides of the divider wall 80. However, any combination of ports 90 and 91 could be provided and any of the unused ports can be covered a waterproof cap 56 until needed.

FIGS. 4 and 6 also show monitoring devices 148 coupled between the two bus bars 122 and 124. The monitoring devices 148 activate a switch when the surge suppression device 100A is shorted to ground or otherwise fails. The monitoring devices 148 are daisy chained together by cable 34 and attach to alarm terminals 150 at the bottom of the ground plate 81. Individual LEDs 154 on each of the monitoring devices 148 allow a technician to determine which pairs of surge suppression devices 100A and 100B are functional. The wires in the alarm monitoring cable 34 are run from terminal 150 either back to an annunciation device in building 32 in FIG. 1 or to one of the radios 18 that can then send a signal back over one of the fiber optic cables 22 to a monitoring system.

Figure 7:
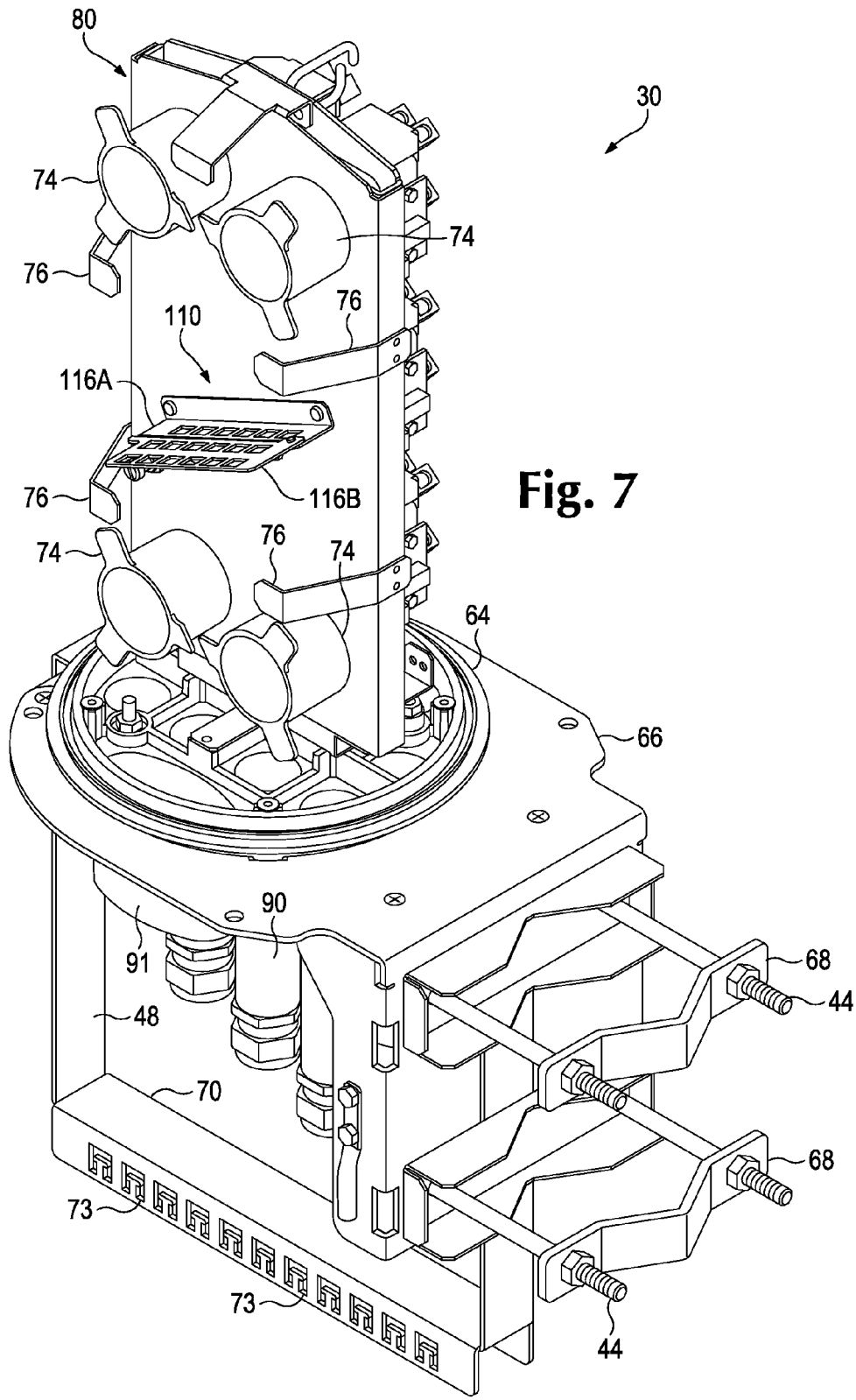
FIG. 7 is a perspective rear view of the surge suppression unit of FIG. 6.
Figure 8:
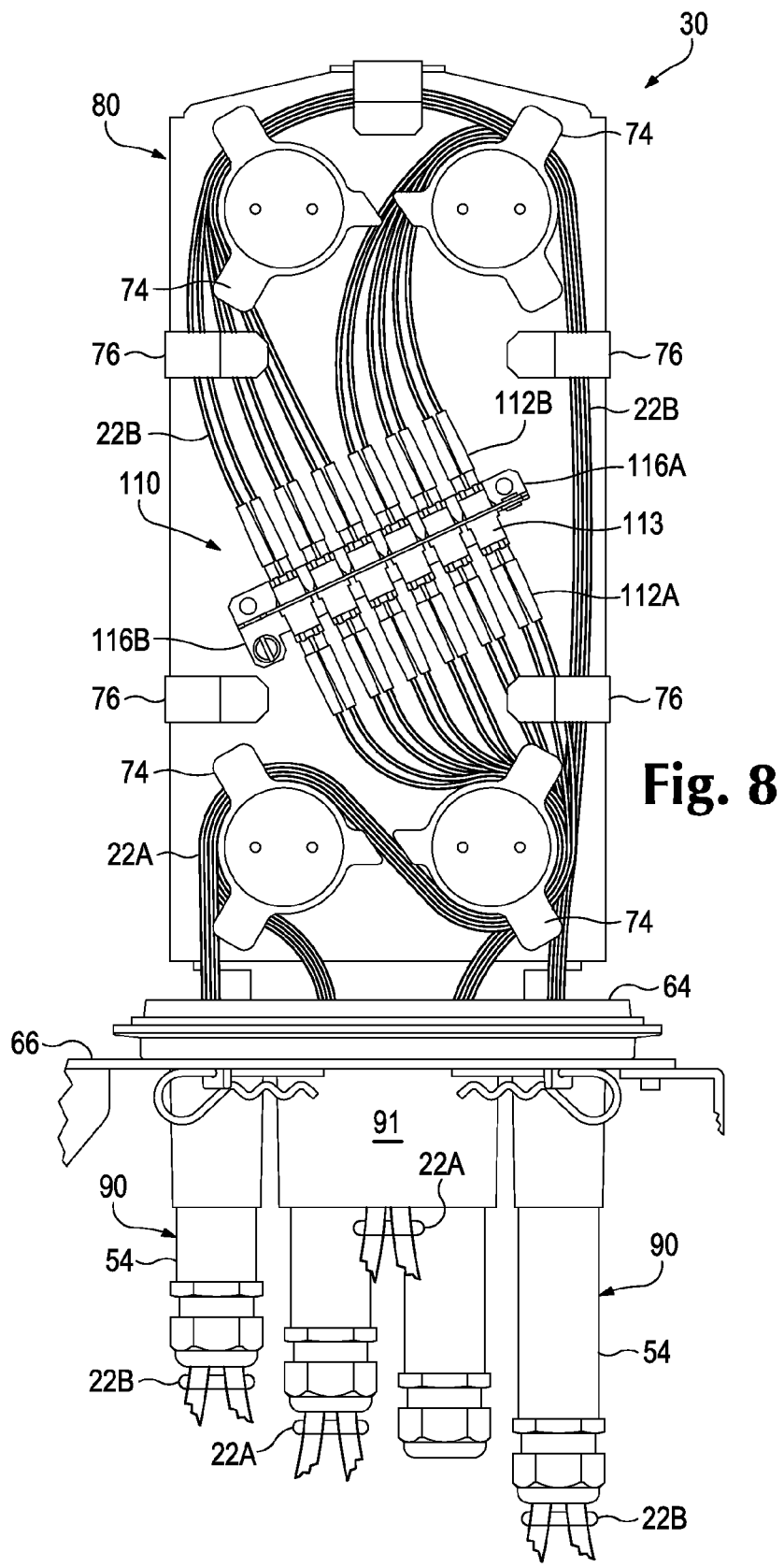
FIG. 8 is a rear elevation view of the surge suppression unit of FIG. 7.

FIG. 7 is a perspective view of the of the suppression unit 30 showing the fiber side of the divider wall 80. FIG. 8 shows the fiber side of the divider wall 80 populated with fiber optic cables 22A and 22B. Referring to FIGS. 7 and 8, the fiber optic cables 22A from the communication station 24 in FIG. 1 extend up through one of the ports 90 or 91 and the base unit 64. The fiber optic cables 22A wrap partially around one or more of spools 74. Connectors 112A at the end of the cables 22A snap into a first end of adapters 113 that are held in a connector tray 110.

Connectors 112B on a first end of fiber optic jumper cables 22B snap into a second end of the adapters 113 that are contained on connector tray 110. The fiber optic jumper cables 22B extend from connectors 112B around one or more of the spools 74, down through the bottom of base unit 64 and through another port 90 or 91, and connect to one of the radios 18 in FIG. 1. The spools 74 relieve some of the pressure on the fiber optic cables 22 and are also used to take up extra cable length. Retainers 76 hold the fiber optic cables within the fiber side of divider wall 80.

FIGS. 9 and 10 show the connector tray 110 in more detail. The adapters 113 seat into holes 117 located in two different arms 116A and 116B of the connector tray 110. The first arm 116A of the tray 110 is rigidly attached to the fiber side of the divider wall 80. The second arm 116B of the tray 110 rotates about a pin 114 that is rigidly attached to the lateral end of the first arm 116A. The second arm 116B can be rotated out in a 90 degree perpendicular relationship from the first arm 116A.

After installation of the fiber optic connectors 112A and 112B into opposite ends of the adapters 113, arm 116B is rotated about pin 114 into a parallel abutted alignment with arm 116A. A threaded screw or latch 118 is attached to the end of arm 116B and inserts and locks into a hole 119 on the lateral end of arm 116A.

The connector tray 110 when in the unlocked 90 degree position in FIG. 10 allows a technician to more easily install and maintain the fiber optic cables 22. In the locked position of FIG. 9, the arms 116A and 116B abut lengthwise against each other to reduce the overall distance the tray 110 extends out from divider wall 80. In the folded latched position, the tray 110 extends only a small distance out from divider wall 80. This allows the dome shaped lid 60 in FIG. 3 to have a smaller diameter. Thus, the surge suppression unit 30 can retain a large number of fiber optic cable connectors 112 in a relatively small tubular footprint.

The connector tray 110 is shown with three parallel rows of holes 117 for retaining the adapters 113. However the tray 110 could have fewer rows or more rows of holes 117 for retaining fewer or more fiber optic cables 22. The fiber optic cables 22 can be installed in the connector tray 110 during initial installation of the suppression unit 30 on the tower 14 in FIG. 1 and used later as back-up or when additional radios 18 are installed.

Technicians can install the fiber optic jumper cables 22B and the power jumper cables 140B and 142B (FIG. 6) when the suppression unit 30 is initially installed on the tower 14 even before the radios 18 are installed. The technician can then climb up the tower 14 at a later time and attach the previously installed fiber optic jumper cables 22B and power jumper cables 140B and 142B in the suppression unit 30 to different radios 18.

In an alternative embodiment, both sides of the divider wall 80 are configured to support and connect surge suppression assemblies 98 similar to what is shown in FIG. 6. In this configuration the surge suppression unit 30 contains up to twelve surge suppression assemblies 98 for attaching to twelve different power cables 20. In another alternative embodiment, both sides of the divider wall 80 are configured to support and connect fiber optic cables 22 similar to what is shown in FIG. 8. In this configuration each side of wall 80 retains a fiber optic connector tray 110.

Rack Mounted Surge Suppression

Figure 11:
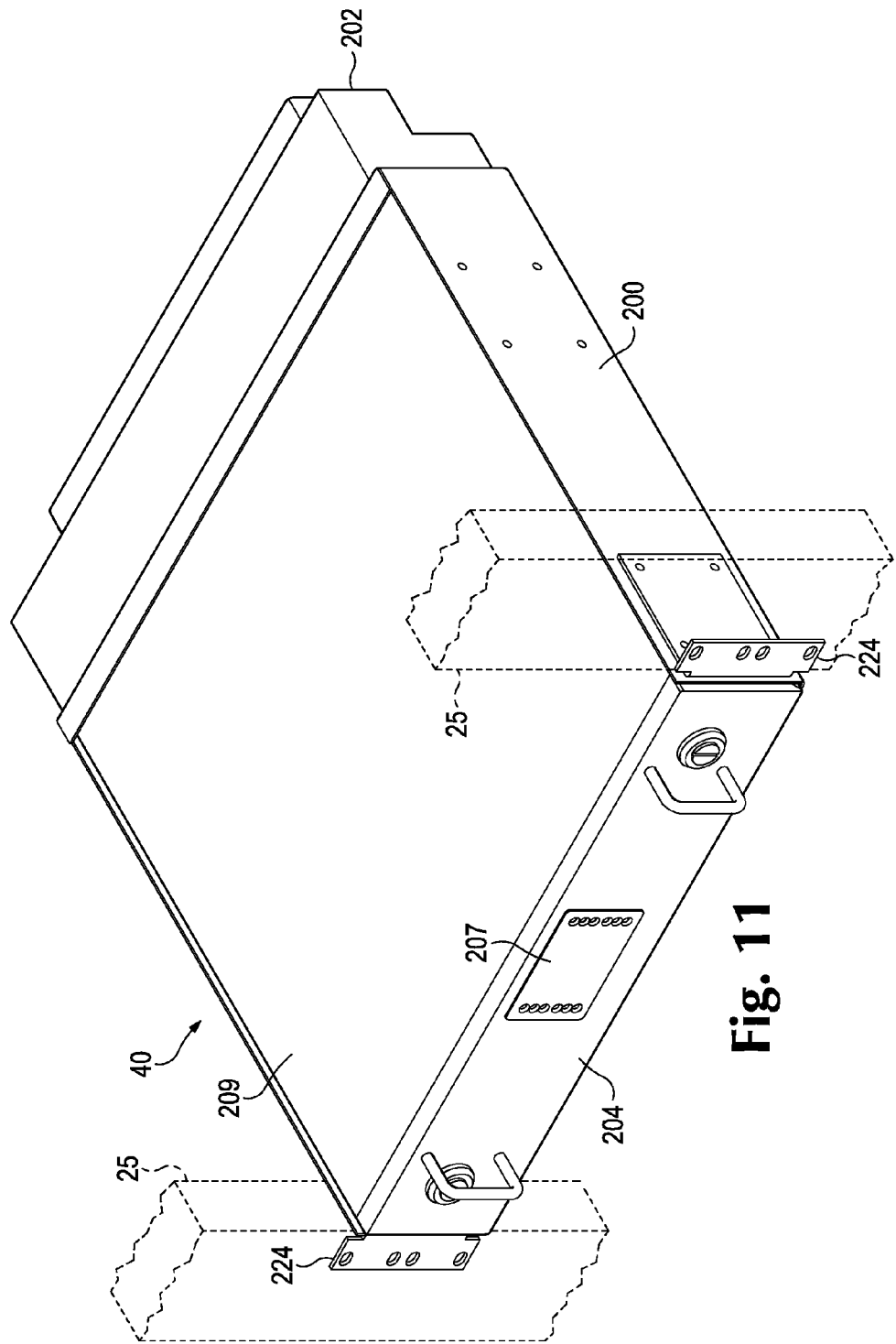
FIG. 11 shows a rack mountable surge suppression unit from FIG. 1 in more detail.

FIG. 11 shows a front perspective view of the rack based surge suppression unit 40 previously shown in FIG. 1. The surge suppression unit 40 includes a frame 200 that connects to a rack or support structure 25 such as the same one used for supporting the DC power plant 28 shown in FIG. 1. The rear end of the frame 200 supports a power terminal assembly 202 and a front end of the frame 200 supports a surge suppression tray 204. The front of the surge suppression unit 40 includes a series of light emitting diodes (LEDs) 207 that are activated based on the operational state of surge suppression devices contained in the tray 204.

Mounting brackets 224 attach at the front, back, or middle sides of the frame 200 and attach at the rack or other support structure 25. For example, a first set of brackets 224 may be used at a first location for a 19 inch rack and a second different set of brackets 224 may be used at a second location for a 23 inch rack.

The surge suppression tray 204 has the advantage of having a conventional Rack Unit (RU) form factor that in one embodiment is a 2RU enclosure 209 that can fit into a 19 inch or 23 inch rack configuration. This allows the surge suppression unit 40 to be mounted in the same rack 25 that holds the electronic circuitry for the power plant 28 and/or holds the telecommunication circuitry for the BTS 24 shown in FIG. 1. This allows the surge suppression unit 40 to be connected closer to the power plant 28 and telecommunication circuitry 24. The surge suppression unit 40 can be mounted onto any other rack or other structure that may be housed in the building 32 shown in FIG. 1, uses minimal space, and does not require a special mounting structure or rack.

Figure 12:
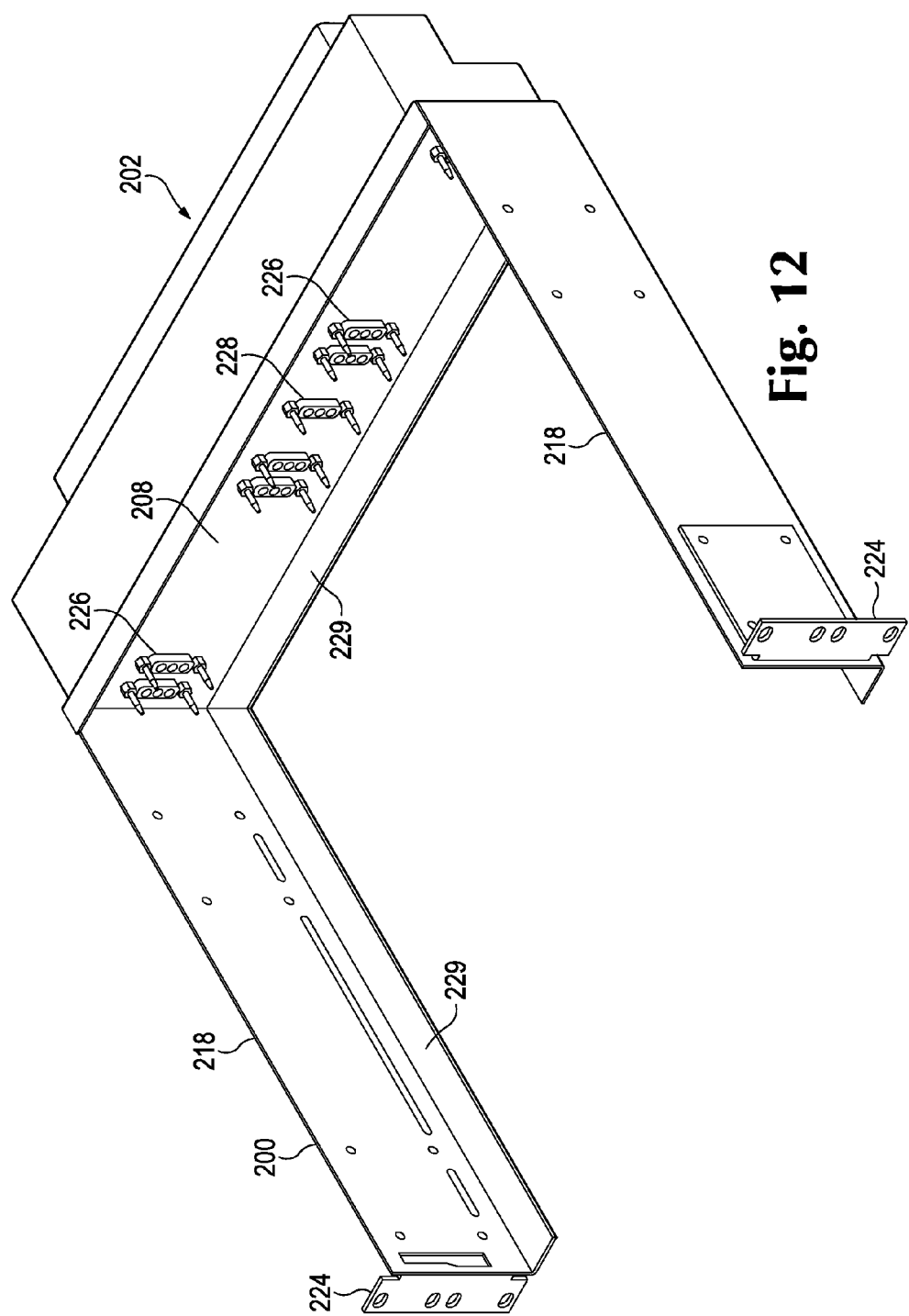
FIG. 12 shows a back end of the surge suppression unit shown in FIG. 11.

FIG. 12 is a perspective view of the frame 200 and power terminal assembly 202. The frame 200 includes side walls 218 that are connected together at a back end by a back wall 208. Bottom ends of walls 208 and 218 extend horizontally inward forming a ledge 229 that supports the tray 204 in FIG. 11. The back wall 208 includes openings for receiving connectors 226 and 228 that extend out from the power terminal assembly 202.

Figure 13:
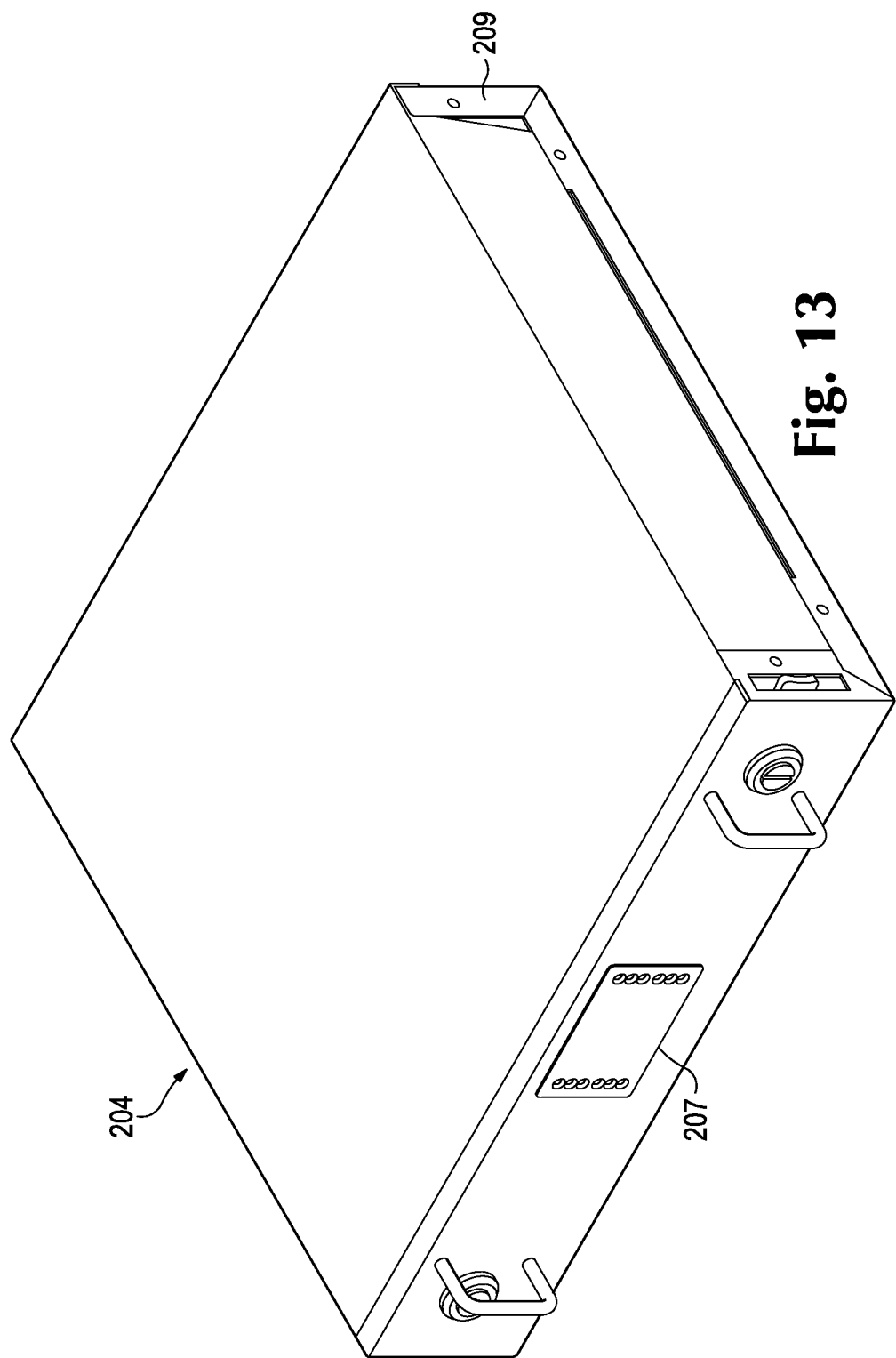
FIG. 13 shows a surge suppression tray for the surge suppression unit shown in FIG. 11.

FIG. 13 is a perspective isolated view of the surge suppression tray 204. The tray 204 contains surge suppression modules 260 (FIG. 18) that provide surge suppression for the electrical equipment located in the structure 32 in FIG. 1. The tray 204 has a rectangular shaped enclosure 209 that slides into, and is supported by, the frame 200 in FIG. 12.

Figure 14:
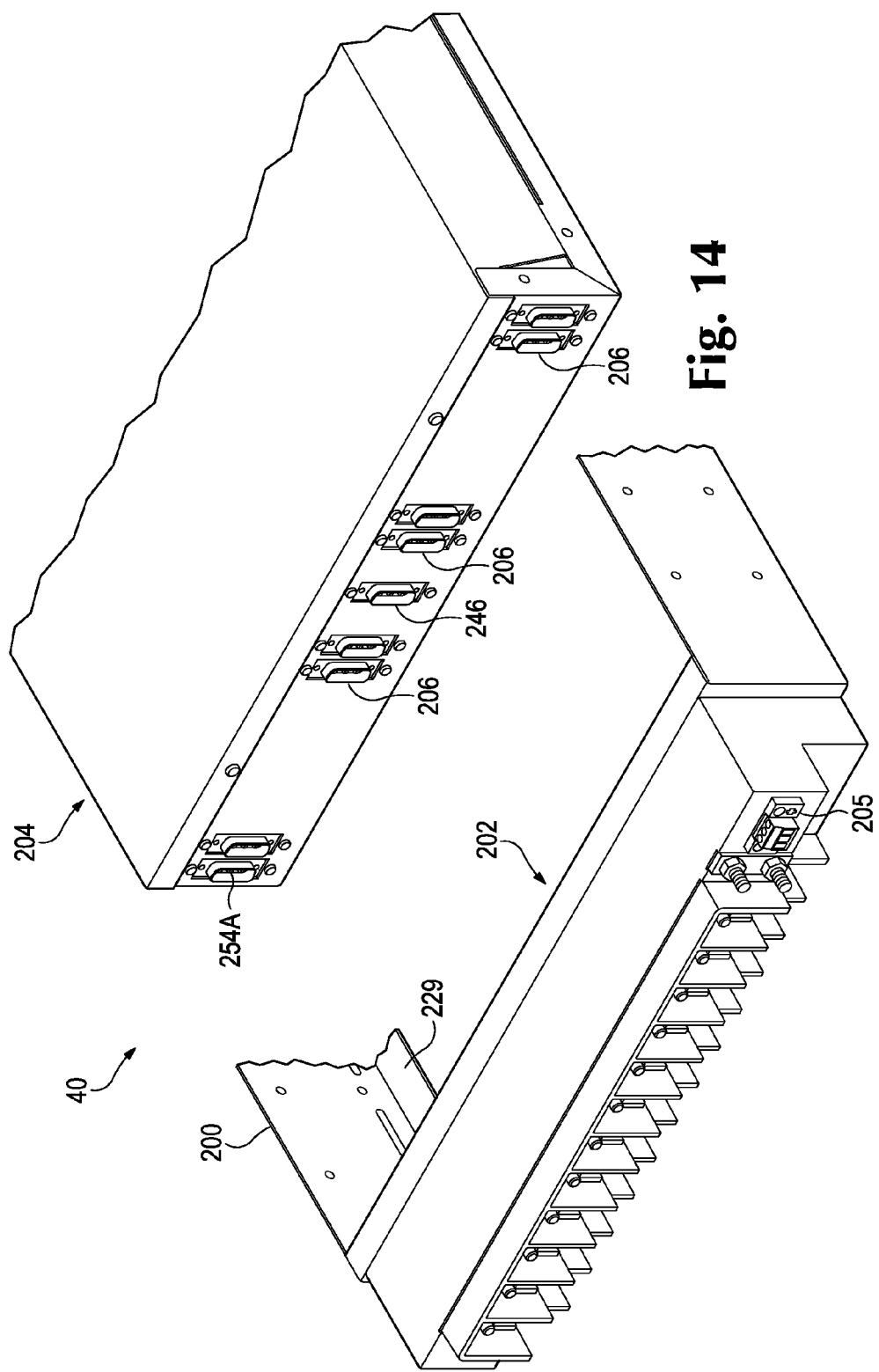
FIG. 14 shows how a power terminal assembly in the surge suppression unit is connected to the surge suppression tray.

FIG. 14 is a partial exploded perspective rear view of the rack mountable surge suppression unit 40. The tray 204 is shown detached in a spaced apart position with respect to the power terminal assembly 202. In an operational position, the back of tray 204 is slid back against the power terminal assembly 202. The blind mate connectors 206 and 246 on the back end of tray 204 slidingly insert into mating connectors 226 and 228 in FIG. 12, respectively that extend out of the front end of power terminal assembly 202.

The power terminal assembly 202 provides a common in-line connectivity point for the surge suppression modules 260 contained in the tray 204. This unique in-line connectivity also allows the tray 204 and internal surge suppression devices to be detached from power lines 20 while the power lines are energized without disrupting operation of the radios 18 in FIG. 1 (hot swappable). Multiple surge suppression units can be removed, replaced, and reattached from the power lines 20 all at the same time simply by connecting or disconnecting tray 204 to or from power terminal assembly 202.

Figure 15:
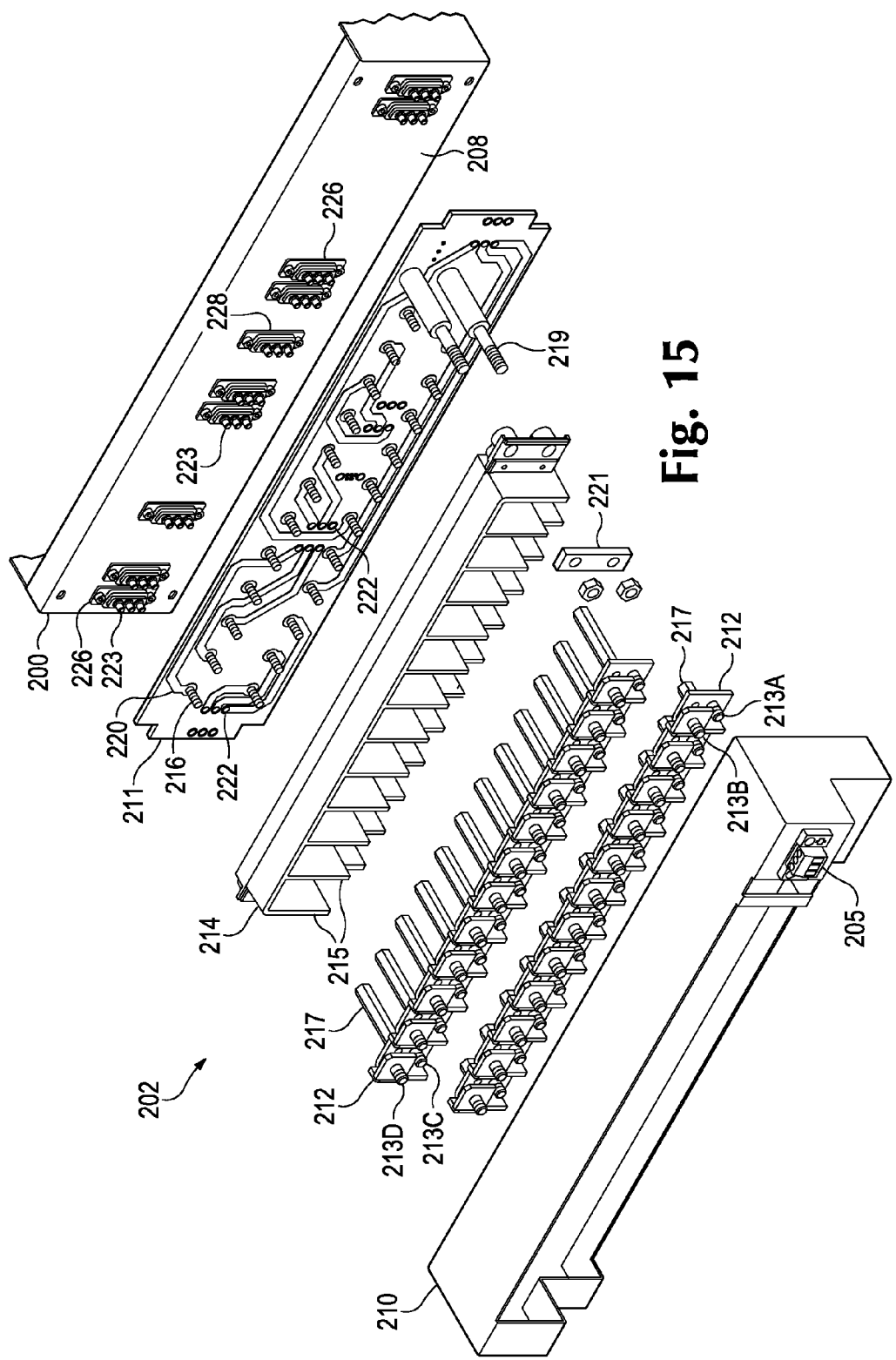
FIG. 15 shows an exploded view of the power terminal assembly.

FIG. 15 is an exploded perspective view of the power terminal assembly 202. A housing 210 receives upper and lower connector strips 212 that are shown in more detail below. Terminals 213 extend out from a back end of the connector strips 212. Pairs of upper and immediately lower terminals 213A, 213B and 213C, 213D are shorted together. Insulator blocks 214 include walls 215 that align between the vertical pairs of terminals 213.

Connector rods 217 connect the terminal pairs 213A, 213B and 213C, 213D to threaded pins or screws 216 that extend out of a circuit board 211. Etched conductors 220 connect the pins or screws 216 to contact holes 222 that extend through the circuit board 211. The contact holes 222 receive and connect to pins or sockets 223 contained in the connectors 226 and 228 that extend out the back wall 208 of frame 200. Ground rods 219 are attached at one end to a ground plane of the circuit board 211, extend through the insulator blocks 214, and connect to a ground terminal 221. Alarm socket 205 connects to monitoring circuits 280 shown below and extends out the back face of housing 210.

Figure 16:
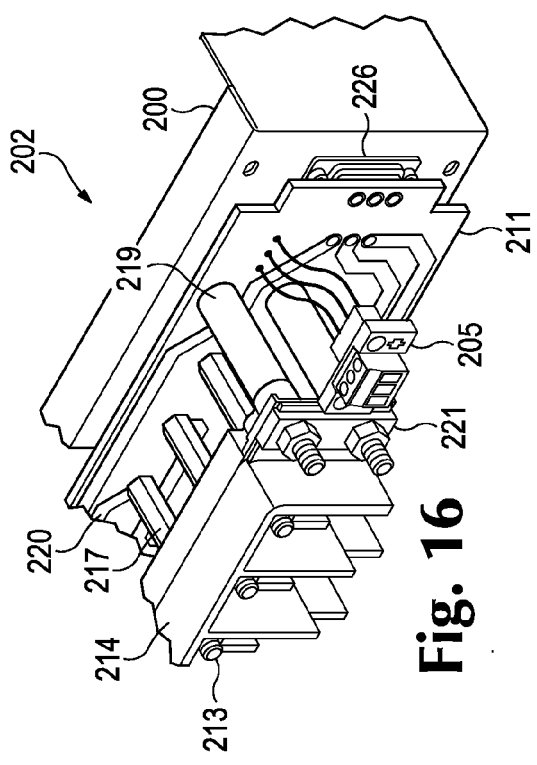
FIG. 16 shows an assembled partial view of the power terminal assembly.

FIG. 16 shows a partial assembled view of the power terminal assembly 202. The ground rods 219 provide a ground connection from ground terminal 221 to the ground plane on the circuit board 211. The connector rods 217 provide separate power connections from different pairs of shorted terminals 213A, 213B and 213C, 213D to different pins or screws 216 on the circuit board 211. The etched conductors 220 on the circuit board 211 electrically connect the pins or screws 216 to the contact holes 222. The contact holes 222 then electrically connect to corresponding sockets or pins 223 in connectors 226 and 228 (FIG. 15).

Figure 17:
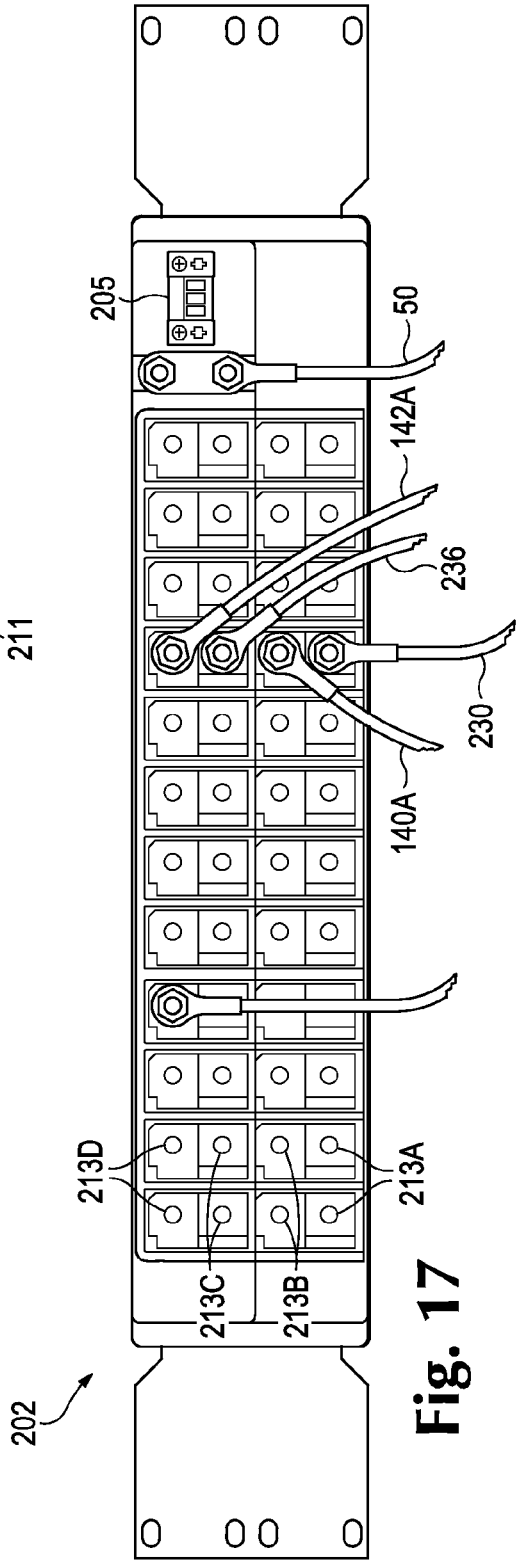
FIG. 17 is a rear elevation view of the power terminal assembly.

FIG. 17 shows a rear elevation view of the power terminal assembly 202. A first lower row of terminals 213A connect to different −48 v power line jumpers 230 connected to the power plant 28 in FIG. 1. A second row of terminals 213B are shorted to immediately lower ten finals 213A in the first row and connect to one of the −48 v power lines 140A in power cable 20 that connect to the external surge suppression unit 30 in FIG. 1.

A third row of terminals 213C connect to the different −48 v power return jumper lines 236 that connect to the power plant 28 shown in FIG. 1. A fourth row of terminals 213D are shorted to the immediately lower terminal 213C in the third row. The terminals 213D connect to associated −48 v return/positive power lines 142A in one of the power cables 20 that connect to the surge suppression unit 30 in FIG. 1.

Each lower row of terminals 213A, 213B, and 213C is set back from the immediately upper row. This allows a relatively large number of power terminals 213 to extend out the back end of the relatively short height of a 2RU frame 200.

Each separate vertical column of terminals 213A, 213B, 213C, and 213D is associated with the power cable 20 connected to a different radio 18 in FIG. 1. There are 12 terminal sets 213A-D that extend out the back of the terminal assembly 202 that can each connect to a different power cable 20 for powering a different one of the radios 18. For example, the first terminal set 213A-213D on the far left may be associated with a first power cable 20 that is connected to a first radio 18.

For effective surge suppression protection, surge suppression devices may be located relatively close to the protected electrical circuitry. The rack mountable power terminal assembly 202 provides a common connection location for the surge suppression devices to connect to different power lines and allows surge suppression devices to be closely mounted on the same rack 25 in FIG. 11 that contains DC power plant 28 and/or communication station 24. As also explained above, detachably connecting the tray 204 in FIG. 13 to the power terminal assembly 202 also allows the surge suppression modules in the tray 204 to be more easily connected and disconnected from different power lines.

The terminal assembly 202 provides unique "in-line" connectivity between the power lines 140A, 142A, 230, and 236 and the surge suppression modules in tray 204. The power lines 230 and 236 come into the terminal assembly 202 from the DC power plant 28. The power lines 140A and 142A go out from the terminal assembly 202 through the power cables 20 to the radios 18. This allows the surge suppression devices in tray 204 to receive power from the power lines 230 and 236 before the power is directed out through power lines 140A and 142A to the radios 18. This in-line feature prevents having to use "T" wiring configurations that are separately run from the power cables to the surge suppression devices. The in-line feature provides controlled, consistent, repeatable, and relatively close connectivity between the surge suppression devices in tray 204 and the DC power supply 28.

Figure 18:
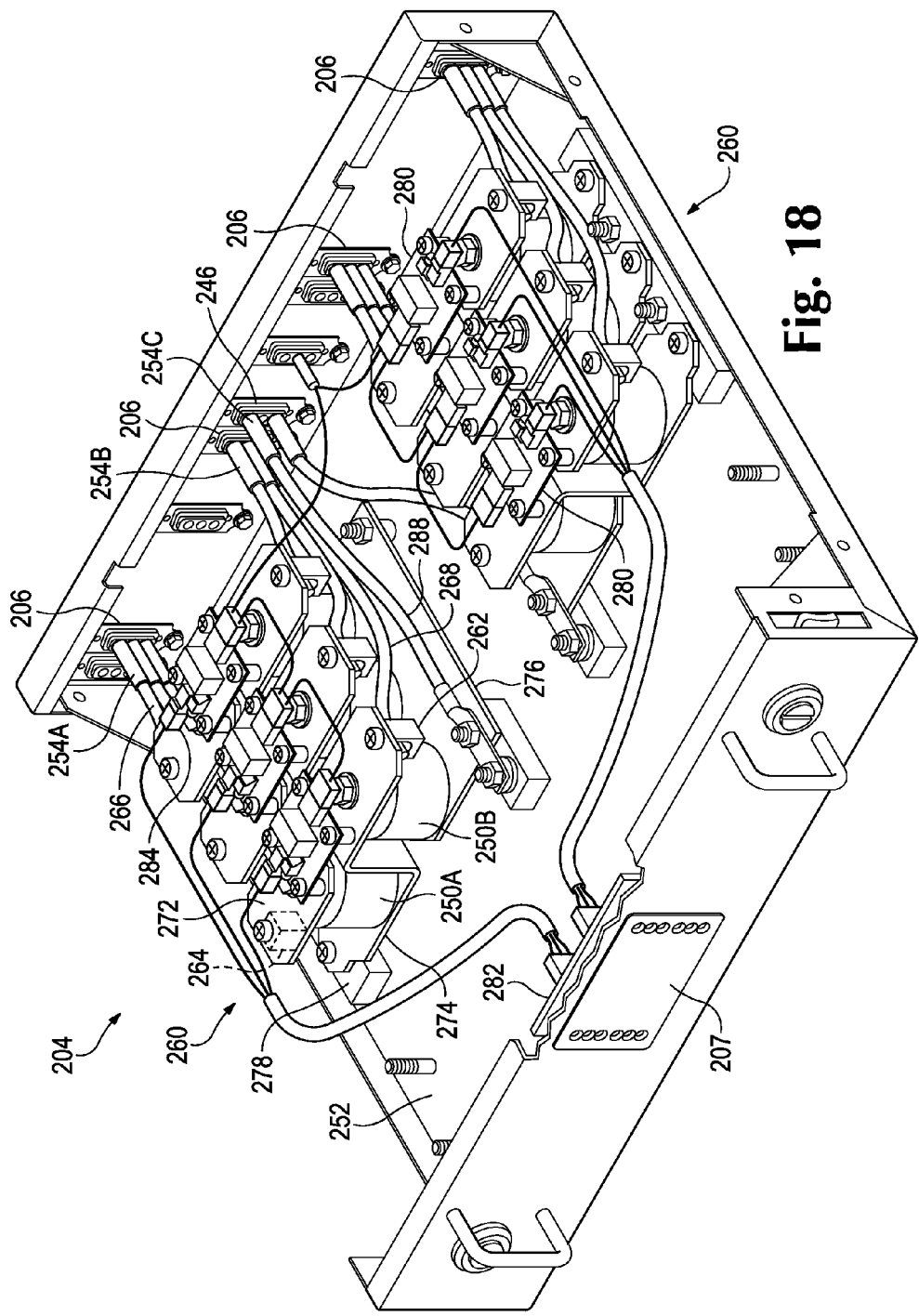
FIG. 18 is a perspective view of the surge suppression tray with a top hood removed.

FIG. 18 shows a front perspective view of the rack mountable tray 204 with a top hood removed. A bottom floor 252 holds two surge suppression modules 260 alternatively referred to as "six packs." The two surge suppression modules 260 each include three pairs of surge suppression devices 250A and 250B. In other configurations each module 260 could have more or fewer than three pairs of surge suppression devices 250. In one embodiment, the surge suppression devices 250 are the same as the surge suppression devices 100 used in the surge suppression unit 30 described above. However, other types of surge suppression devices can also be used.

The modules 260 are screwed down to the bottom floor 252 of tray 204. A first cable 266 has a first end connected to a terminal 264 and a second end that includes a pin or socket 254A that snaps into one of the connectors 206 that extend out the back of tray 204. A second cable 268 is connected at a first end to a terminal 262 and connected at a second end to a pin or socket 254B that inserts into another one of the connectors 206 that extend out the back of tray 204. The terminal 262 connects to a bus bar 274 that has a first portion that extends over a top end of surge suppression device 250B, a second portion that extends vertically up between surge suppression devices 250A and 250B, and a third section that connects to a bottom side of surge suppression device 250A.

Similar cables 266 and 268 are connected to the other pairs of surge suppression devices 250A and 250B that are contained within the same suppression module 260. A first end of a ground cable 288 connects to a ground bus bar 276. A second end of ground cable 288 includes a socket or pin 254C that snaps into the push connector 246 that extends out of the back end of the tray 204.

The blind mate in-line push connectors 206 extend out of a back end of the tray 204 and the pins or sockets 254 insert into or receive the blind mate in-line push connectors 226 that extend out from the back wall of the frame 200 as shown in FIG. 12. The blind mate in-line push connector 246 extends out of the back end of the tray 204 and connects with the blind mate in-line connector 228 that extends out the back wall of the frame 200 in FIG. 12. The connectors 206 and 246 can be easily modified with additional pins or sockets when additional surge suppression modules 260 are added to tray 204. Other types of connectors that allow easy attachment and detachment between the power terminal assembly 202 and tray 204 can also be used.

Only two surge suppression modules 260 are shown in FIG. 18. However the tray 204 can be quickly upgraded to add one or two more additional surge suppression modules 260 and provide surge suppression for an additional three or six power cables 20. The connectors 206 can receive the cables 266 and 268 for four different surge suppression modules 260. Each module 260 includes three pairs of surge suppression devices 250A and 250B that provide surge suppression for three different power cables. Thus, the tray 204 can provide surge suppression for twelve different power cables 20. Because the surge suppression devices 250 are configured in modules 260, six different surge suppression devices 250 (3 different pairs) can be removed or added to the tray 204 at the same time.

When the tray 204 is inserted into frame 200, the connectors 206 and 246 align and mate with the connectors 226 and 228, respectively, that extend out the back wall of frame 200 (FIG. 12). Thus, all of the surge suppression modules 260 and associated surge suppression devices 250A and 250B that are contained in tray 204 are connected to multiple different power lines all at the same time simply by plugging tray 204 into the power terminal assembly 202.

The monitoring circuits 280 are mounted between a bus bar 272 and bus bar 274 and connect to the top of each pair of surge suppression devices 250A and 250B. The monitoring circuits 280 are connected via clips 284 to a panel 282 that contains the LEDs 207 that extend out the front of tray 204 and identify the operational state for different pairs of surge suppression devices 250A and 250B.

The LEDs 207 on the front face of the tray 204 are activated when the surge suppression modules 260 are in a powered and operational state. Sets of three radios may be associated with a same frequency. Sets of three LEDs 207 can be associated with the three pairs of surge suppression devices connected to the three power cables 20 powering the three radios having the same frequency. Of course other LED and frequency configurations could also be used.

Figure 19:
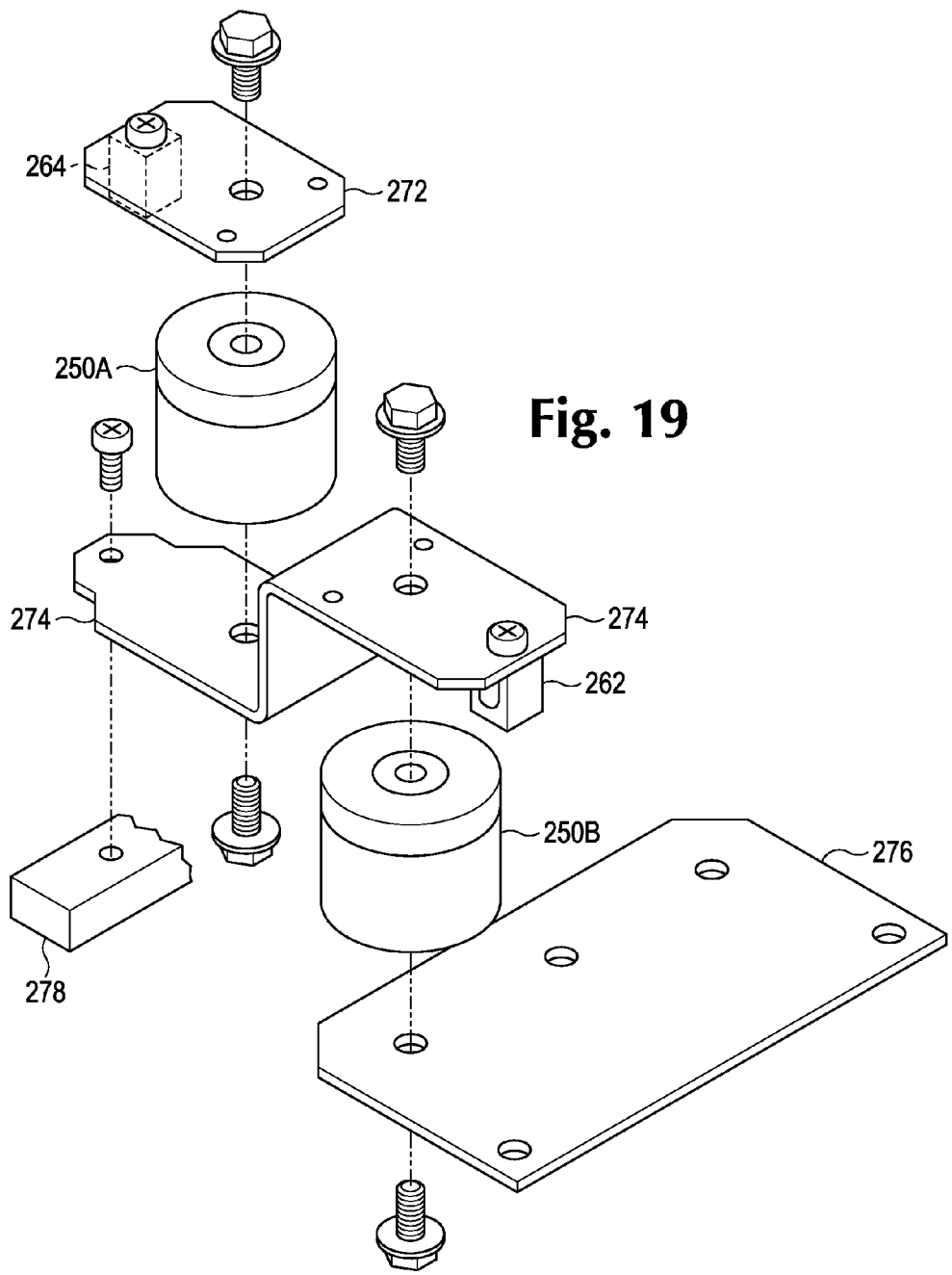
FIG. 19 is an exploded partial view of a surge suppression module located in the surge suppression tray.

FIG. 19 shows an exploded perspective view for one pair of surge suppression devices 250A and 250B in one of the surge suppression modules 260. The first bus bar 272 connects terminal 264 and one of the −48 v power lines 266 to the top end of surge suppression device 250A. The z-shaped second bus bar 274 connects horizontally to the bottom end of surge suppression device 250A, extends vertically up between surge suppression devices 250A and 250B, and then extends and connects horizontally to a top end of surge suppression device 250B. The second bus bar 274 also connects to one of the return power lines 268 in FIG. 18 through terminal 262. The ground bus bar 276 is connected to the bottom end of surge suppression device 250B and mechanically holds together the three pairs of surge suppression devices in the surge suppression module 260. A mounting bar 278 attaches to the bottom of bus bar 274 and also holds the three pairs of surge suppression devices 250 in the module 260 together.

Figure 20:
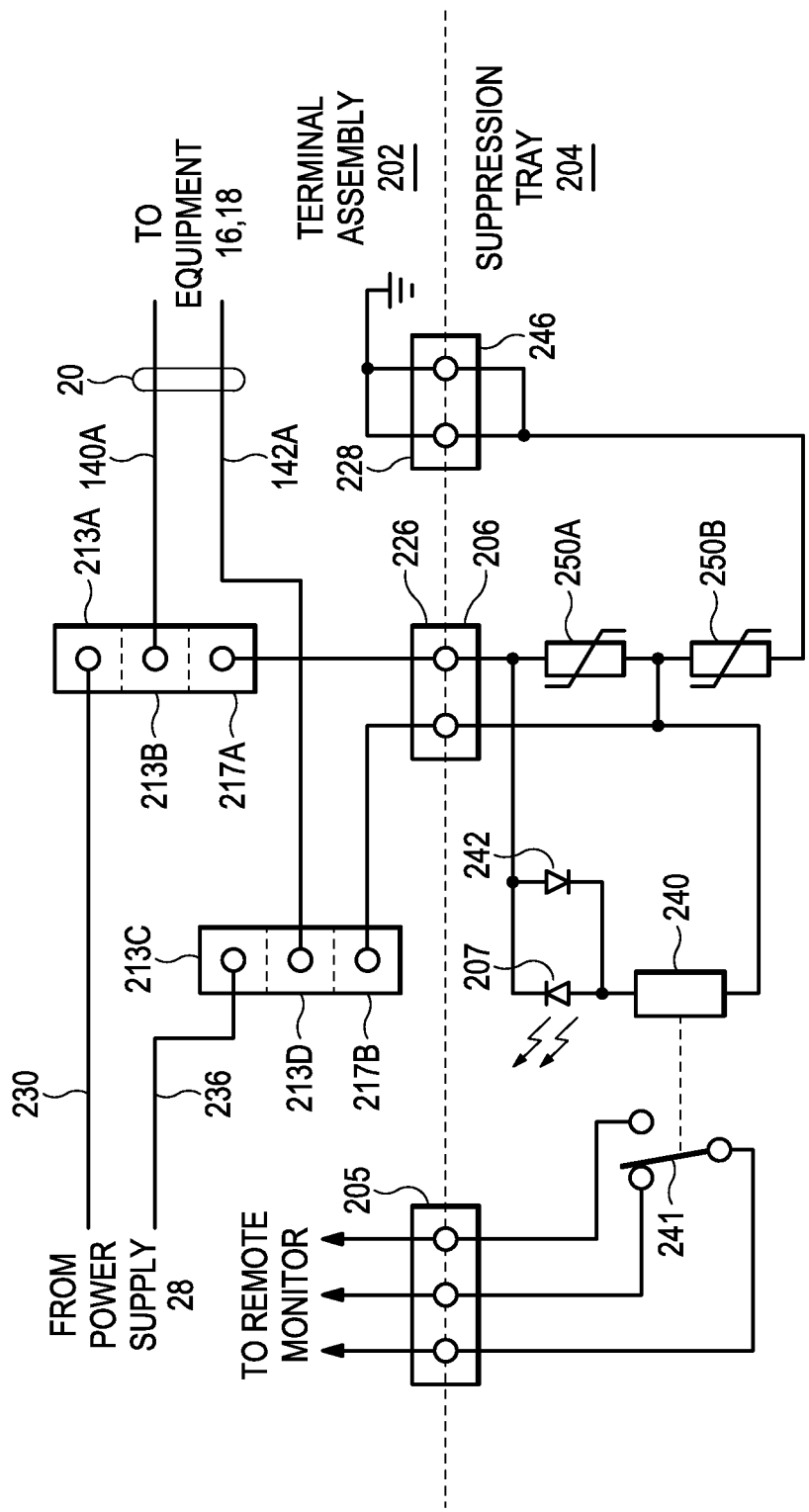
FIG. 20 is a schematic diagram for the surge suppression modules of FIG. 19.

FIG. 20 is a schematic diagram that shows in more detail how the different components in the surge suppression unit 40 are connected together. FIG. 20 shows surge suppression circuitry and mechanical connections for one pair of surge suppression devices for connecting to one power cable 20. However, any number of surge suppression devices 250 and corresponding surge suppression circuits similar to that shown in FIG. 20 can be contained in tray 204.

The power lines 230 and 140A connect to the terminals 213A and 213B, respectively. As mentioned above, the two terminals 213A and 213B are shorted together. A connector rod 217A connects a back end of the terminal pair 213A and 213B to a pin or socket in one of the connectors 226 that extends out from the back wall of frame 200. The power lines 236 and 142A connect to terminals 213C and 213D, respectively. A second connector rod 217B connects the back of the terminals 213C and 213D to another socket or pin in one of the connectors 226.

A first end of the surge suppression device 250A connects to the −48 v power line from connector rod 217A. A second end of surge suppression device 250A connects to a first end of the second surge suppression device 250B, the return voltage from connector rod 217B, and one end of a relay 240. A second end of surge suppression device 250B connects to ground via the connectors 246 and 228. A second end of the relay 240 connects back to the −48 voltage line through one of the LEDs 207 and a rectifier 242. The relay 240 includes a switch 241 in a first state. The LED 207 is activated when the circuit is powered by the power lines and the surge suppression device 250A is in a normal open operating state. The relay switch 241 is daisy chained with the relays from the other surge suppression monitoring circuits 280 connected to other surge suppression circuits. The relay 240, switch 241, and other alarm circuitry 207 and 242 are located on the alarm board 280 in FIG. 18.

When the surge suppression device 250A fails due to a short-circuit condition or power is removed from the circuit, the relay switch 241 switches to a second state causing connections on alarm socket 205 to open or disconnect a circuit that indicates a failure condition. The surge suppression unit 30 shown above in FIGS. 1-10 may have similar surge suppression circuitry as shown in FIG. 20. However, other electrical circuit configurations could also be used.

Alternative Embodiment of External Surge Suppression Unit

Figure 21:
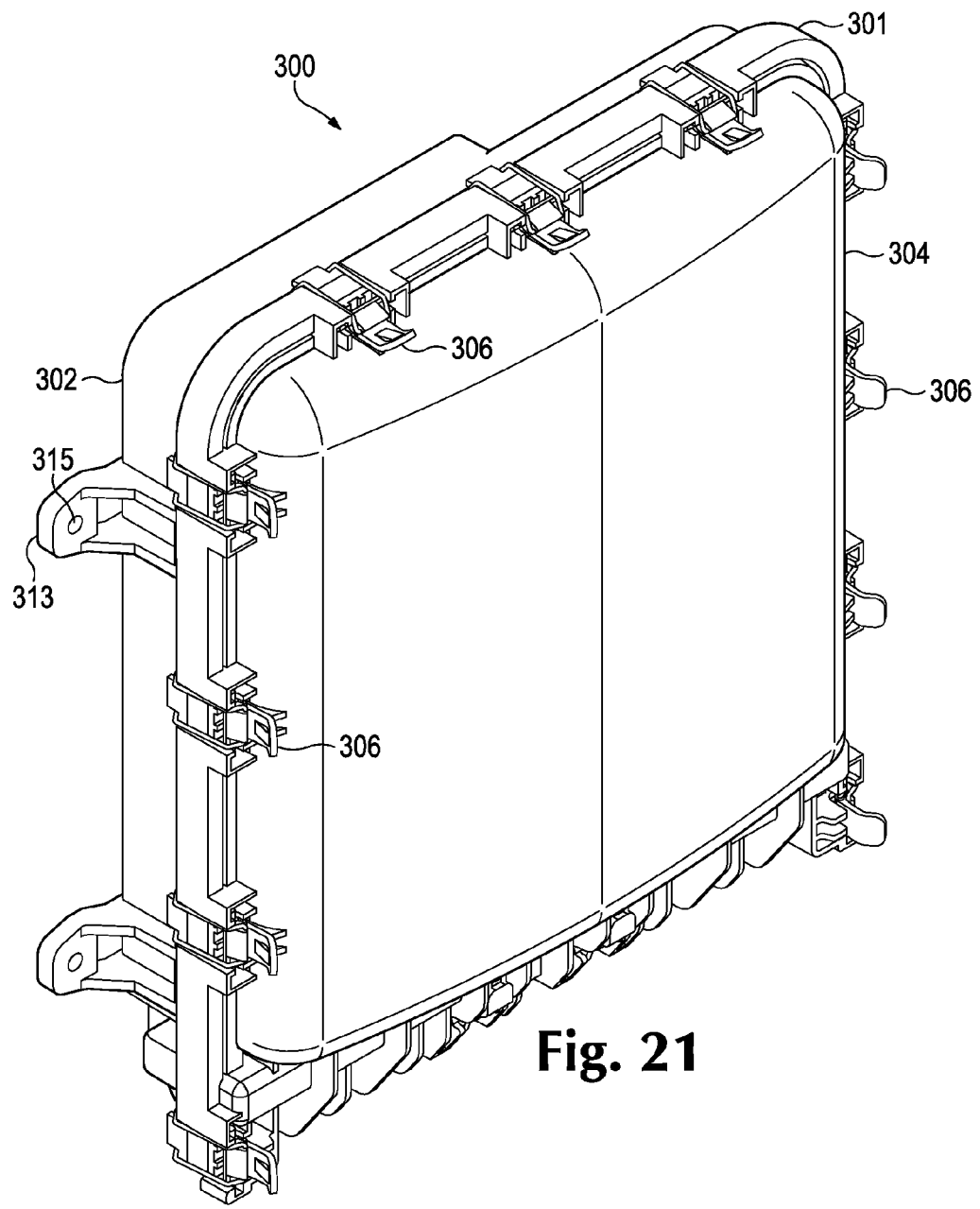
FIG. 21 shows an alternative embodiment of a rectangular shaped external surge suppression unit used in the surge suppression system of FIG. 1.

FIG. 21 shows an alternative embodiment of the external surge suppression unit described above in FIG. 1. A surge suppression unit 300 has a relatively flat rectangular profile and can be located at any of the locations described above for surge suppression unit 30. In one example, the surge suppression unit 300 has a weather resistant enclosure 301 made from a polymeric material, such as plastic or semi-flexible polyvinyl chloride (PVC) material. However, the enclosure 301 may also be made out of metal or any other water resistance rigid or semi-rigid material.

Enclosure 301 includes an enclosure cover 304 configured to attach to an enclosure base 302. The enclosure base 302 includes mounting arms 313 that extend out from a back end and include holes 315 for receiving screws or bolts for securing the enclosure 301 to a wall, tower, or any other support structure. In one embodiment, the mounting arms 313 may be attached to a mounting bracket (not shown) that then mounts to the tower 14 or other support structure 72 shown in FIG. 1.

Latching mechanisms 306 are located around an outside perimeter of the enclosure 301 and are configured to attach the enclosure base 302 in a watertight compression fit with the enclosure cover 304. The latching mechanisms 306 allow the enclosure cover 304 to be removed from base 302 without the use of tools. For example, latching mechanisms 306 can be locked or unlocked by hand by a technician. The aerodynamically rounded corners of the enclosure 301 reduce wind load and the relatively flat profile allow attachment in confined areas while also providing a substantial amount of interior area for retaining surge suppression and fiber optic equipment.

Figure 22:
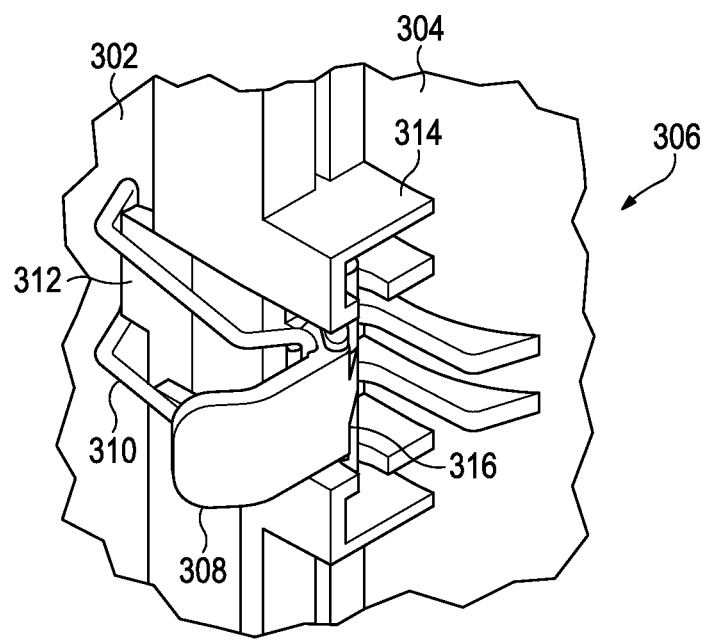
FIGS. 22 and 23 shows a latching mechanism used with the surge suppression unit of FIG. 21.
Figure 23:
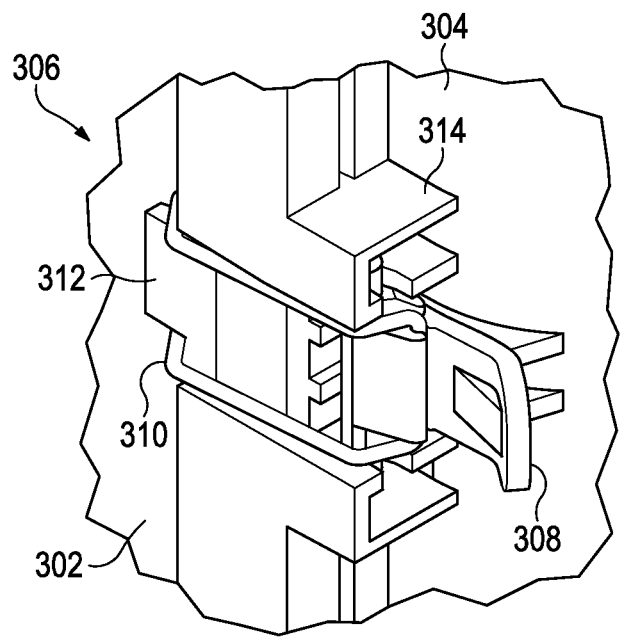

FIG. 22 shows one of latching mechanisms 306 in an unlocked position and FIG. 23 shows the latching mechanism 306 in a locked position. Latching mechanism 306 includes a retaining member 312 that extends back away from a front face of the enclosure base 302. A lever 308 is rotatably attached to a support member 314 formed on the edge of enclosure cover 304. The support member 314 is integrally formed in the enclosure cover 304 and includes slots for receiving an axle 311 attached to a back end of lever 308. A wire latch 310 is rotatably attached to the lever 308. The wire latch 310 is configured to attach around the retaining member 312 and lever 308 is configured to rotate about axle 311 and away from the front face of the enclosure cover 304 and pull the wire latch 310 tight against retaining member 312.

In another embodiment, retaining member 312 may be formed on the front face of the enclosure cover 304 and the lever 308 is pivotally attached to the front face of the enclosure base 302. As shown below, the latch mechanisms 306 hold the front face of the enclosure cover 304 in compression against the front face of enclosure base 302 insulating an internal compartment of the enclosure 301 from external weather conditions.

Figure 24:
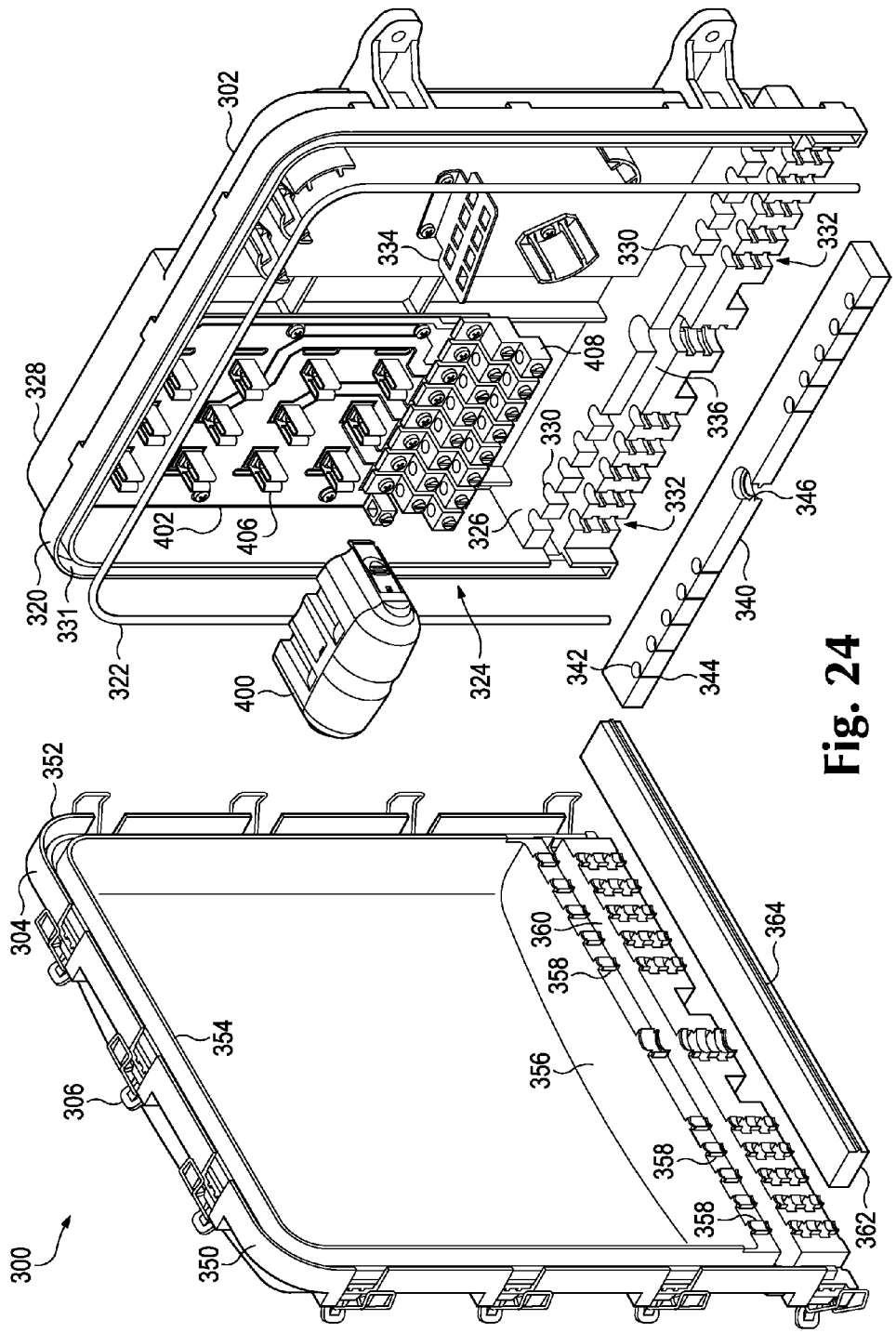
FIG. 24 shows an exploded view of the surge suppression unit in FIG. 21.

FIG. 24 shows an exploded view of the surge suppression unit 300. A first section of an internal compartment 324 of enclosure base 302 includes a left hand section 328 of compartment 324 is set back from a right hand section and configured to retain a printed circuit board 402. The printed circuit board 402 is attached to clips 406 that connect to surge suppression modules 400. A terminal strip 408 is connected to a bottom end of circuit board 402 and is configured to connect to power cables. The right hand section of compartment 324 contains a tray 334 configured to retain fiber optical cables.

A channel 331 is formed in and extends around a top end and sides of a front face 320 of enclosure base 302. A gasket 322 inserts into channel 331 and also extends along the top end and sides of front face 320. Enclosure cover 304 includes a first outer lip 352 and a second inner lip 354 that each extends around a top and sides of a front face 350.

When enclosure cover 304 is attached to enclosure base 302, the outer lip 352 extends over and around the top and sides of the front face 320 of enclosure base 302 and the inner lip 354 inserts into the channel 331 formed in the front face 320 of enclosure base 302. Attaching the latches 310 to retaining members 312 and rotating the latch mechanisms 306 into their locked position further moves the inner lip 354 further into channel 331 compressing against gasket 322.

Ports 330 extend longitudinally up through a bottom wall 326 from an exterior side of the enclosure base 302 to an interior side of the enclosure base 302. The ports 330 form elongated vertical slots 332 in a front face of bottom wall 326 and are configured to receive power cables and/or fiber optic cables. A channel 336 extends horizontally along the front face of bottom wall 326 and through ports 330 and is configured to receive a gasket 340. The gasket 340 includes holes 342 that align with the ports 330 when the gasket 340 is inserted into channel 336. Slits 344 extend through a front surface of gasket 340 and into the holes 342. In one example, ridges 346 extend around an inside circumference of some or all of the holes 342. The wall 326 while shown at the bottom of enclosure base 302 may alternatively be located on one of the sides or top of enclosure base 302.

The enclosure cover 304 may include a bottom wall 356 configured to abut up against the bottom wall 326 of enclosure base 302 and cover the slots 332. The bottom wall 356 includes arched retention members 358 that extend through the slots 332 and into ports 330 formed in the bottom wall 326 of enclosure base 302. A gasket 362 is configured to insert into a channel 360 that extends horizontally along the length of bottom wall 356. A ridge 364 extends out from a front surface of gasket 362. The ridge 364 compresses against a front surface of gasket 340 when the enclosure cover 304 is attached to enclosure base 302.

Figure 25A:
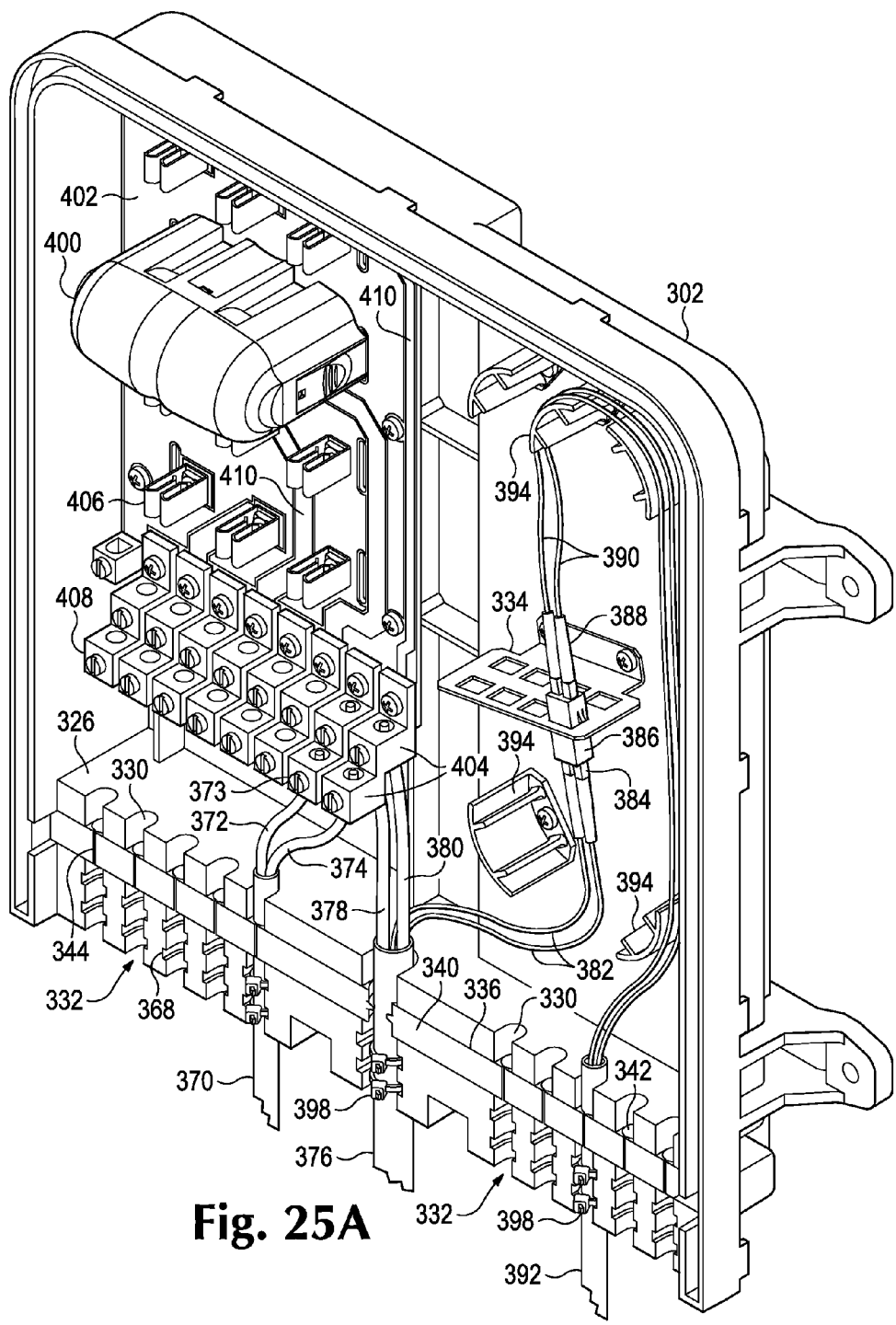
FIG. 25A shows a perspective view of an enclosure base of the surge suppression unit of FIG. 21.

FIG. 25A shows an isolated view of the enclosure base 302. The surge suppression module 400 is shown installed on the printed circuit board 402 and tray 334 is shown retaining fiber optic cables 382 and 390. The gasket 340 is also shown inserted into the channel 336 formed in bottom wall 326.

A cable 376 is inserted laterally from the side through one of slots 332 and through the slits 344 and into one of the holes 342 in gasket 340 and ports 330 in bottom wall 326. In one example, the port 330 receiving cable 376 may be larger than other ports 330 configured to receive power cables 370 and/or fiber optic cables 392. In at least one example, cable 376 may contain both power cables 378 and 380 and fiber optic cables 382 connected at a far end to the power plant 28 and BTS 24, respectively, shown in FIG. 1. In other embodiments, the port 330 receiving cable 376 may be the same size as other ports 330 and cable 376 may be the same size as the other cables 370 and/or 392. In another embodiment, a larger center port 330 may not be formed in bottom wall 326.

The cable 370 is inserted into port 330 and seats snugly into one of the gasket holes 342 aligned with the port 330. Channels 368 may be formed into and around inside walls of the ports 330 and may be configured to receive ties 398 for wrapping around cables 370, 376, and 392. The ties 398 secure the cables 370, 376, and 392 into ports 330 and can also serve as strain reliefs that distribute retention force of the enclosure 301 against different locations on the cables 370, 376, and 392.

Power cables 378 and 380 attach to two of the upper terminals 404 on terminal strip 408. The terminals 404 include screws 373 that secure the power cables within terminal holes. The terminals 404 are connected to the surge suppression modules 400 through etched conductor busses 410 on circuit board 402. The two immediately lower terminals 404 on terminal strip 408 connect to two jumper power cables 372 and 374 that are contained within cable 370 and connect to a radio 18 on tower 14 as shown in FIG. 1. Cable 370 slides laterally from the side through one of slits 344 in gasket 340 and through slot 332 into one of the ports 330 and gasket holes 342 located on the left side of bottom wall 326 in a similar manner as cable 376.

Fiber optic cables 382 in cable 376 include connectors 384 that connect to an adapter 386 that is held in tray 334. A first far end of the fiber optic cables 382 are attached to the communication station 24 in building 32 of FIG. 1. A second near end of the fiber optic cables 382 attach to the connectors 384 that insert into adapter 386. A first near end of fiber optic jumper cables 390 are attached to connectors 388 that insert into a second end of adapters 386. A second far end of the fiber optic jumper cables 390 connect to the ratios 18 on the top of tower 14 as shown in FIG. 1. The fiber optic jumper cables 390 may wrap partially around bend control supports 394 that extend out from the back wall of enclosure base 302.

Several of the fiber optic jumper cables 390 may be contained within cable 392 that also inserts from the side through one of the slits 344 and slots 332 and into an associated port 330 and gasket hole 342 on the right side of bottom wall 326 in enclosure base 302. In other embodiments, the ports 330 may be different diameters to receive different sizes of cables 370, 376, and/or 392.

At least in one example, a first set of ports 330 on the left side of bottom wall 326 are used for retaining the power cables 370 and a second set of ports 330 on the right side of bottom wall 326 are used for retaining fiber optic cables 392. However, the power cables 370 and fiber optic cables 392 may be inserted into any of the ports 330. In other embodiments, there may be more or fewer ports 330 than shown in FIG. 25A. In another embodiment, ports 330 may be formed on the sides or top end of enclosure base 302.

Figure 25B:
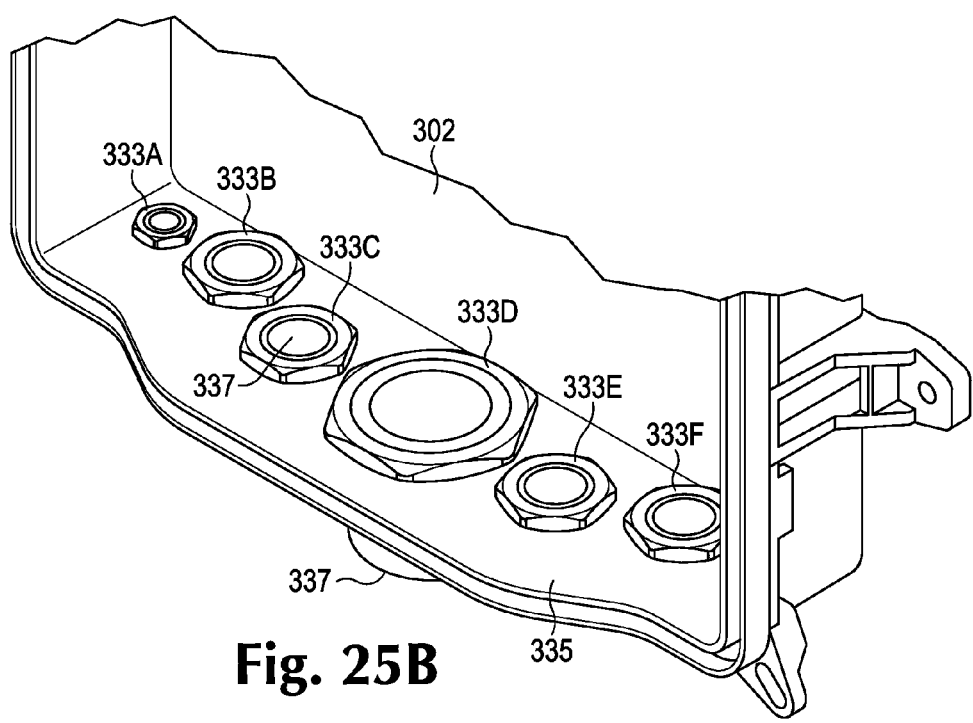
FIG. 25B shows a perspective view of an alternative port based version of the enclosure base of the surge suppression unit of FIG. 21.

FIG. 25B shows an alternative embodiment of the enclosure base 302. The upper portion of the enclosure base 302 may be similar to what is shown in FIG. 25A. However, in this embodiment, port holes 333 extend completely through a bottom wall 335 of enclosure base 302. Plastic conduit 337 may attach into port holes 333 similar to what was previously shown in FIG. 6.

Any number and variety of sizes of port holes 333A-333F may extend through bottom wall 335. At least in one example, a first set of ports 333A-333C on the left side of bottom wall 335 may be used for retaining the power cables 370 shown in FIG. 25A and a second set of ports 333E and 333F on the right side of bottom wall 335 may be used for retaining fiber optic cables 392 shown in FIG. 25A. A larger port hole 333D in the center of bottom wall 335 may be used for retaining the cable 376 that contains power cables 378 and 380 and fiber optic cables 382 previously shown in FIG. 25A. However, the power cables 370 and fiber optic cables 392 may be inserted into any of the ports 333. In other embodiments, there may be more or fewer port holes 333 than shown in FIG. 25B. In another embodiment, ports holes 333 may be formed on the sides or top end of enclosure base 302.

FIG. 26 is a partial cut-away view of the bottom wall 326 of enclosure base 302 and the bottom wall 356 of enclosure cover 304. As described above in FIG. 25A, a power cable 370 inserts through a slot 332 formed in bottom wall 326 and laterally into port 330. The power cable 370 also inserts laterally through the slit 344 and into one of the gasket holes 342. The ties 398 are wrapped and synched around the power cable 370. In one example, the ties 398 may be plastic zip ties that automatically lock when synched together. Ties 398 are known and therefore not described in further detail.

Figure 27:
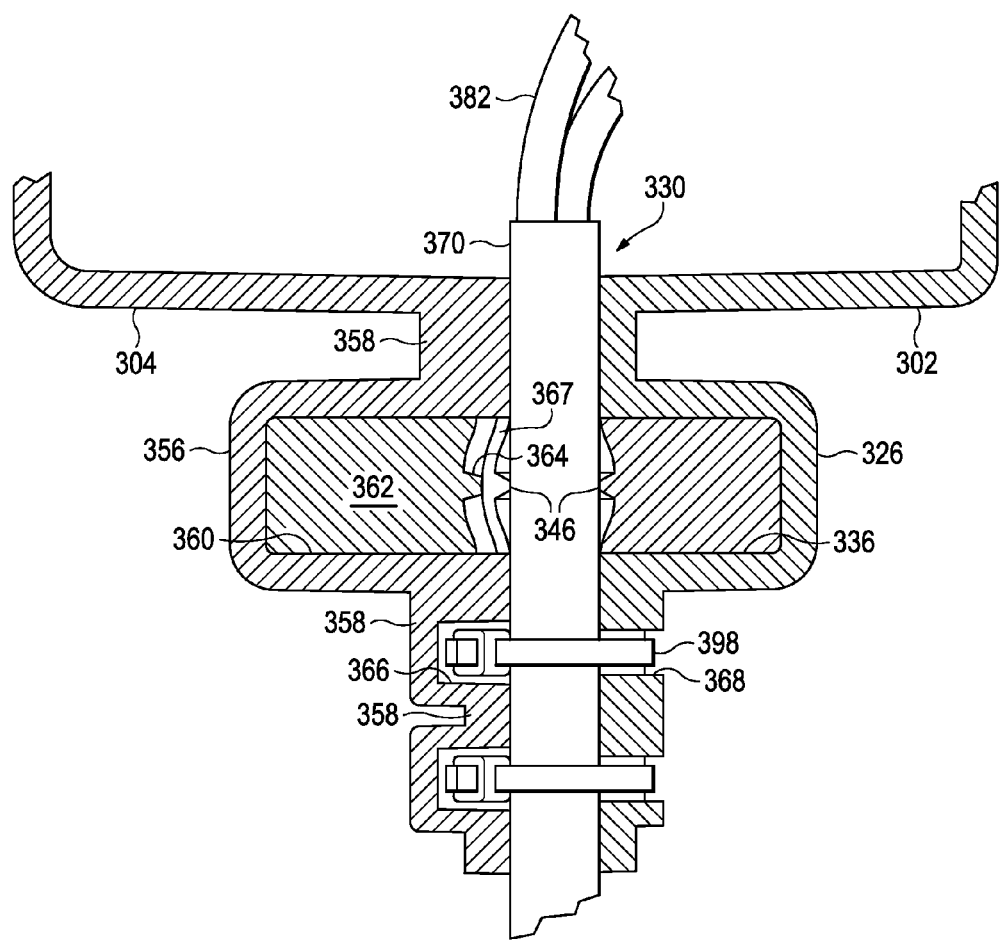
FIG. 27 is a sectional elevation view of the bottom walls shown in FIG. 26.

FIG. 27 is a side-section elevation view of the port 330 retaining power cable 370. Referring to FIGS. 26 and 27, enclosure cover 304 attaches over enclosure base 302 and the front face of bottom wall 356 abuts up against a front face of bottom wall 326. In the closed position the bottom wall 356 holds the cables 370 snugly inside of port 330. For example, holes 366 fanned in the front face of bottom wall 356 receive the attaching ends of ties 398 and allow the retention members 358 to extend into ports 330 and press against cable 370.

To further hold the cable 370 inside of port 330 and provide a weather tight seal, the ridge 364 formed in gasket 362 presses against outer flaps 367 of gasket 336 and across slit 344. In one example, top and bottom ends of the flaps 367 compress back and against the front side of the cable 370 while the ridge 346 extending around the inside surface of gasket hole 342 compresses around cable 370 at a third center location. The multiple contact locations of gasket 336 further increase the number of barrier contact points between the external environmental conditions outside of enclosure 301 and the internal compartment 324 of enclosure 301.

Figure 28A:
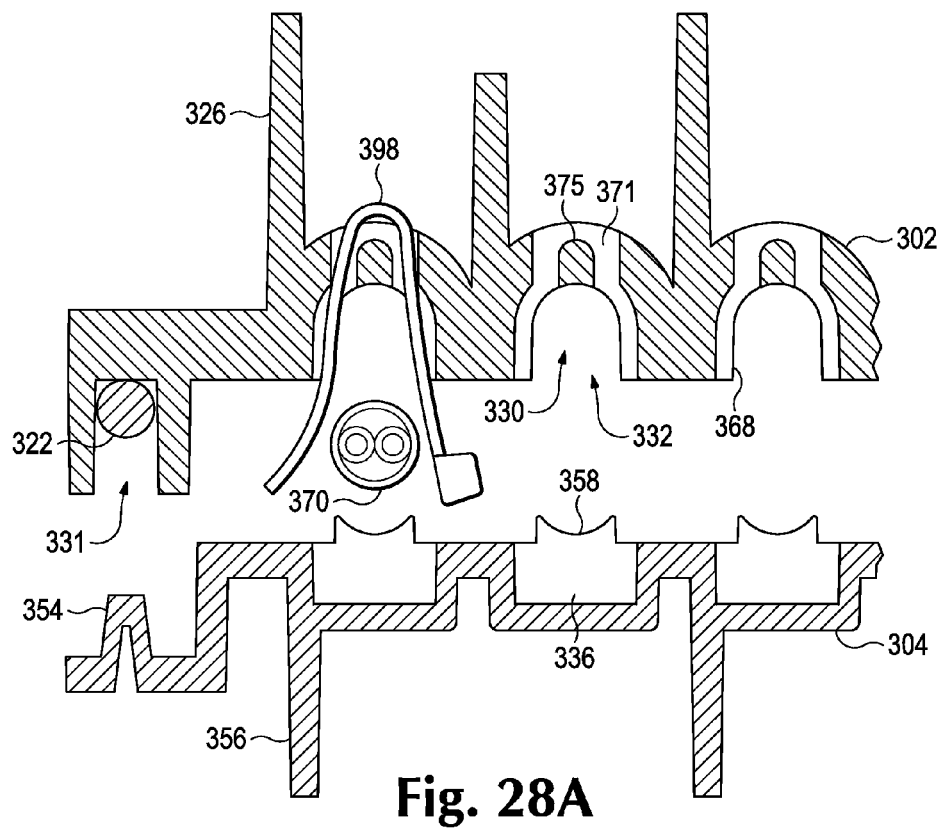
FIGS. 28A and 28B are sectional plan views of ports extending through the bottom walls.

FIG. 28A is a partial sectional plan view of the port 330 retaining cable 370 showing the enclosure cover 304 detached from enclosure base 302. The channels 368 extend around interior side walls and into a back wall of the ports 330. A tunnel 371 extends into the back wall of ports 330 forming a post 375. The tie 398 is inserted into tunnel 371 and wrapped around post 375. The tie 398 sits recessed in port 330 and the cable 370 is then inserted into port 330 and the ends of tie 398 synched together. When synched, the tie 398 pulls the cable 370 into port 330 and against a front face of post 375.

Figure 28B:
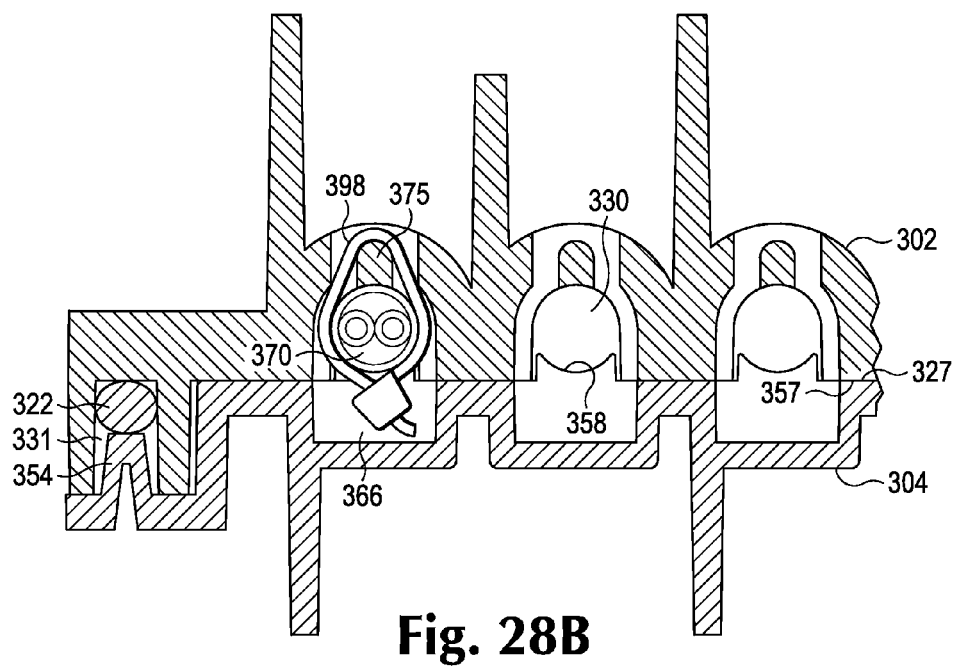

FIG. 28B is a sectional plan view of the port 330 with the enclosure cover 304 attached to enclosure base 302. The front face 357 of enclosure cover 304 presses up against the front face 327 of enclosure base 302. The inner lip 354 of enclosure cover 304 inserts into channel 331 and presses against gasket 322. The tie 398 is shown in a full synched position holding cable 370 against the inside wall and post 375 inside of port 330. The holes 366 in enclosure cover 304 receive and contain the ends of tie 398 and the retention members 358 extend into ports 330 and press against power cables 370.

Figure 29:
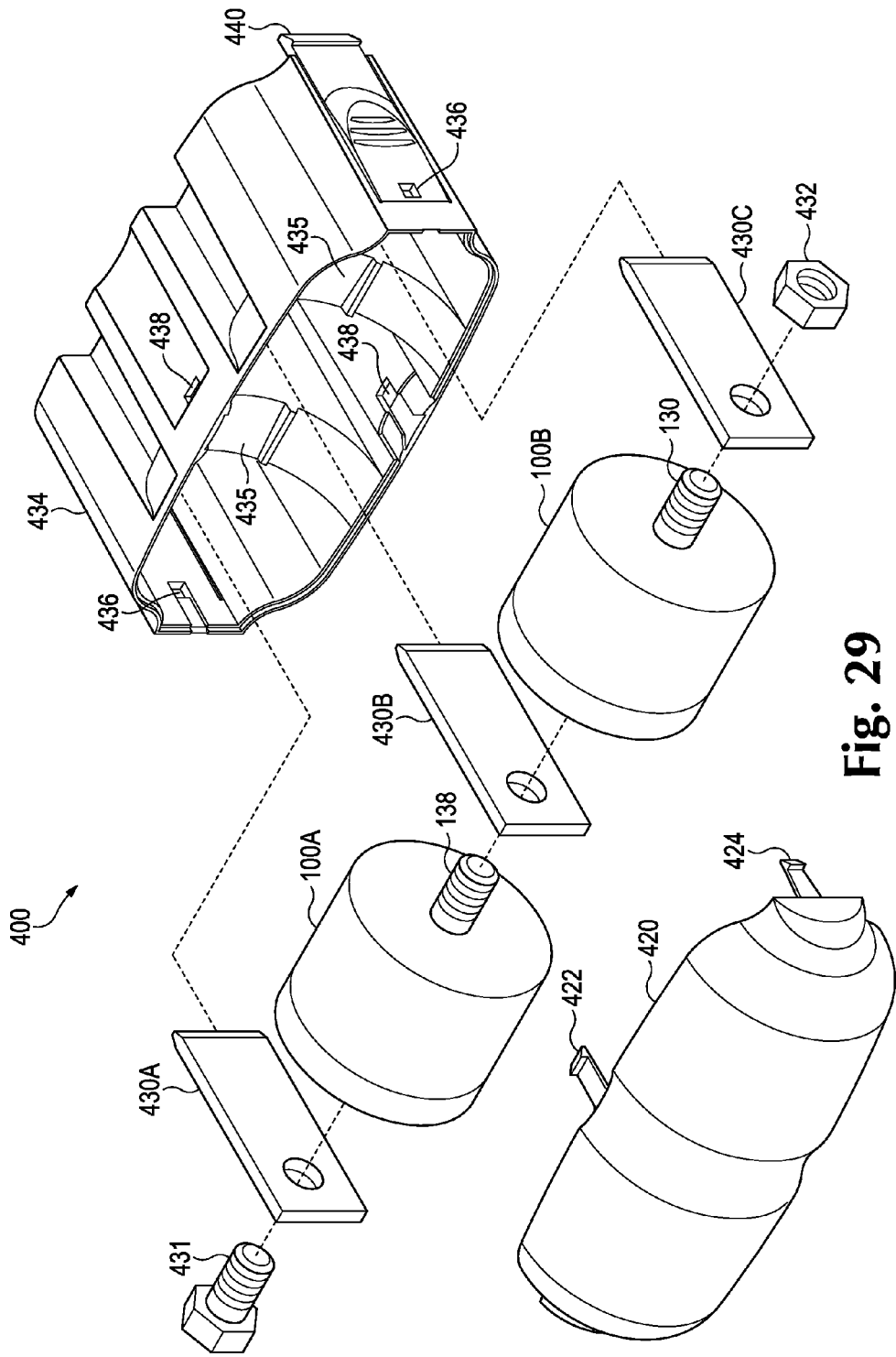
FIG. 29 is an exploded view of a surge suppression module contained in the surge suppression unit of FIG. 21.

FIG. 29 shows an exploded perspective view for one of the surge suppression modules 400. A bolt 431 couples a bus bar 430A to a first end of a surge suppression device 100A. A connection member 138 extends out a second end of surge suppression device 100A and inserts through a hole in a second bus bar 430B and into a threaded hole on a first end of a second surge suppression device 100B. A second end of surge suppression device 100B includes a connection member 130 that inserts through a hole in a third bus bar 430C and threadingly engages with a nut 432.

The surge suppression devices 100A and 100B may be similar to the surge suppression devices 100 described in FIG. 4 and/or surge suppression device 250 described in FIG. 10. However, other types of surge suppression devices could also be used. The bus bars 430 in one example have a substantially flat rectangular profile and may have oppositely inclining sides at a bottom end forming a wedge.

A mounting base 434 has an oval cross-sectional shape and is configured to receive surge suppression devices 100. Two semi-circular mounting supports 435 have a shape and size similar to the circular outside shape of surge suppression devices 100 allowing the two surge suppression devices 100 can sit or snap into the supports 435. The mounting base 434 may be made from a polymeric material and may include two clips 440 that extend down from opposite lateral sides.

A mounting cap 420 extends over surge suppression devices 100 and connects to mounting base 434. Cap 420 includes clips 422 that extend down from a front and back side and insert into holes 438 formed on the first and back sides of mounting base 434. Two clips 424 extend down from the lateral sides of cap 420 and insert into holes 436 formed on the lateral sides of mounting base 434.

Figure 30:
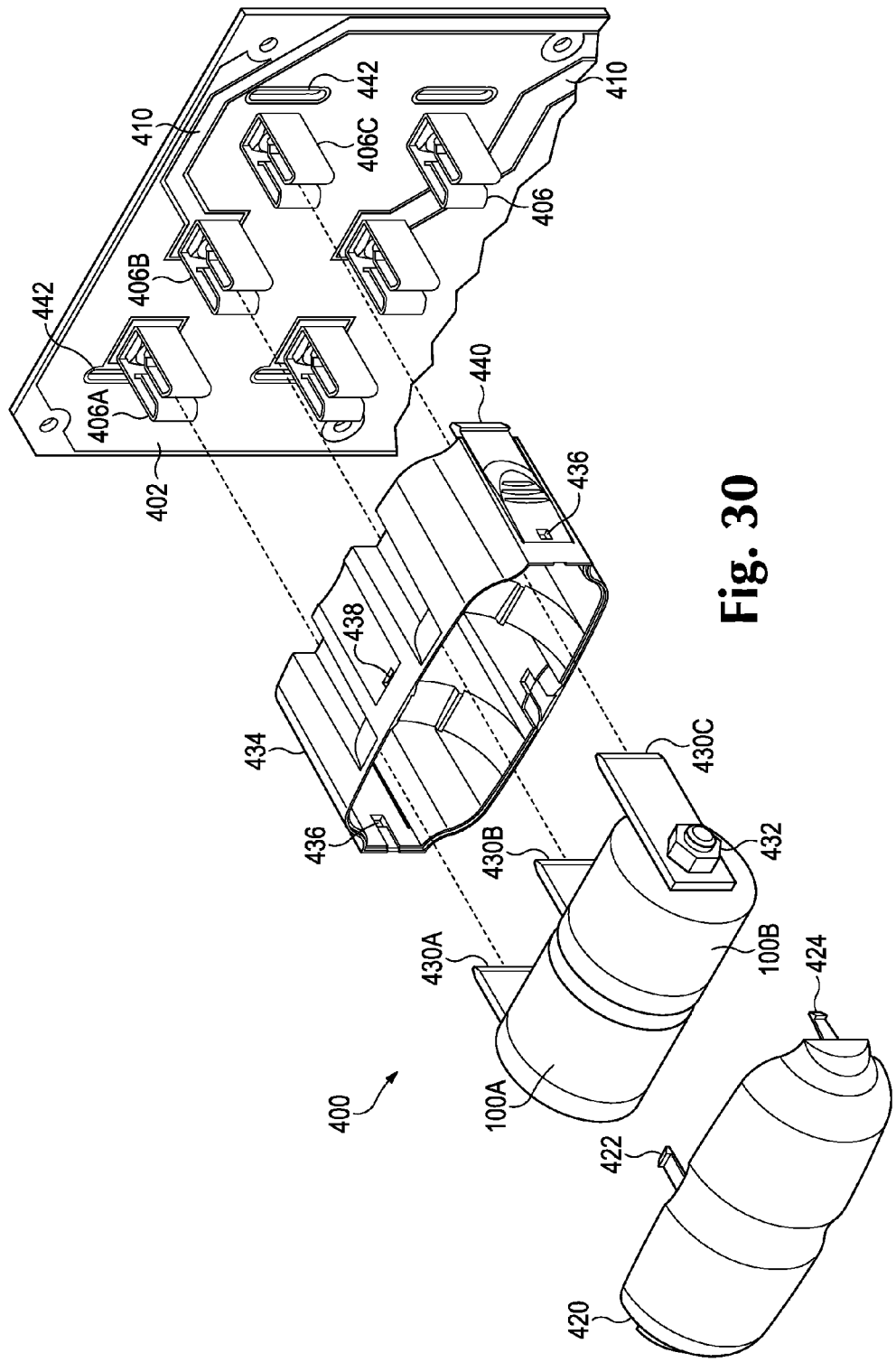
FIG. 30 is an exploded view of a surge suppression module of FIG. 29.

FIG. 30 is an exploded perspective view of the surge suppression module 400 with the two surge suppression devices 100A and 100B shown attached together. The clips 440 are configured to bend inward and insert into slots 442 in the printed circuit board 402 of FIG. 30. The two clips 440 are then released and spring back outward against the slots 442. The bus bars 430A-430C extend down though a bottom end of mounting base 434 and insert into clips 406A-406C, respectively, extending up from printed circuit board 402. The cap 420 attaches onto the top of mounting base 434 and covers surge suppression devices 100A and 100B. The clips 422 snap into holes 438 in mounting base 434 and clips 424 snap into holes 436 in mounting base 434.

Figure 31:
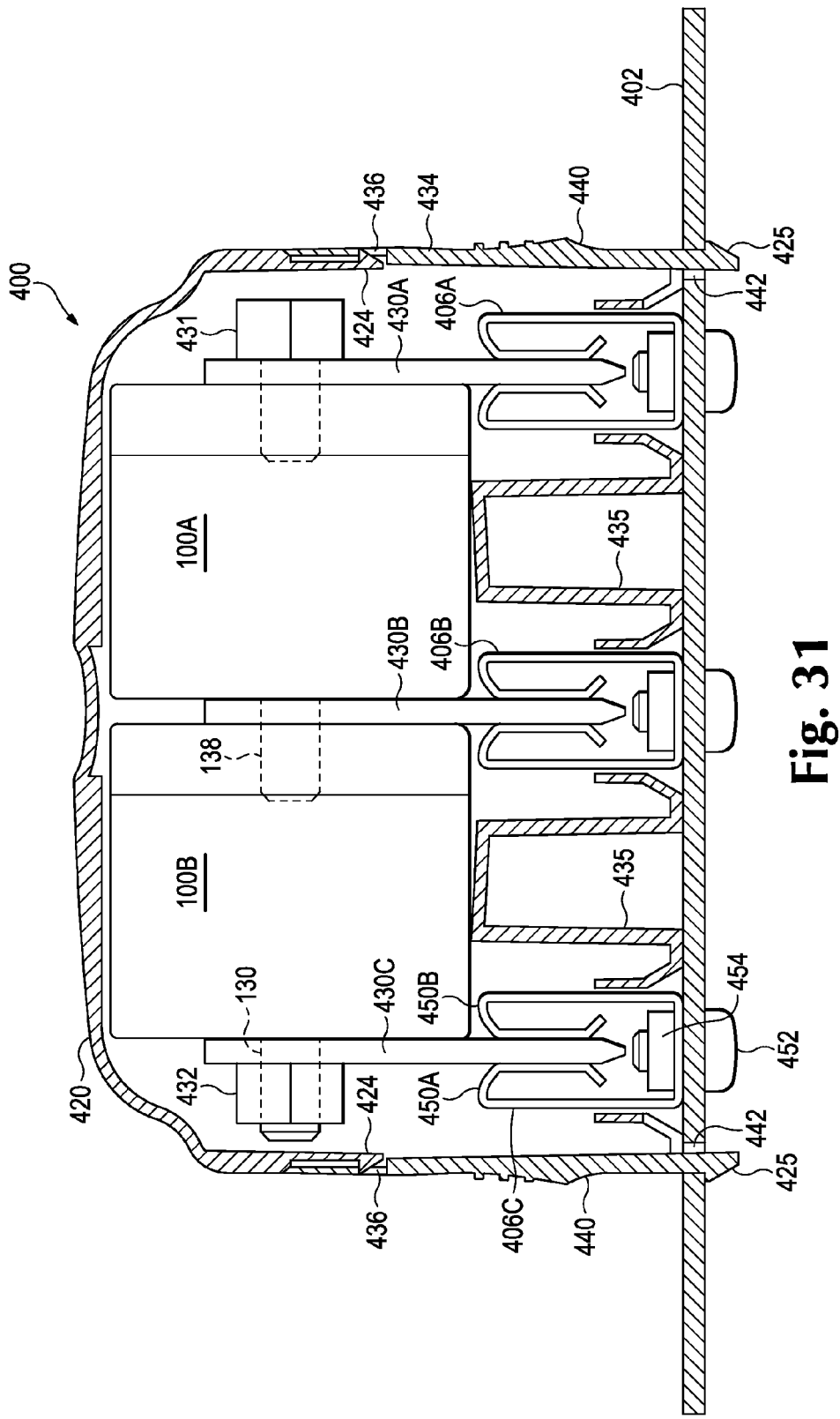
FIG. 31 is front sectional view of the surge suppression module.

FIG. 31 is a front elevational sectional view of the surge suppression module 400. The clips 406 are mounted to the printed circuit board 402 with screws 452 and nuts 454. The clips 406 extend up from the printed circuit board 402 and include opposing arms 450A and 450B that receive and hold press against opposite sides of a bottom end of bus bars 430.

The surge suppression devices 100A and 100B are inserted into mounting base 434 before, during or after the mounting base 434 is attached to circuit board 402. The surge suppression devices 100A and 100B, and bus bars 430, insert down into the mounting base 434 until the bottom sides of the surge suppression devices 100A and 100B abut against the top of mounting supports 435. Clips 424 press slightly inward while cap 420 is attached onto the top of mounting base 434. The bottom ends 436 of clips 424 insert into the holes 436 and spring slightly outward locking the mounting cover 420 to the mounting base 434.

The surge suppression module 400 is plugged into the circuit board 402 by pressing the clips 440 inward and inserting the clips into slots 442 in printed circuit board 402. While inserting clips 440 into circuit board 402, the bottom ends of bus bars 430 extend down in-between spring arms 450A and 450B pushing the two arms 450 outward. The clips 440 are released and spring outward pressing against an outer side of the slots 442. Latches 425 on the bottom end of clips 440 sit against a bottom side of the printed circuit board 402 and hold the mounting base 434 to the printed circuit board 402.

The entire surge suppression module 400 can be attached and detected to and from printed circuit board 402 without any tools. For example, to remove surge suppression module 400, the clips 440 are pressed inward and the bottom ends 425 lifted up and out of slots 442. The surge suppression devices 100A and 100B are lifted upward by supports 435 and the bottom ends of bus bars 430 are similarly lifted up and out from in-between the opposing springs aims 450A and 450B of clips 406. Thus, an operator simply has to squeeze and lift the sides of the mounting base 434 in order to detach the surge suppression module 400 from printed circuit board 402.

Modular Rack Mountable Surge Suppression Unit

Figure 32:
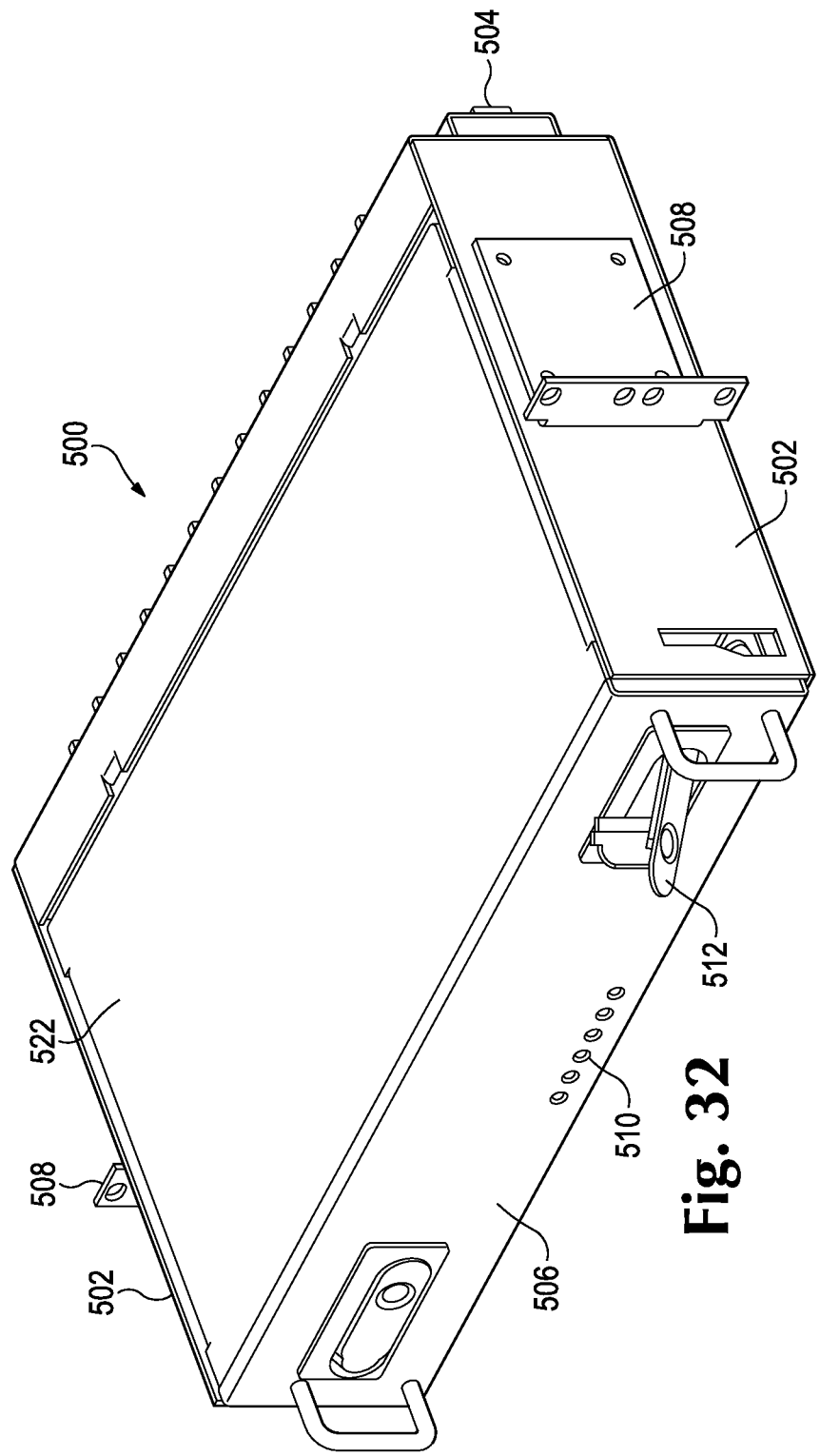
FIG. 32 shows a rack mountable surge suppression unit.

FIG. 32 shows a front perspective view of an alternative embodiment of a rack based surge suppression unit 500. The surge suppression unit 500 includes a frame 502 that connects to a rack or support structure. The rear end of the frame 502 supports a power connection panel 504 and a front end of the frame 502 supports a surge suppression tray 506. The front of the surge suppression unit 500 includes a series of light emitting diodes (LEDs) 510 that are activated based on the operational state of surge suppression devices contained in the tray 506. Handles 511 on a front side of the tray 506 are used for locking the tray 506 to the mounting frame 502.

Mounting brackets 508 attach at the front, back, or middle sides of the frame 502 and attach to the rack or other support structure 25 shown in FIG. 2. For example, a first set of brackets 508 may be used at a first location for a 19 inch rack and a second different set of brackets 508 may be used at a second location for a 23 inch rack.

The surge suppression unit 500 has the advantage of having a conventional Rack Unit (RU) form factor that in one embodiment is a 2RU housing 522 that can fit into a 19 inch or 23 inch rack configuration. This allows the surge suppression unit 500 to be mounted in the same rack 25 that holds the electronic circuitry for the power plant 28 and/or holds the telecommunication circuitry for the BTS 24 shown in FIG. 1. This also allows the surge suppression unit 500 to be connected closer to the power plant 28 and telecommunication circuitry 24. The surge suppression unit 500 can be mounted onto any other rack or other structure that may be housed in the building 32 shown in FIG. 1, uses less space, and does not require a special mounting structure or rack.

Figure 33:
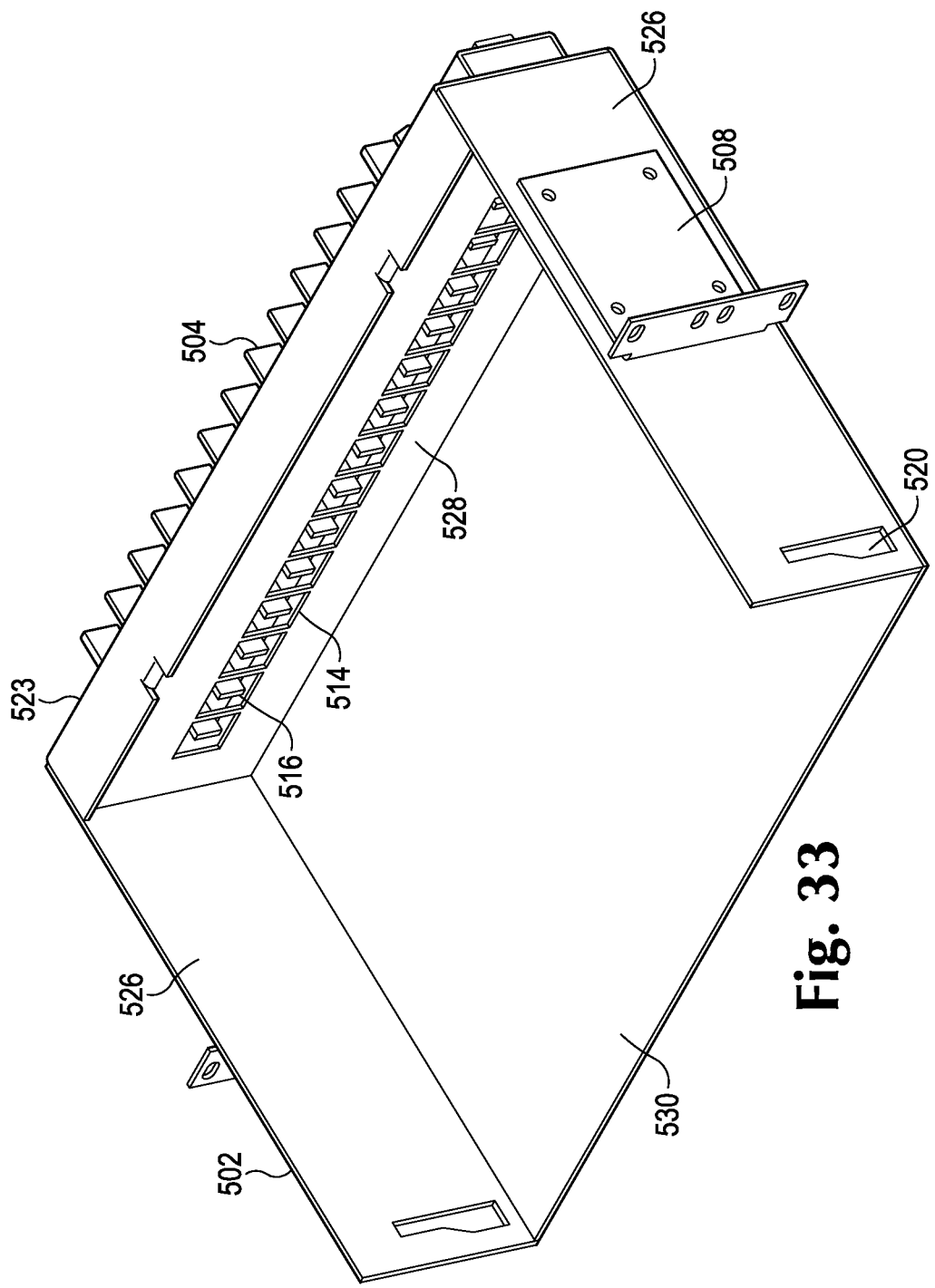
FIG. 33 shows a back end of the surge suppression unit shown in FIG. 32.

FIG. 33 is a perspective front view of the frame 502 and connection panel 504. The frame 502 includes walls 526 extending up the sides of a floor 530 and a back wall 523 that extends up from a back end of floor 530. A back panel 528 is located in front of connection panel 504 and includes openings 514 for accessing electrical contacts 516 that are attached to the connection panel 504. The side walls 526 include slots 520 that engage with latches 512 on the tray 506 that are moved by the handles 511 in FIG. 32.

Figure 34:
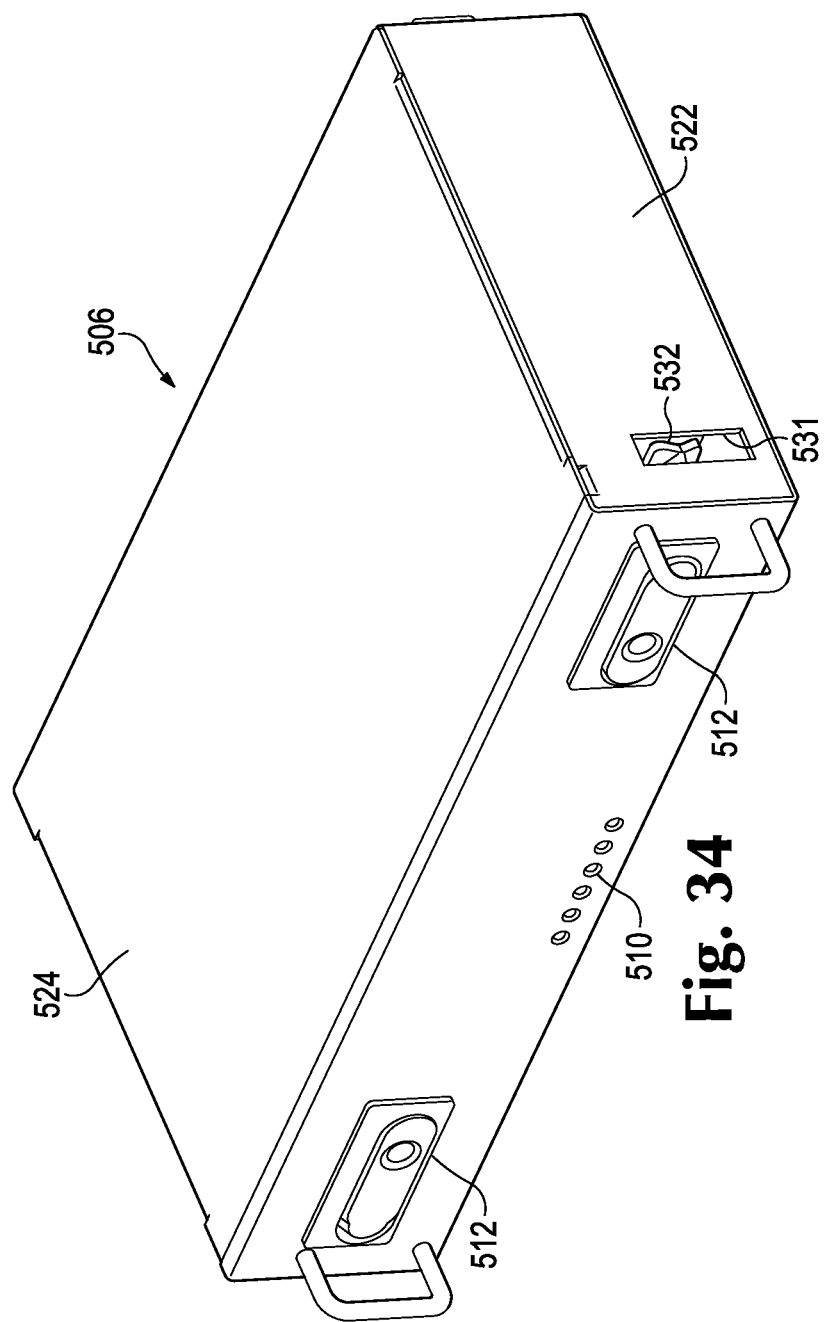
FIG. 34 shows a surge suppression tray for the surge suppression unit shown in FIG. 32.

FIG. 34 is a perspective view of the surge suppression tray 506. The tray 506 contains surge suppression modules 400 (FIG. 44) that provide surge suppression for the electrical equipment located in the structure 32 in FIG. 1. The tray 506 has a rectangular shaped housing 522 that slides into and is supported by the frame 502 in FIG. 33. A cover 524 is attached to a top end of the housing 522. Latch aims 532 rotate and extend out of openings 531 on the sides of housing 522 in response to rotating handles 511 and engage with the slots 520 on the sides of tray 506.

Figure 35:
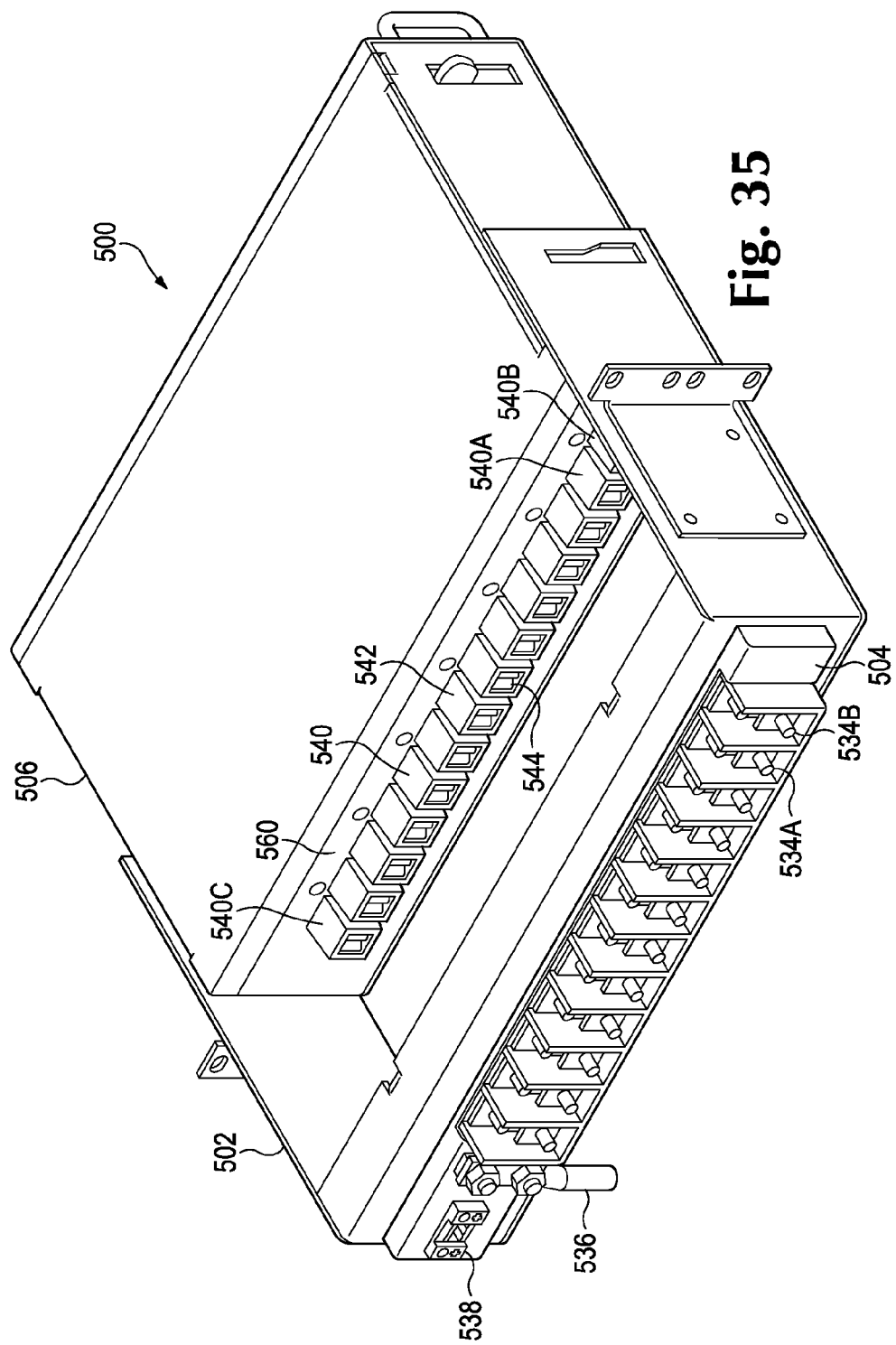
FIG. 35 shows how a connection panel in the surge suppression unit is connected to the surge suppression tray.

FIG. 35 is a perspective rear view of the surge suppression unit 500. The tray 506 is shown detached in a spaced apart position with respect to the power connection panel 504. The back of tray 506 slides back against the power connection panel 504. In line blind mate high current connectors 540 extend out the back end of tray 506 and include insulator housings 542 that align and insert into openings 514 (FIG. 36) formed in the back panel 528. Contacts 544 within the insulator housing 542 engage with power contacts 516 in FIG. 33 located in the connection panel 504. The contacts 544 extending from tray 506 may be clips and the associated contacts 516 extending out from the connection panel 504 may be a bus bar that together provide a relatively large contact surface area for handling high surge currents.

The connection panel 504 includes Kelvin connectors 534 that connect to power cables coupled to both the power plant 20 and to the radios 18 on tower 14 in FIG. 1. A first connector 534A may be connected to a supply power cable and a second connector 534B may be connected to a return power cable. A connector 540A in tray 506 is coupled to Kelvin connector 534A and a connector 540B in tray 506 is coupled to Kelvin connector 534B. A ground cable is coupled to connector 536 and alarm connections 538 are located on a left side of the connection panel 504.

The connection panel 504 provides a common in-line connectivity point for the surge suppression modules 400 contained in the tray 506. The unique in-line connectivity allows the tray 506 and internal surge suppression modules 400 to be detached from energized power lines without disrupting operation of the radios 18 in FIG. 1 (hot swappable). Multiple surge suppression modules 400 can be removed, replaced, and plugged into the power lines 20 all at the same time simply by connecting or disconnecting tray 506 to or from connection panel 504.

Figure 36:
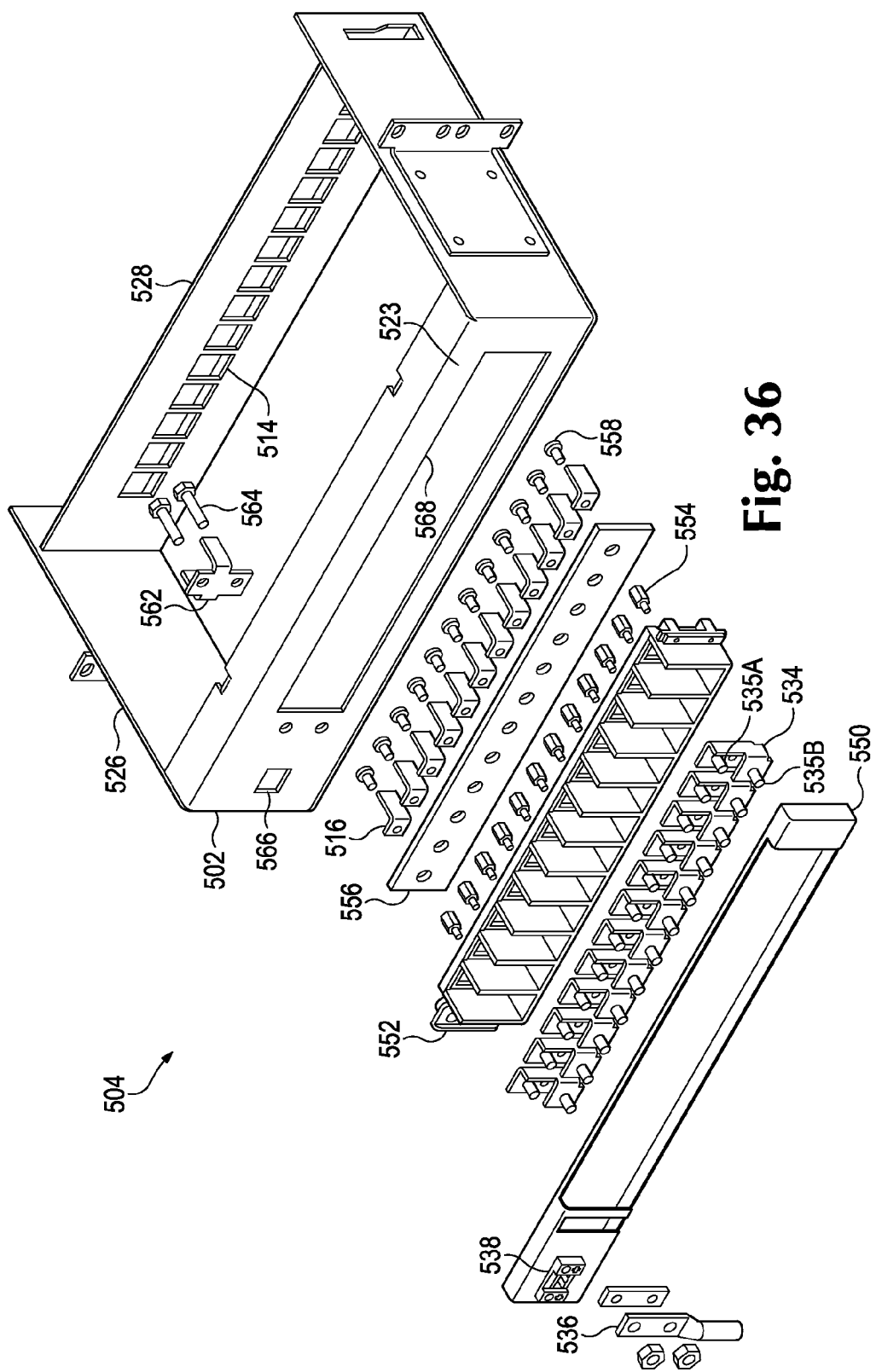
FIG. 36 shows an exploded view of the connection panel.

FIG. 36 shows an exploded perspective view of the power connection panel 504. A cover 550 extends around the Kelvin connectors 534. Upper and immediately lower terminals 535A and 535B, respectively, extend out from a back end of the Kelvin connectors 534. An insulator block 552 includes walls that extend out from between the Kelvin connectors 534.

Threaded conductive standoffs 554 include a first threaded end that screws into threaded holes in the Kelvin connectors 534. A second end of the standoffs 554 insert through holes in an insulating spacer 556 and connect to the power contacts 516. Screws 558 extend through holes in contacts 516 and engage with threaded holes in the second end of conductive standoffs 554. The alarm connectors 538 extend through a hole 566 in a back wall 523 of the frame 502. The ground connector 536 is attached to a ground contact 562 that attaches to an opposite side of back wall 523 via screws 564.

The back end of connection panel 504 inserts through an opening 568 in the back wall 523 of frame 502. A back panel 528 is shown in a spaced forward position in the frame 502. After installation, the back panel 528 sits just in front of the contacts 516 and 562 so that openings 514 each align with one of the contacts 516 or 562. The back panel 528 is aligned such that the insulator housings 542 in FIG. 35 insert into openings 514 and contacts 544 in insulator housings 542 connect to contacts 516 and 562.

Figure 37:
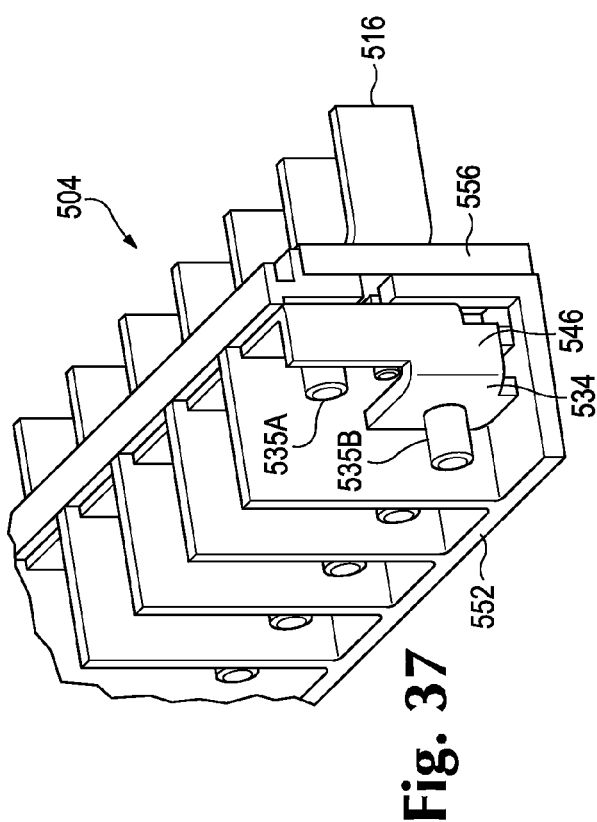
FIG. 37 shows an assembled partial view of the connection panel.

FIG. 37 shows a partial assembled view of the power connection panel 504. The conductive standoffs 554 provide separate power connections between individual Kelvin connectors 534 and different contacts 516. Each Kelvin connector 534 includes a top terminal 535A and an immediately lower bottom terminal 535B that are each shorted together thru a conductive member 546 that extends between the sides of conductive face plates that retain the terminals 535A and 535B.

Each upper terminal 535A is set back from the immediately lower terminal 535B to allow easier attachment of power cable connectors. Each Kelvin connector 534 is separated from an adjacent Kelvin connector 534 by an outwardly extending wall 553 of the insulator block 552 to reduce the chances of unintended shorting between power cables. In one embodiment, the insulator block 552 is made from a non-conductive polymeric material.

Figure 38:
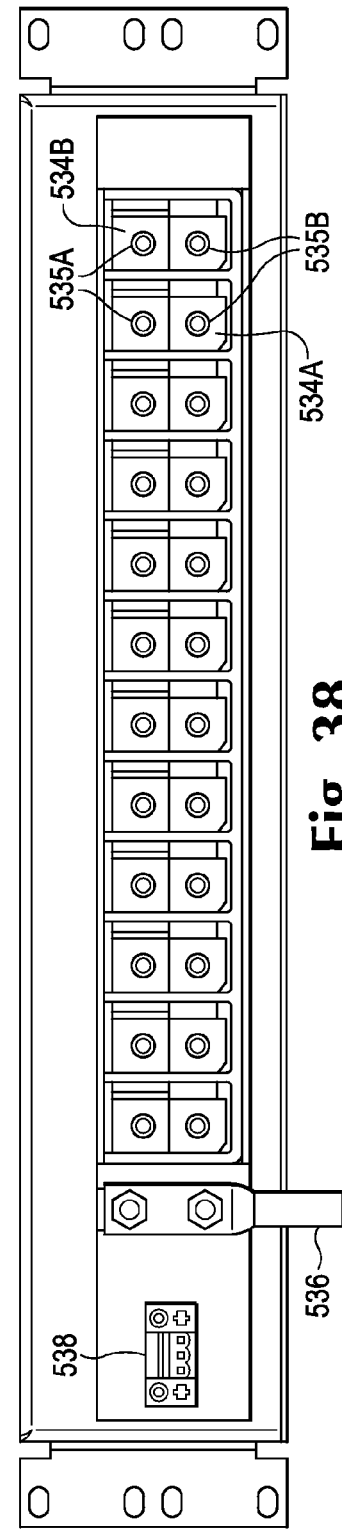
FIG. 38 is a rear elevation view of the connection panel.

FIG. 38 shows a rear elevation view of the power connection panel 504. A first lower terminal 535B of Kelvin connector 534A may be connected to a jumper power cable that connects to the power plant 28 in FIG. 1. A second upper terminal 535A of connector 534A is shorted to terminal 535B of Kelvin connector 534A and connects to a power cable that connects to the external surge suppression unit 30 in FIG. 1 or surge suppression unit 300 in FIG. 21.

A first lower terminal 535B of Kelvin connector 534B may be connected to a jumper power cable that connects to a return power connection in the power plant 28 in FIG. 1. The second terminal 535A of Kelvin connector 534B is shorted to lower terminal 535B of connector 534B and connects to a return power cable that connectors to the external surge suppression unit 30 in FIG. 1 or surge suppression unit 300 in FIG. 21.

Each pair of Kelvin connectors 534A and 534B is associated with the power cables for a different radio 18 in FIG. 1. There are six sets of two Kelvin connectors 534A and 534B that extend out the back of the connection panel 504 that can each connect to a different set of power cables for powering a different radio 18. For example, the first set of connectors 534A and 534B on the far right of connection panel 504 may be associated with a first set of power cables connected to a first radio 18. Each of the six sets of two Kelvin connectors 534A and 534B are also connected to an associated one of the surge suppression modules 400 contained within the tray 506.

The connection panel 504 provides unique "in-line" connectivity between power lines and the surge suppression modules 400 in tray 506. For effective surge suppression protection, surge suppression devices may be located relatively close to the protected electrical circuitry. The rack mountable power connection panel 504 provides a common connection location for surge suppression devices to connect to different power lines and allows surge suppression modules 400 in FIG. 39 to be closely mounted on the same rack that contains DC power plant 28 and/or communication station 24. As also explained above, detachably connecting the tray 506 in FIG. 34 to the power connection panel 504 allows the surge suppression modules 400 in the tray 506 to be more easily connected and disconnected from multiple power lines without disrupting power to the radios 18. The power lines come into the connection panel 504 from the DC power plant 28.

The power lines go out from the connection panel 504 through the power cables to the radios 18. This allows the surge suppression modules 400 in tray 506 to receive power from the power lines before the power is directed out through other power lines to the radios 18. This in-line feature prevents having to use "T" wiring configurations that are separately run from the power cables to surge suppression devices. The in-line feature provides controlled, consistent, repeatable, and relatively close connectivity between the surge suppression modules 400 in tray 506 and the DC power supply 28.

Figure 39:
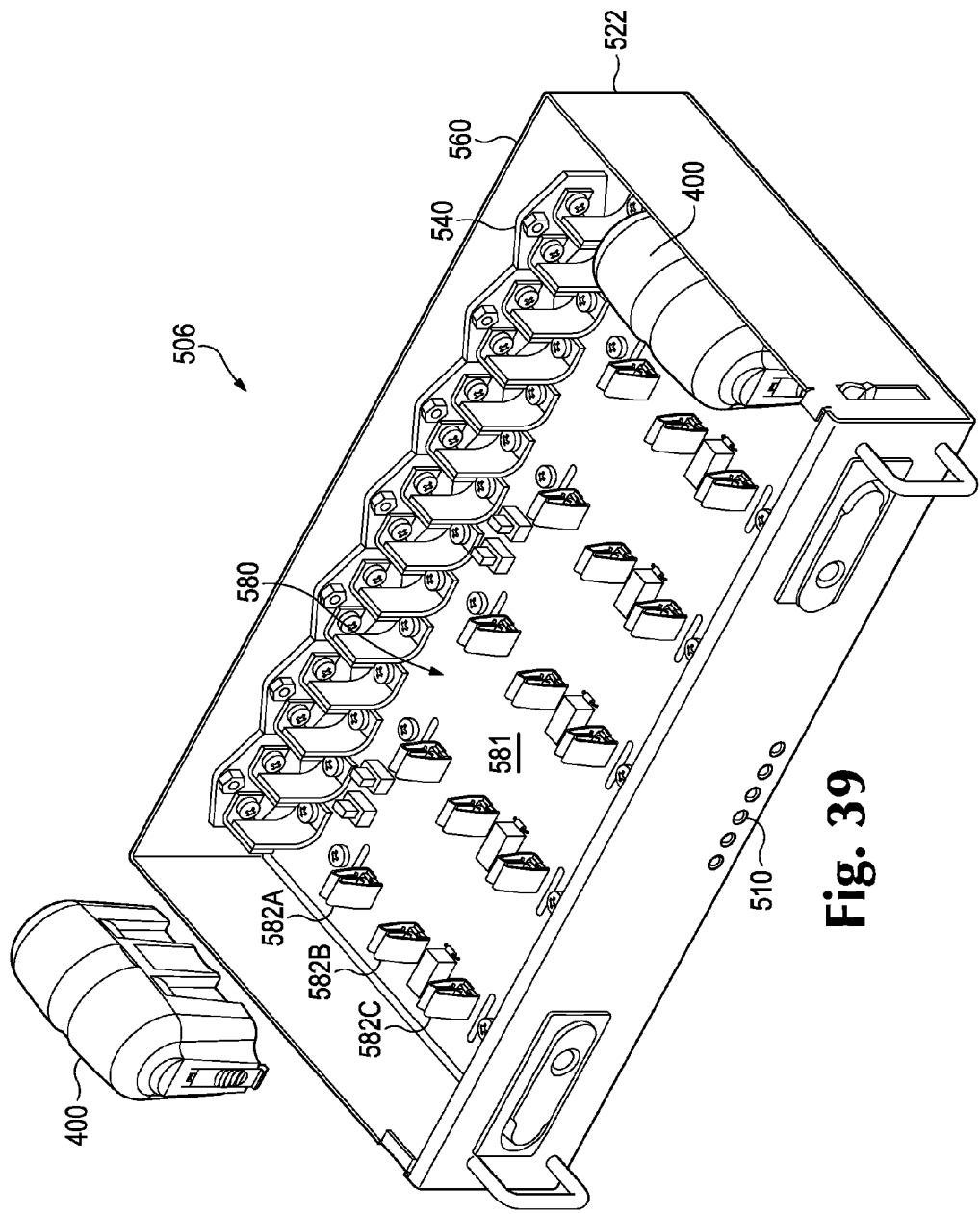
FIG. 39 is a perspective view of the surge suppression tray with a top cover removed.

FIG. 39 shows a front perspective view of the rack mountable tray 506 with a top hood removed. A bottom floor holds a surge suppression assembly 580. The assembly 580 includes a printed circuit board 581 that retains contacts 582 configured to connect to surge suppression modules 400. Blind mate connectors 540 are attached to the back wall 560 of the housing 522 and are electrically coupled to the contacts 582 via etched conductor busses on printed circuit board 581.

Each set of contacts 582A, 582B, and 582C are configured to plug into an associated surge suppression module 400. There are six sets of contacts 582A, 582B, and 582C shown located on circuit board 581 for connecting to six different surge suppression modules 400. In other configurations, more or fewer surge suppression modules 400 may be plugged into assembly 580. In one embodiment, the surge suppression modules 400 are the same as the surge suppression modules 400 used in the surge suppression unit 300 described above. However, other types of surge suppression devices can also be used, such as the surge suppression modules 260 shown above in FIG. 10. Only two surge suppression modules 400 are shown in FIG. 39. However, additional surge suppression modules 400 can be plugged into the other sets of connectors 582 in tray 506 and provide surge suppression for up to six sets of power cables 20.

Figure 40:
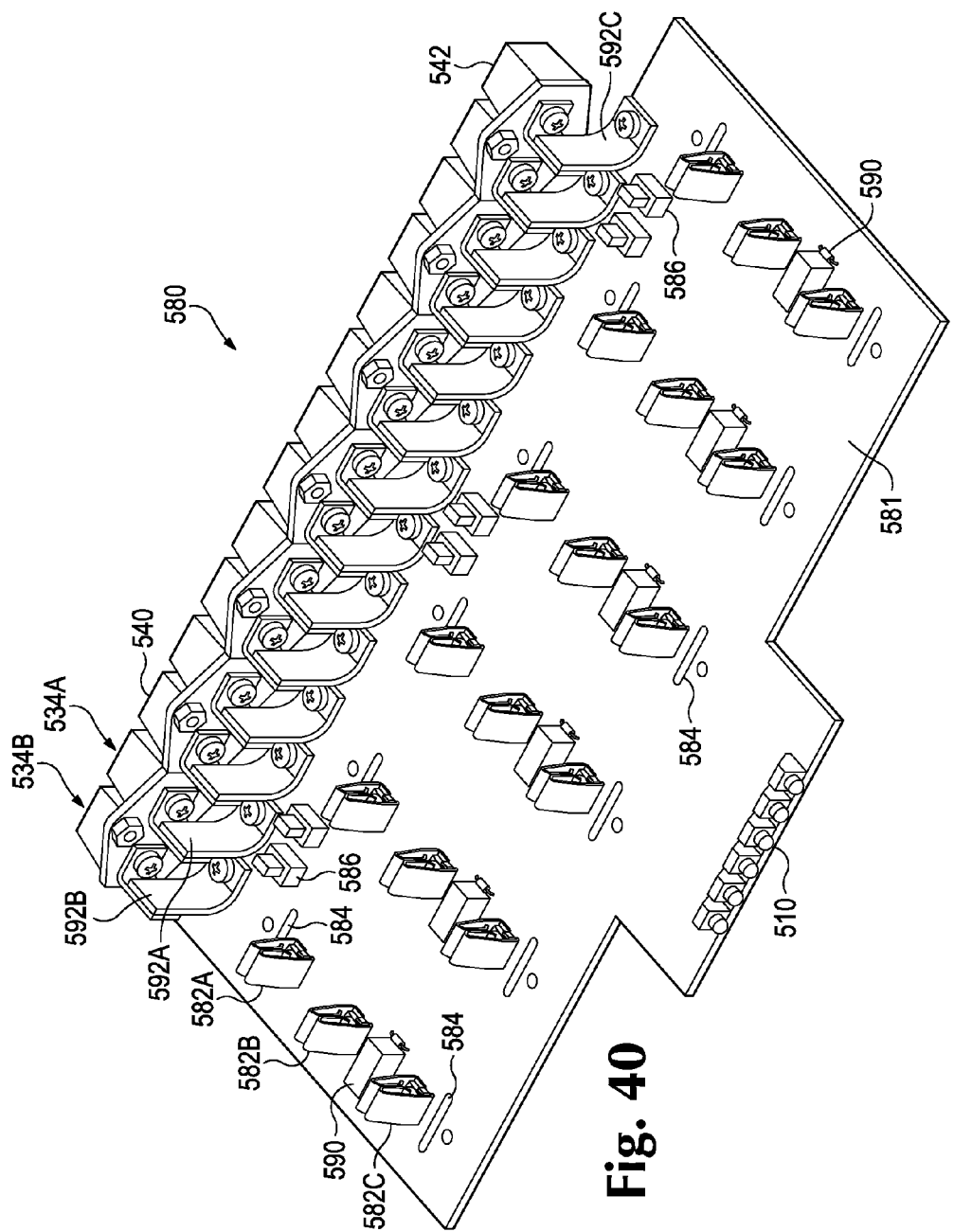
FIG. 40 is an isolated view of the surge suppression assembly located in the tray of FIG. 39.

FIG. 40 is an isolated perspective view of the surge suppression assembly 580. Flexible bus bars 592 attach at a bottom end to the printed circuit board 581 and attach at a top end to one of the insulator housings 542. A first etched conductor bus (not shown) on printed circuit board 581 connects a supply contact 582A to a bus bar 592A that connects to the Kelvin connector 534A shown in FIG. 38. A second etched conductor bus (not shown) on printed circuit board 581 connects a return contact 582B to a bus bar 592B that connects to the Kelvin connector 534B in FIG. 38. A third etched conductor bus (not shown) on printed circuit board 581 connects a ground contact 582C to a ground bus bar 592C that connects to the ground connector 536 in FIG. 38. Similar etched conductor buses on printed circuit board 581 connect the other sets of three contacts 582 and associated surge suppression modules 400 to associated connectors 540 in suppression assembly 580.

Pairs of slots 584 in printed circuit board 581 receive clips from one of the surge suppression modules 400 in a similar manner as described above in FIG. 31. Alarm circuits 590 are connected to the contacts 582 in a similar manner as the monitoring circuits 280 described above in FIG. 20. Each monitoring circuit 590 is connected to a two position alarm configuration switch 586 configured to selective connect the monitoring circuit 590 in series with any other activated monitoring circuits 590. The alarm circuit 590 generates an alarm signal on alarm connections 538 in FIG. 35 when the surge suppression device 100A in an associated surge suppression module 400 shorts to ground. The alarm signal is described in more detail above in FIG. 20. Each of the LEDs 510 is activated when the associated surge suppression module 400 is in a powered and operational state.

Figure 41:
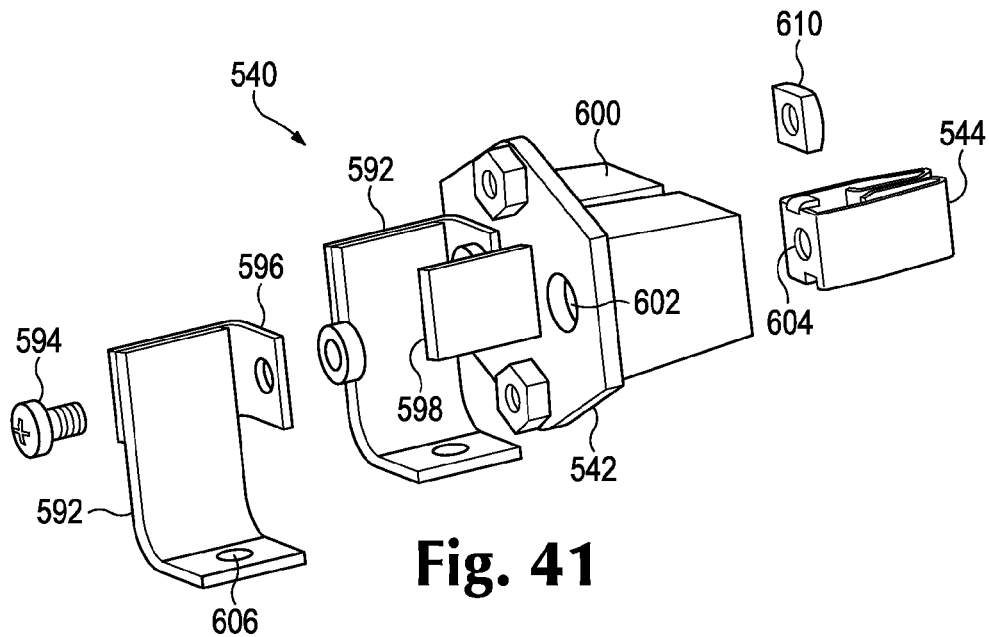
FIG. 41 is an exploded view of a blind mate inline connector used in the surge suppression assembly of FIG. 40.
Figure 42:
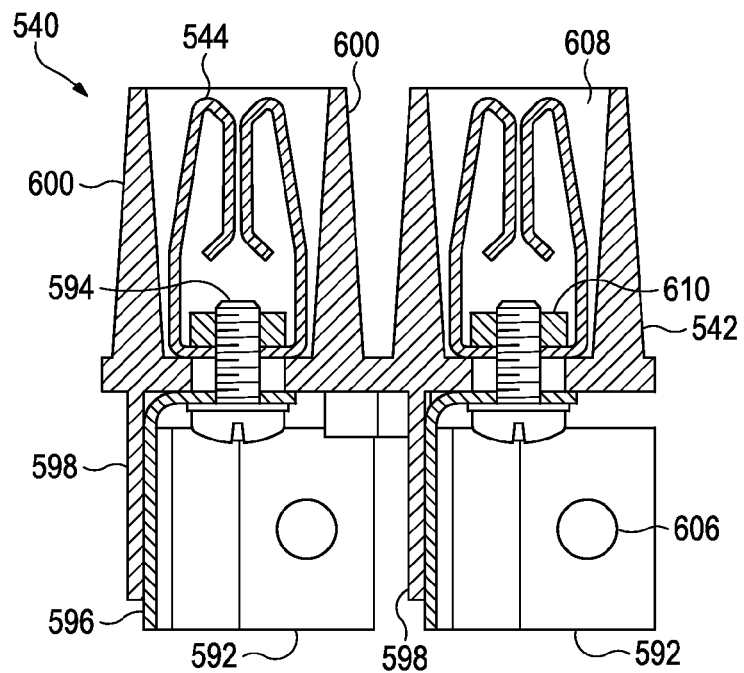
FIG. 42 is side sectional plan view of the blind mate inline connector of FIG. 41.

FIG. 41 shows an exploded perspective view for one of the power connectors 540 and FIG. 42 shows a section plan view of a power connector 540. Each power connector 540 includes two flexible bus bars 592 that support an associated insulator housing 542. A first end of two attachment aims 596 are soldered to top ends of two bus bars 592 and second 90 degree ends of the arms 596 include holes that align with holes 602 in housing 542. Two high current spring contacts 544 include holes 604 that align with the holes 602 in housing 542 and the holes in arms 596. Screws 594 insert through the holes 602 and 604 and threadingly engage with nuts 610 located in contacts 544.

Bottom ends of the flexible bus bars 592 are bent at a ninety degree angle with respect to an upper portion of bus bars 592 and include holes 606 that align with holes in the printed circuit board 581. Dividers 598 extend perpendicularly out form a front face of housing 542 and the arms 596 press against the sides of the dividers 598.

The housing 542 has tapered walls 600 with oppositely inclining sides that extend out the back wall 560 of tray 506 and insert into the openings 514 formed in the back panel 528 of connection panel 504 (see FIGS. 36 and 39). The walls 600 form two internal cavities 608 that contain contacts 544. In one example, the housing 542 is made from a polymeric material and operates as an insulator.

Figure 43:
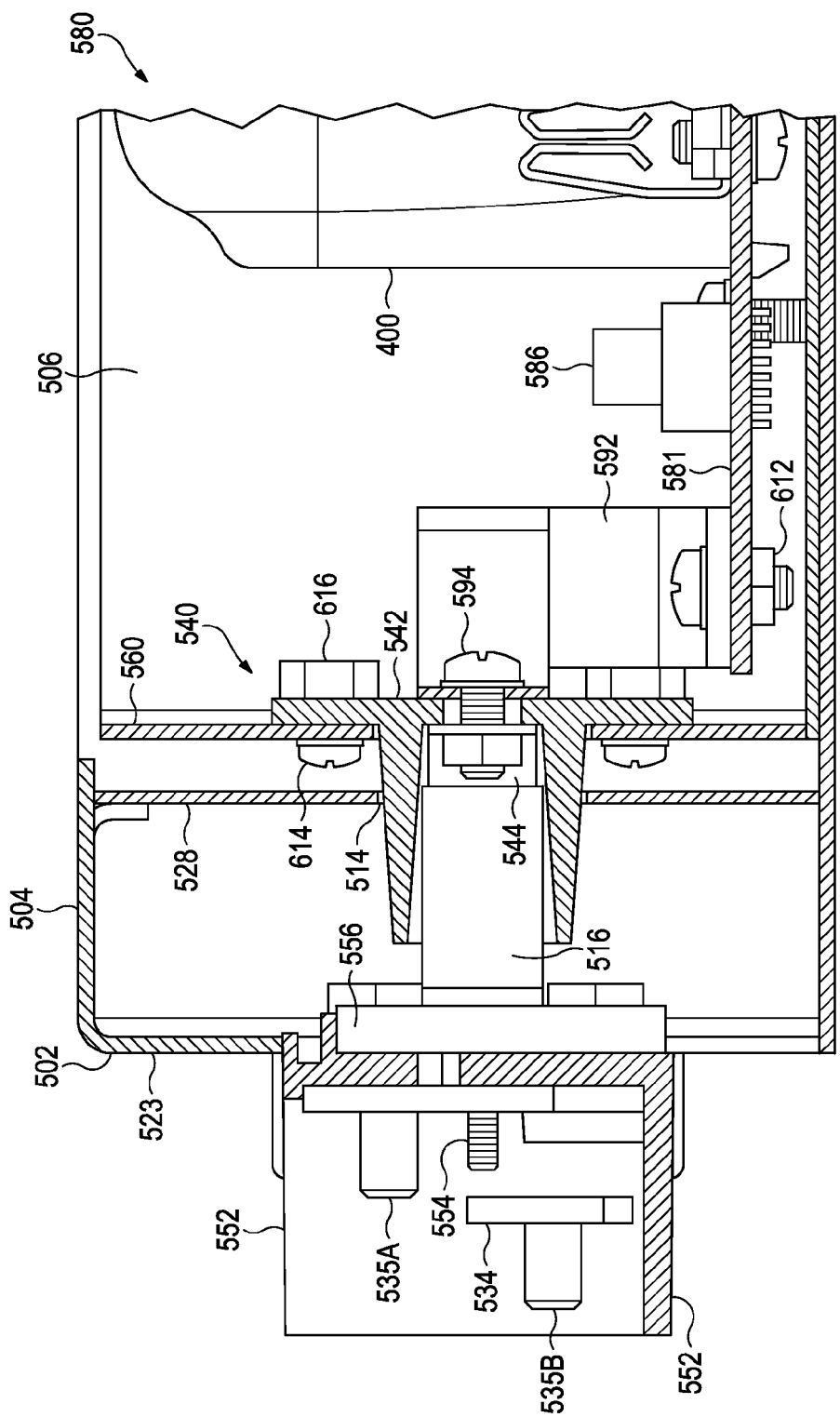
FIG. 43 is a side sectional elevation view of the surge suppression unit shown in FIG. 32

FIG. 43 is a side section elevation view of the tray 506 connected to the frame 502. A nut and bolt 612 hold the bus bar 592 to the printed circuit board 581. Bolts 614 extend through the back wall 560 of tray 506 and engage with nuts 616 attached to the front face of housing 542. The blind mate in-line push connector 540 extends out of the back wall 560 of the tray 506 and inserts into the openings 514 formed in the back panel 528 of connection panel 504. The power contacts 516 in connection panel 504 insert in-between the spring contacts 544.

Power cables (not shown) are connected to terminals 535A and 535B and connect through standoffs 554 to the contacts 516. The contacts 516 are coupled to spring contacts 544 that are coupled through bus bars 592 to the conductive busses on printed circuit board 581. The conducting busses couple the bus bars 592 to the surge suppression units in module 400.

When the tray 506 is inserted into frame 502, the contacts 544 align and mate with the contacts 516 that extend out the back of connection panel 504. This allows all of the surge suppression modules 400 contained in tray 506 to be connected to multiple different power lines all at the same time simply by plugging tray 506 into the power connection panel 504.

Figure 44:
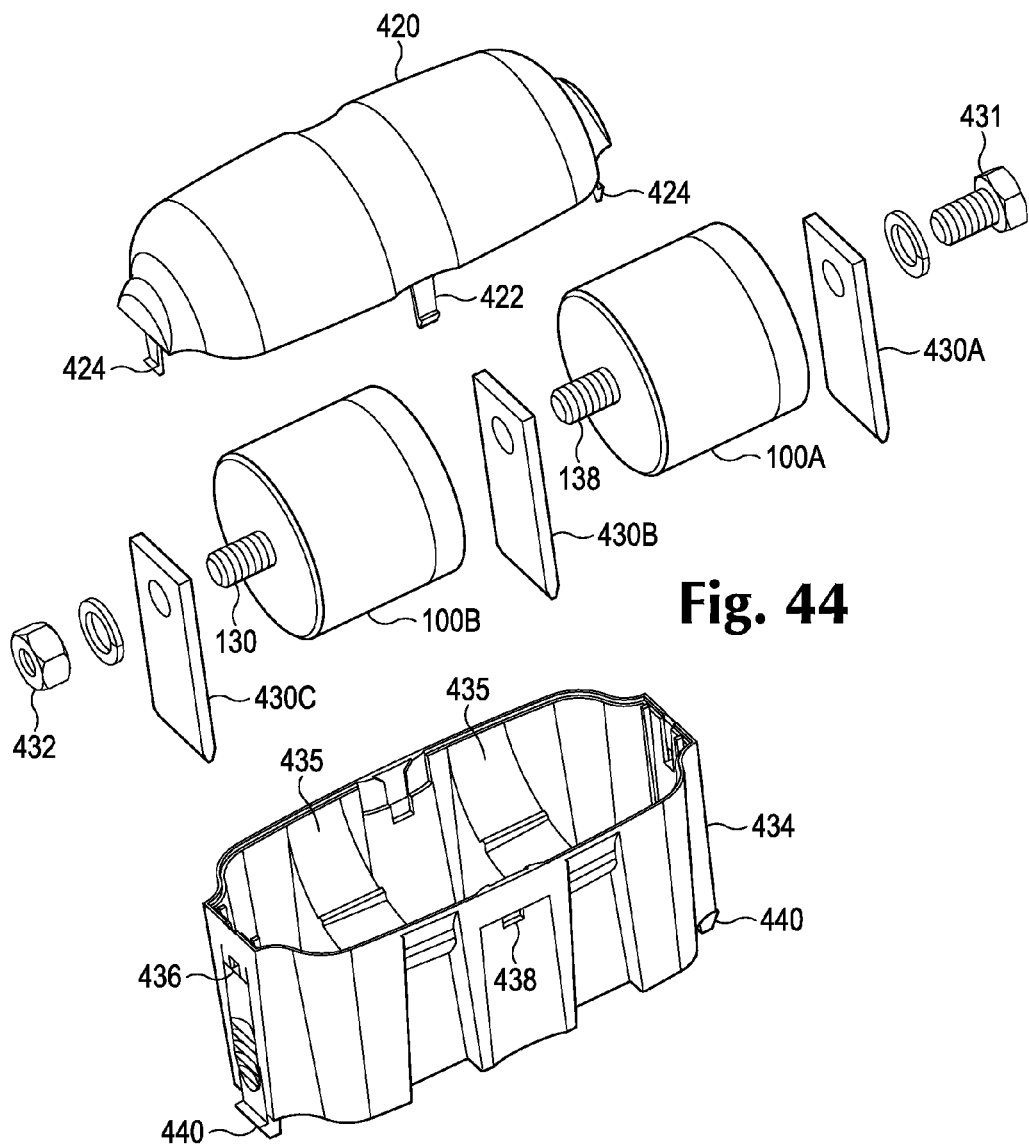
FIG. 44 is an exploded perspective view of a surge suppression module located in the surge suppression tray of FIG. 39.

FIG. 44 shows an exploded perspective view for one of surge suppression modules 400 located in tray 506 and is similar to the surge suppression modules 400 previously shown in FIG. 29. A first surge suppression device 100A is coupled by a bolt 431 at one end to a bus bar 430A. A connecting member 138 extends out a second end of surge suppression device 100A and inserts through a hole in a second bus bar 430B and into a threaded hole on a first side of a second surge suppression device 100B. A second end of surge suppression device 100B includes a connecting member 130 that inserts through a hole in a third bus bar 430C and threadingly engages with a nut 432.

The surge suppression devices 100A and 100B may also be similar to the surge suppression devices 100 described in FIG. 4 and/or surge suppression device 250 described in FIG. 10. However, other types of surge suppression devices could also be used. The bus bars 430 in one example have a substantially flat rectangular profile and may have oppositely inclining front and back faces that form a wedge at a bottom end.

Mounting base 434 has an oval cross-sectional shape and is configured to receive surge suppression devices 100A and 100B. Two semi-circular supports 435 have a shape and size similar to the circular circumference of surge suppression devices 100. Thus, the two surge suppression devices 100A and 100B can sit snugly or snap into the supports 435. The mounting base 434 may be made from a polymeric material and includes two clips 440 extending down from opposite lateral sides that are configured to insert into slots 584 in the printed circuit board 581. The two clips 440 can be compressed laterally inward and may springly extend back outward toward an original position.

The mounting cap 420 may be made from a polymeric material and extends over surge suppression devices 100 and connects to mounting base 434. Mounting cover 420 includes clips 422 in a front and back end that insert into holes 438 formed on the front and back sides of mounting base 434. Two clips 424 extend down from the lateral sides of cover 420 and insert into holes 436 formed on the lateral sides of mounting base 434.

Figure 45:
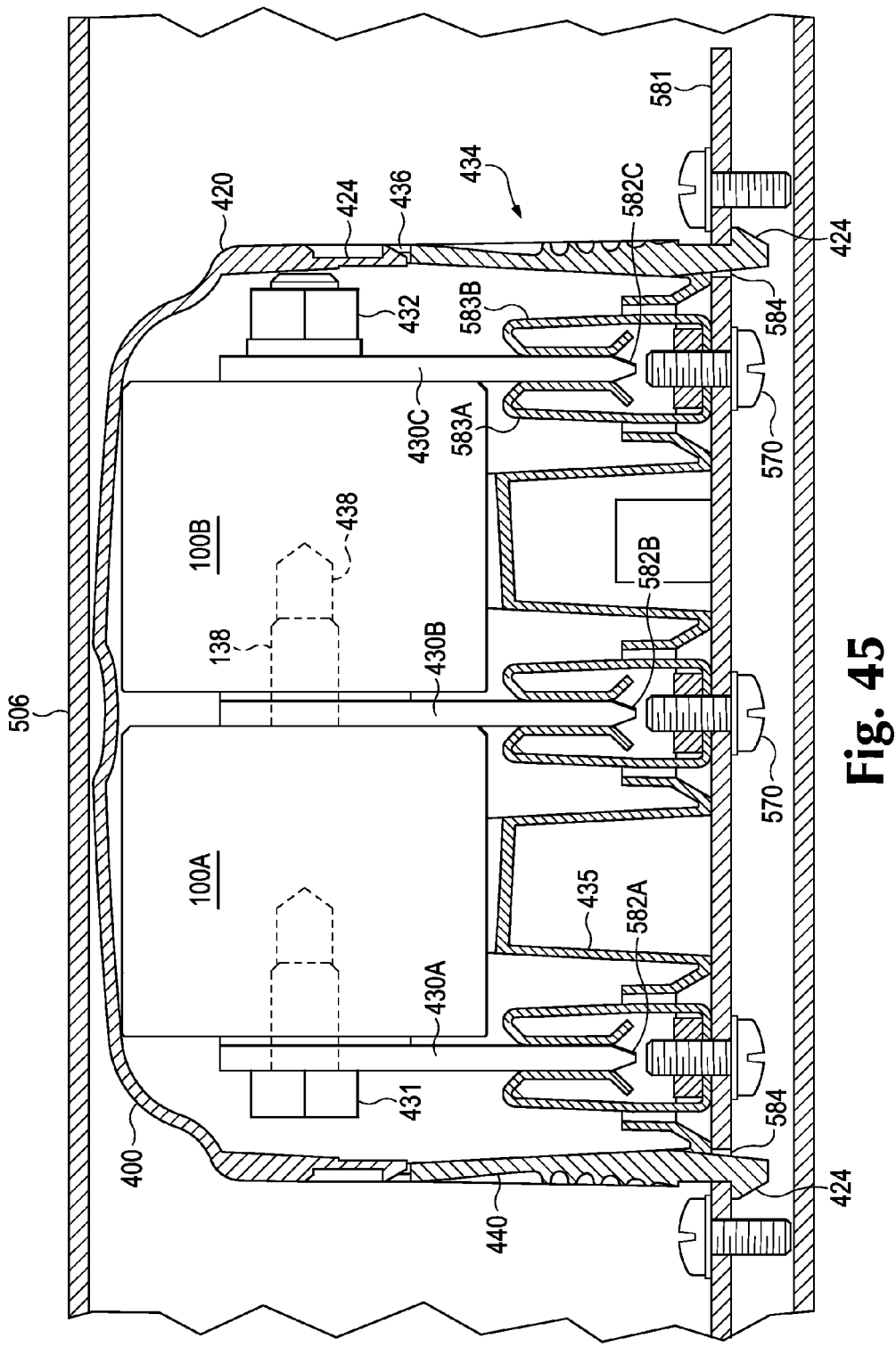
FIG. 45 is a front sectional view of the suppression module of FIG. 43.

FIG. 45 is a front sectional elevation view of the surge suppression module 400. The contacts 482 are mounted to the top of printed circuit board 581 with screws 570. The bus bars 430A-430C extend down from a bottom end of mounting base 434 and insert into contacts 582A-582C, respectively.

The clips 440 on the sides of mounting base 434 insert into slots 584 formed in printed circuit board 581. The clips 440 are both pressed inward and inserted into slots 584 in printed circuit board 581. The clips 440 are released and spring back outward pressing against an outer side of the slots 584. Latches 424 on the bottom end of clips 440 sit against a bottom side of the printed circuit board 581 and hold the mounting base 434 to the printed circuit board 581.

The surge suppression devices 100A and 100B and bus bars 430 insert down into the mounting base 434 until the bottom sides of the surge suppression devices 100A and 100B seat into the mounting supports 435. The cap 420 is attached over mounting base 434 and clips 422 (FIG. 30) and 424 press slightly inward until inserting into the holes 438 (FIG. 30) and 436, respectively. The clips 422 and 424 then spring slightly outward locking the mounting cover 420 to the mounting base 434. While the mounting base 434 is being attached to the printed circuit board 581, the bottom ends of bus bars 430 extend down in-between spring arms 583A and 583B of contacts 582 pushing the two arms 583 outward.

The surge suppression module 400 can be plugged into and detached from printed circuit board 5814 without any tools. For example, the surge suppression module 400 is removed by pressing the clips 440 inward and lifting the retention members 424 up and out of slots 584. The surge suppression devices 100A and 100B are lifted upward by supports 435 and the bus bars 430 are similarly lifted up and out from in-between the contacts 582. Thus, an operator simply has to squeeze and lift the sides of the mounting base 434 to detach the surge suppression module 400 from printed circuit board 581.

Insertable Box Surge Suppression Unit

Figure 46:
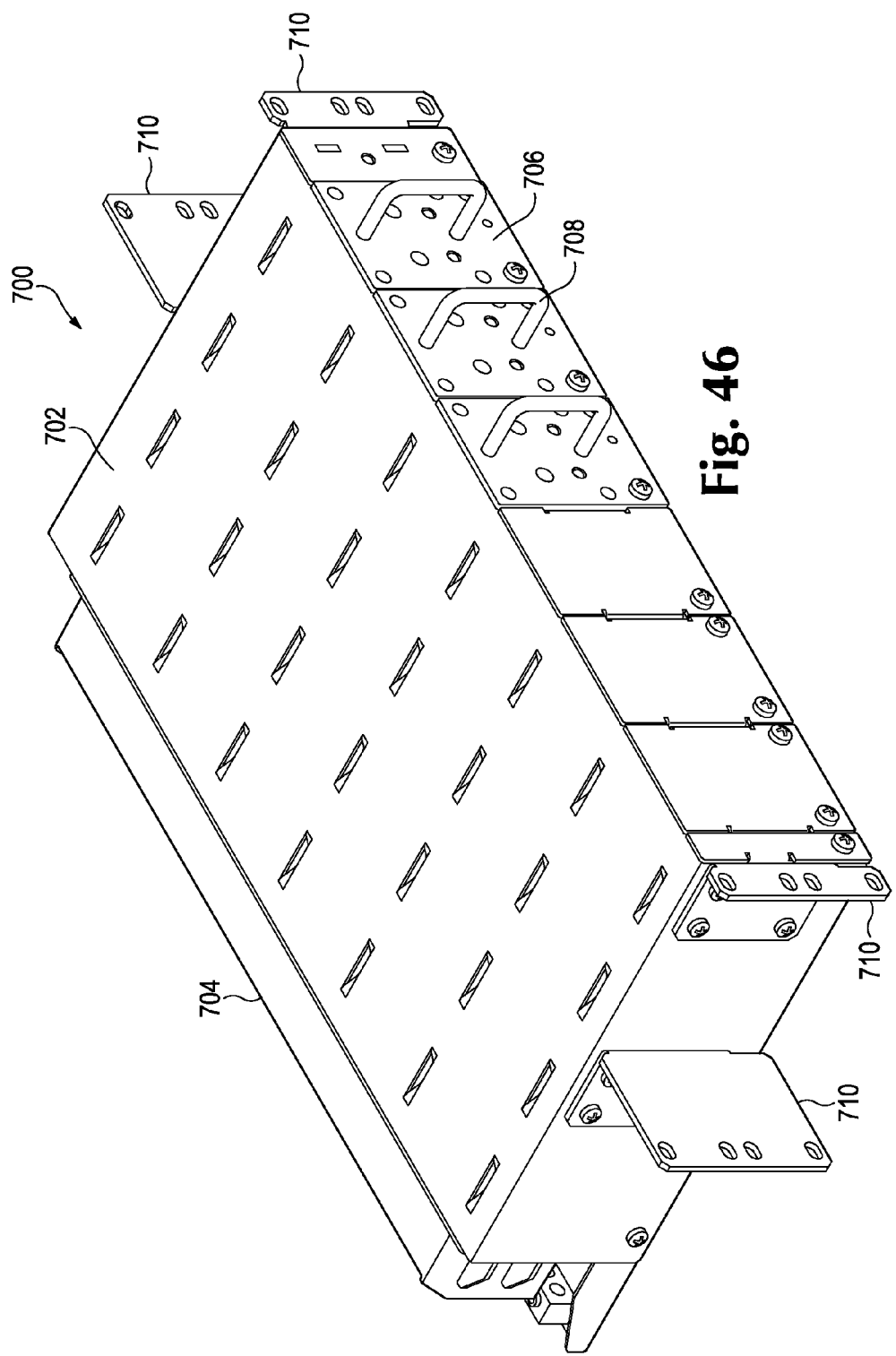
FIG. 46 is a front perspective view of a modular surge suppression unit.

FIG. 46 shows a front perspective view of yet another alternative embodiment of a rack based surge suppression unit 700. Surge suppression unit 700 includes a chassis 702 that connects to a rack or support structure. A back end of chassis 702 attaches to a connection panel 704 and a front end of the chassis 702 receives elongated box-shaped surge suppression modules 706. Handles 708 are located on a front side of the surge suppression modules 706 and are used for longitudinally inserting and removing surge suppression modules 506 into and from chassis 702.

Mounting brackets 710 attach at the front, back, or middle sides of the chassis 702 and attach to the rack or other support structure 25 previously shown in FIG. 2. A first pair of brackets 710 may be used at a first side location for a 19 inch rack and a second different pair of brackets 710 may be used at a second side location for a 23 inch rack.

The surge suppression unit 700 has the advantage of having a conventional Rack Unit (RU) form factor that in one embodiment uses a 2RU chassis 702 that can fit into a 19 inch or 23 inch rack configuration. This allows the surge suppression unit 700 to be mounted in the same rack 25 that holds the electronic circuitry for the power plant 28 and/or holds the telecommunication circuitry for the BTS 24 shown in FIG. 1. This allows the surge suppression unit 700 to be connected closer to the power plant 28 and telecommunication circuitry 24. Surge suppression unit 700 can be mounted onto any other rack or other support structure that may be housed in the building 32 shown in FIG. 1, uses less space, and does not require a special mounting structure or rack. The box shaped suppression modules 706 can also be quickly and easily removed from chassis 702 for easy access to internal suppression devices.

Figure 47:
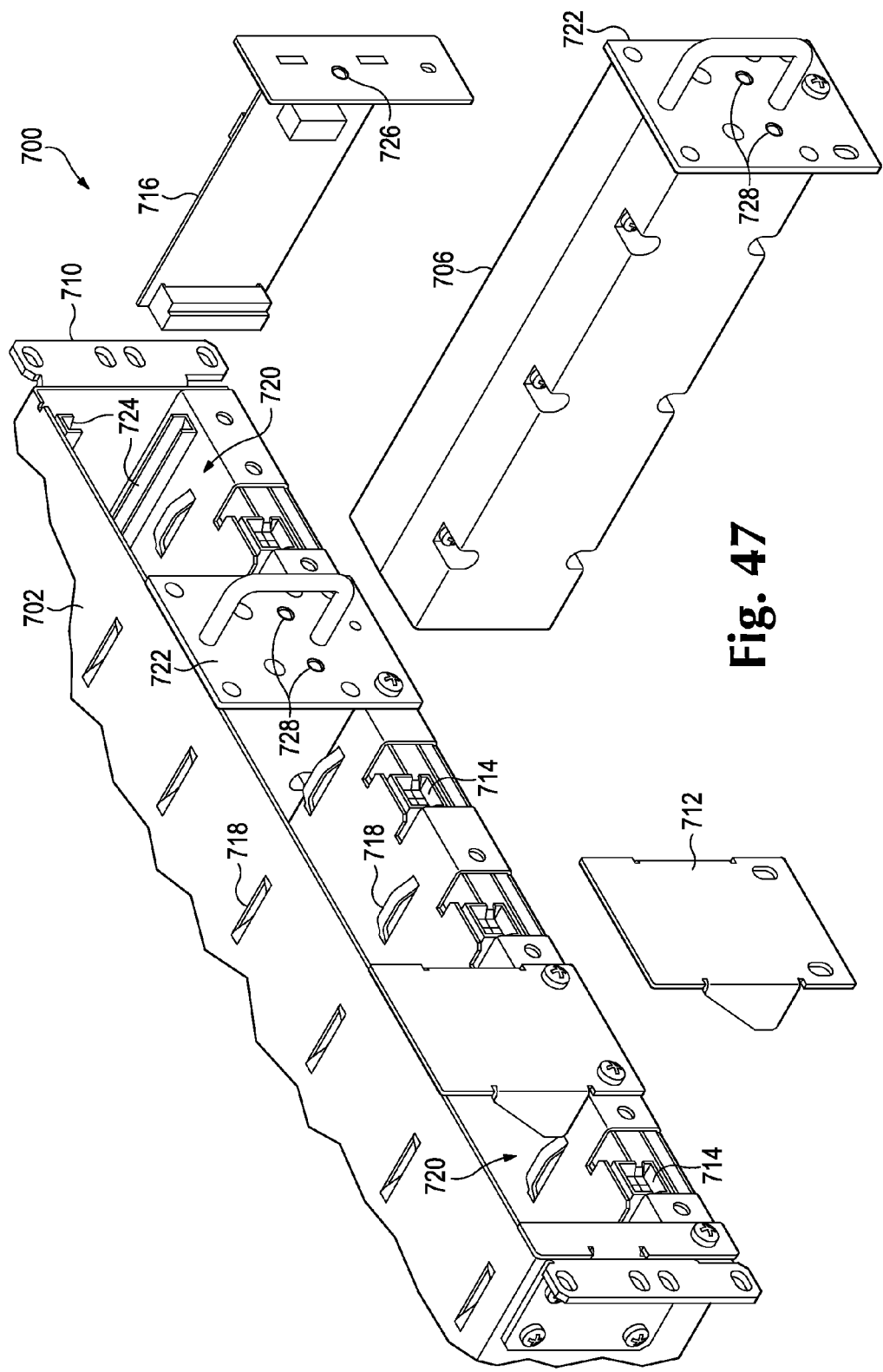
FIG. 47 shows suppression modules removed from the surge suppression unit of FIG. 46.

FIG. 47 is a perspective view of surge suppression unit 700 showing one of the suppression modules 706 removed from chassis 702 and another one of suppression modules 706 inserted into chassis 702. Chassis 702 includes multiple horizontally elongated slots 720 for receiving multiple suppression modules 706. In one example, the chassis 702 is configured to receive six suppression modules 706. However, any number of slots 720 and suppression modules 706 may be used by varying a width of chassis 702. Slots 720 are delineated by tracks 718 that are formed by cutting strips into chassis 702 and bending the strips into an internal cavity of chassis 702.

In one example, suppression module 706 has an elongated rectangular box shape configured to retain surge suppression devices end-to-end and insert horizontally into a front end of the chassis 702. Surge suppression modules 706 are slide into one of slots 720 in-between associated tracks 718 until a faceplate 722 presses up against a front face of chassis 702. In the fully inserted position, a back end of the suppression modules 706 connect with connection panel 704 previously shown in FIG. 46. Any unused slots 720 can be covered with a blank faceplate 712.

Figure 49:
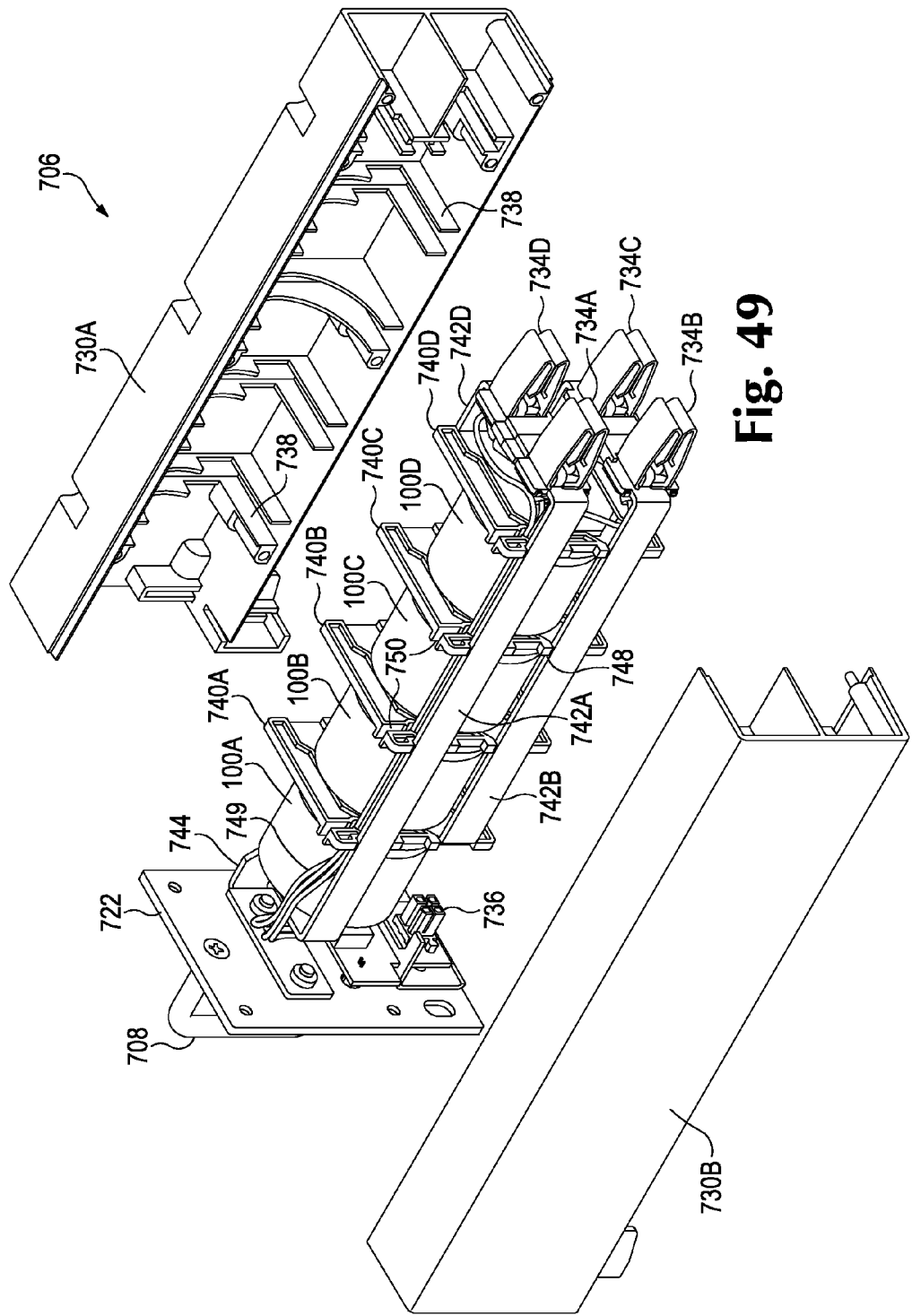
FIG. 49 shows the internal components of the suppression module of FIG. 48.

Monitor receptacles 714 are located at a bottom end of each slot 720 and receive monitor plugs 736 that extend from a bottom back side of faceplate 722 (see FIG. 49). Monitor receptacles 714 connect monitor circuitry contained in suppression modules 706 with circuitry located on a monitor card 716. Monitor card 716 inserts into tracks 724 that form a slot on a lateral end of chassis 702.

Monitor card 716 activates a Light Emitting Diode (LED) 726 whenever a failure is detected in one of suppression modules 706. For example, whenever suppression module 706 is inserted into chassis 702, the circuitry in monitor card 716 starts monitoring the operational status of surge suppression devices 100 within the suppression module 706. Circuitry on monitor card 716 then activates LED 726 whenever one of the surge suppression devices 100 in modules 706 is disabled due to a power surge event.

Each individual suppression module 706 includes additional monitor circuitry similar to that shown in FIG. 20 that is configured to active one of LEDs 728 when an associated pair of surge suppression devices is powered and operational. When the LED 726 on monitor card 716 is activated, an operator can locate the failed surge suppression device by identifying an associated deactivated LED 728 on one of suppression modules 706.

Figure 48:
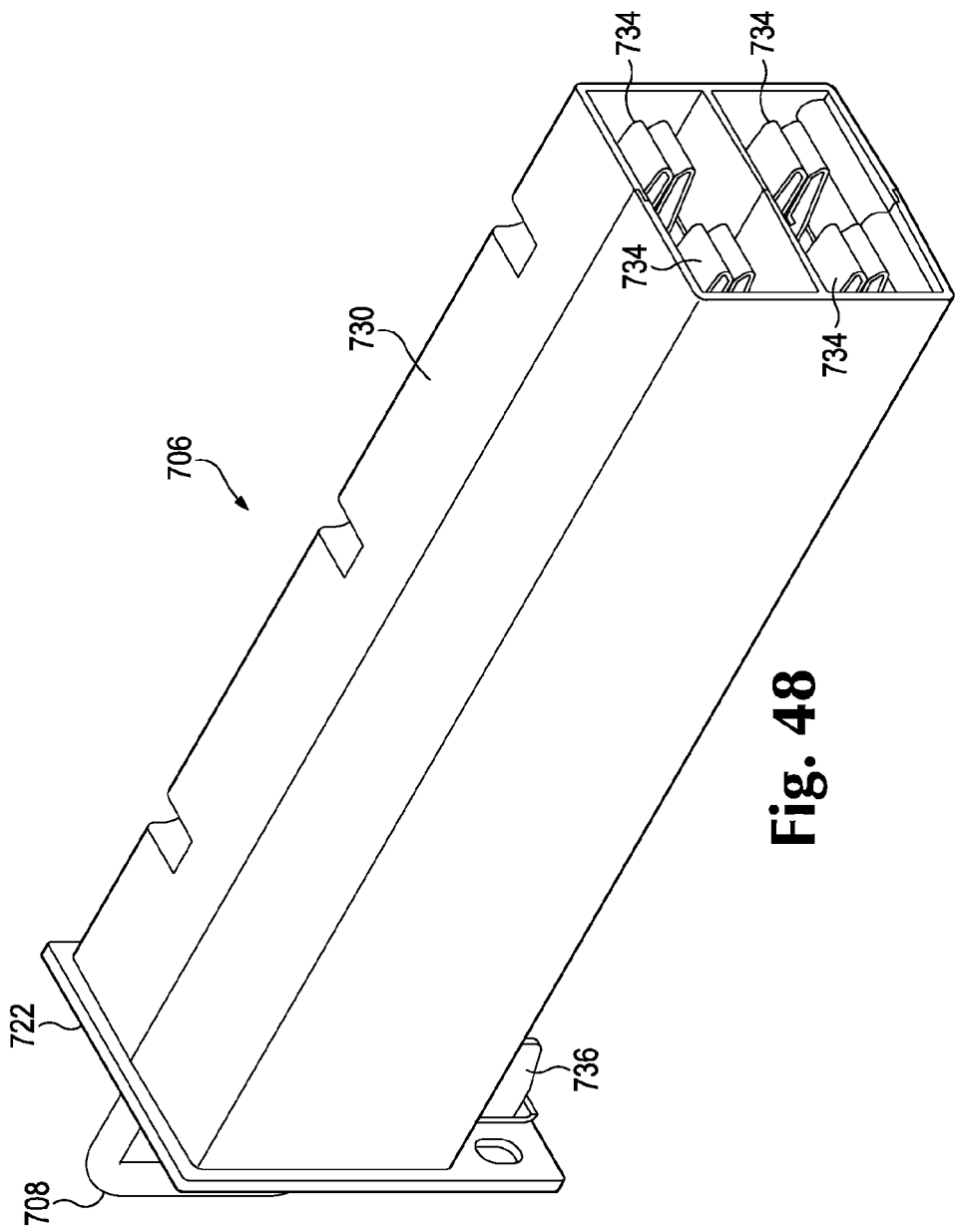
FIG. 48 is a rear perspective view of a suppression module in FIG. 47.

FIG. 48 is a perspective isolated rear view of one of suppression modules 706. Handle 708 is connected to a front side of faceplate 722 and an elongated rectangular box shaped enclosure 730 extends horizontally out from a back side of faceplate 722. Clips 734 extend from a back end of suppression module 706 and are configured to receive and compress against blade connectors that extend from the connection panel 704 in FIG. 46. A monitor plug 736 extends out from a bottom back side of faceplate 722 and inserts into one of the monitor receptacles 714 shown in FIG. 47.

Figure 50A:
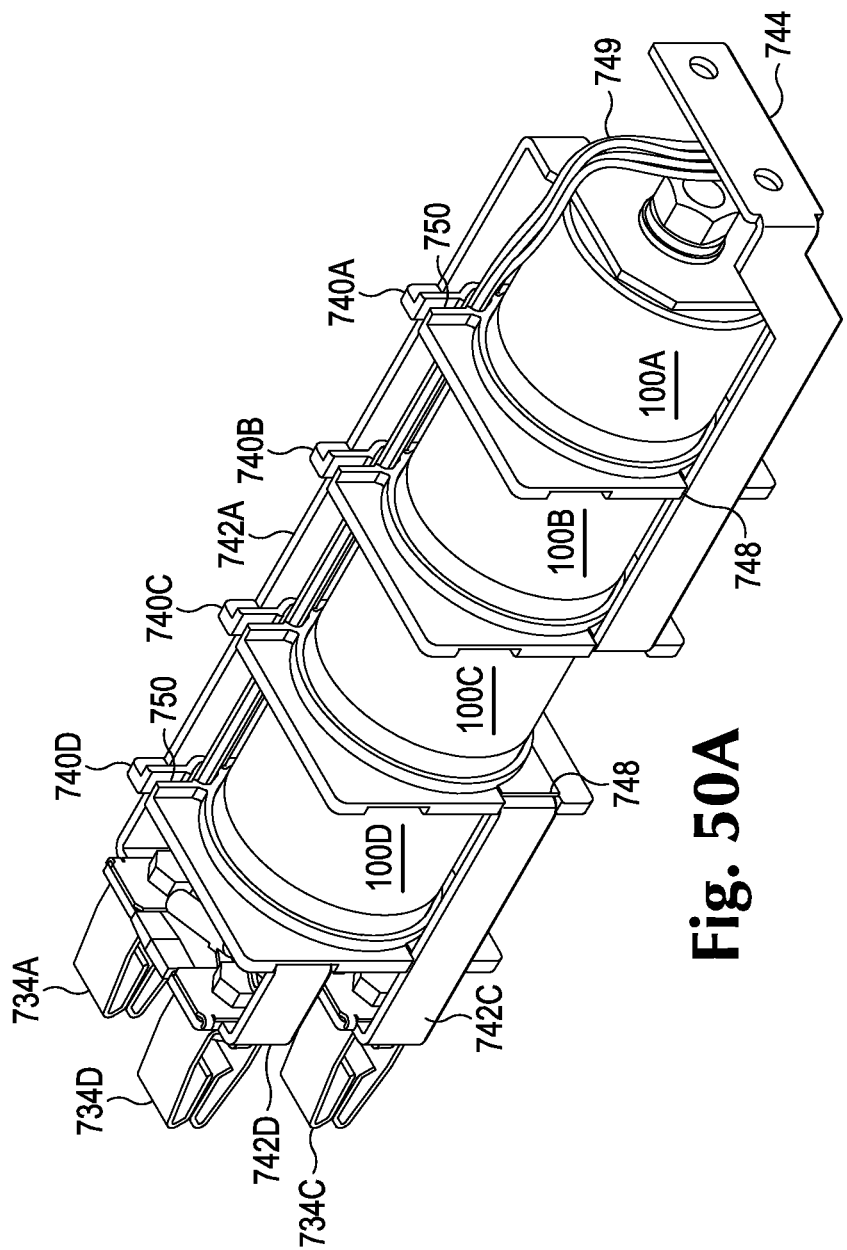
FIG. 50A is front perspective view of the internal components shown in FIG. 49.
Figure 50B:
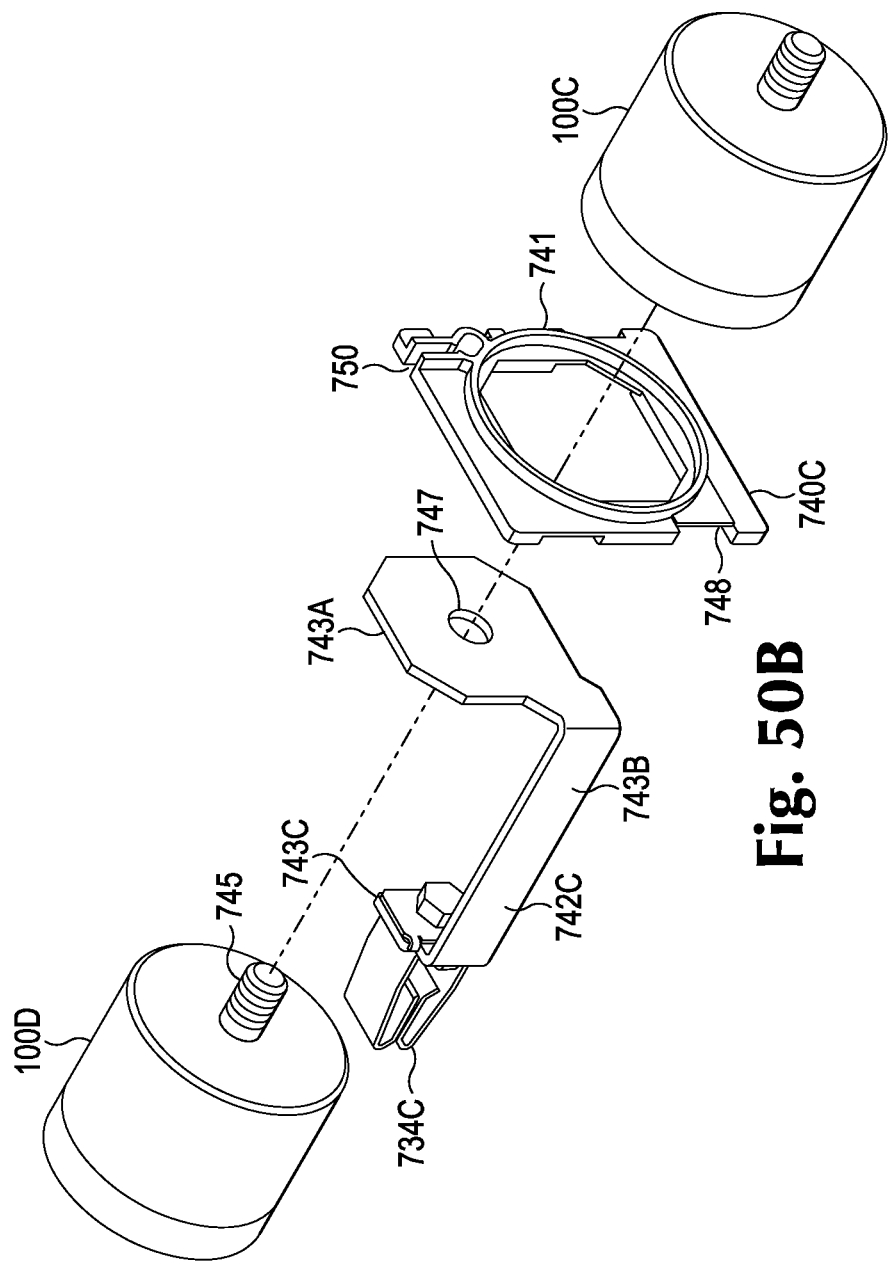
FIG. 50B is an exploded view for some of the components shown in FIG. 50A.

FIG. 49 is a rear perspective view for one of suppression modules 706 with enclosure 730 removed. FIG. 50A is a front perspective view of the suppression module 706 in FIG. 49, and FIG. 50B is a partial exploded view of the suppression module in FIG. 50A. Referring to FIGS. 49, 50A and 50B, four suppression devices 100A-100D are suspended horizontally end-to-end out from the back side of faceplate 722.

A first end of a bus bar 742A is coupled to a first end of suppression device 100A and a middle portion of bus bar 742A extends parallel along the sides of the surge suppression devices 100A-100D. A second end of bus bar 742A is parallel to the first end and is connected to clip 734A. A first end of bus bar 742B is coupled between suppression device 100A and suppression device 100B, a middle portion of bus bar 742B extends parallel along the sides of surge suppression devices 100B-100D, and a second end of bus bar 742B is parallel to the first end and is connected to clip 734B.

A first end 743A of bus bar 742C is coupled between suppression device 100C and suppression device 100D, a middle portion 743B of bus bar 742C extends parallel to the side of suppression device 100D, and a second end 743C of bus bar 742C is parallel to the first end and is connected to clip 734C. FIG. 50B shows the first end 743A of bus bar 742C in more detail and the first ends of bus bars 742A, 742B, and 742D have a similar shape. A first end of bus bar 742D is coupled to a back end of suppression device 100D, a middle portion of bus bar 742D is perpendicular to the first end, and a second end of bus bar 742D is parallel to the first end and is connected to clip 734D.

A first end of ground bus bar 744 is coupled between suppression devices 100B and 100C, a middle section of ground bus bar 744 extends parallel to the sides of suppression devices 100A and 100B, and a second end of ground bus bar 744 is coupled to the back side of faceplate 722.

Spacers 740 are located between the suppression devices 100 and have a substantially square outside perimeter that inserts into one of slots 738 formed around inside walls of enclosure 730. In one embodiment, spacers 740 are made of plastic or some other non-conductive material and support the suppression devices 100A-100D within two halves 730A and 730B of enclosure 730. A raised ring 741 is formed on a front side of spacer 740 to receive one end of suppression device 100 and an impression is formed on a back end of spacer 740 to receive the first end 734 of bus bar 742.

Slots 748 are formed on opposite sides of spacers 740 to retain the bus bars 742 and/or 744. Clips 750 are formed on top ends of spacers 740 to retain monitor wires 749. Some of monitor wires 749 connect to the LEDs 728 on the front side of faceplate 722 and the monitor circuitry shown in FIG. 20. Other monitor wires 749 connect to monitor card 716 shown in FIG. 47 through monitor plug 736.

Referring specifically to FIG. 50B, suppression device 100C is seated in ring 741 on the front side of spacer 740C and the first end 743A of bus bar 742C is seated in the impression formed on the back side of spacer 740C. A connecting member 745 is inserted through the middle of spacer 740C and through a hole 747 in first end 743A. The two suppression devices 100D and 100C are all screwed onto opposite ends of connecting member 745 and press together spacer 740C and bus bar 742C. As a result, a back end of suppression device 100C, bus bar 742C, and a front end of suppression device 100D are all electrically coupled to each other.

Figure 51:
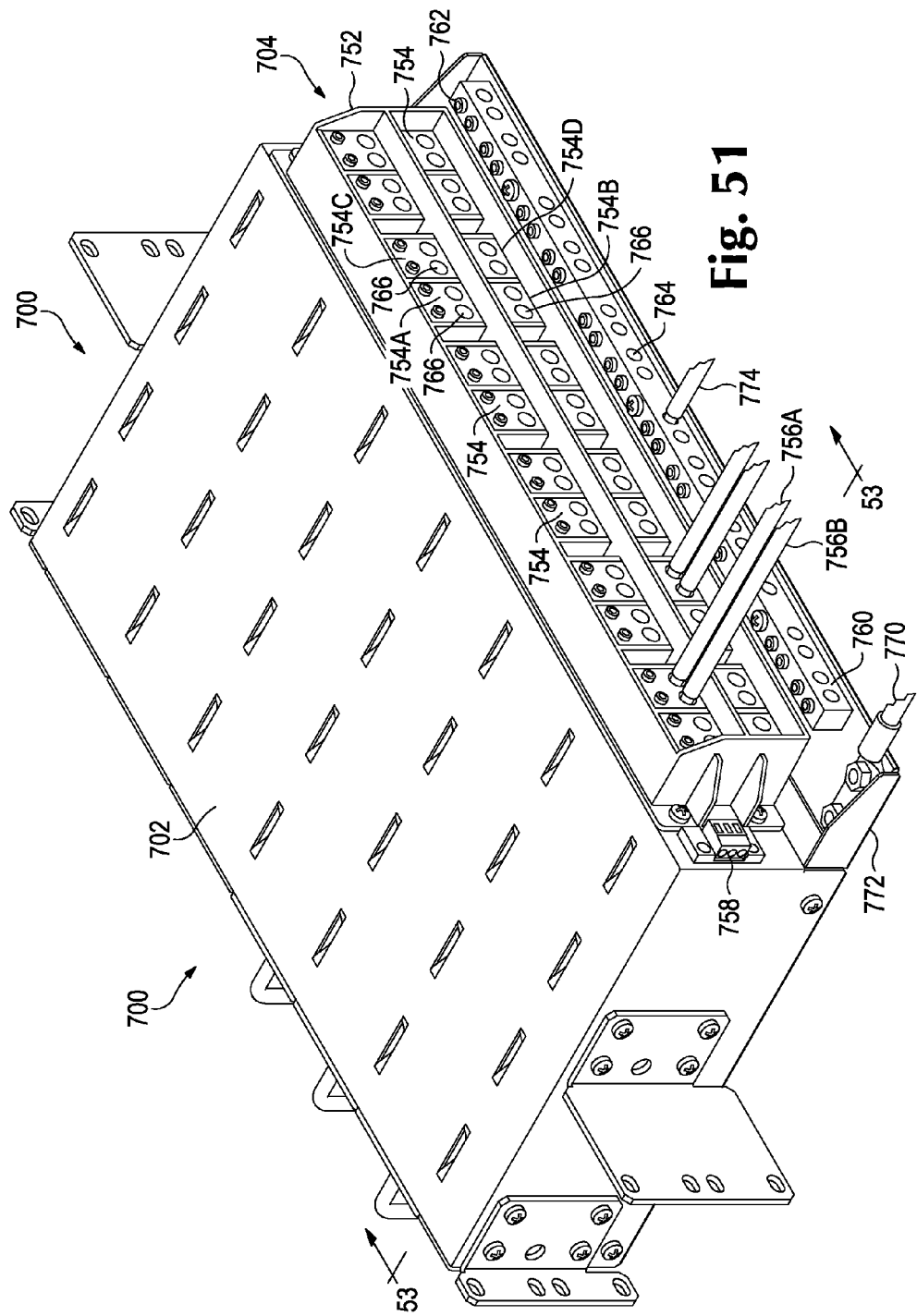
FIG. 51 is a rear perspective view of the surge suppression unit of FIG. 46.
Figure 52:
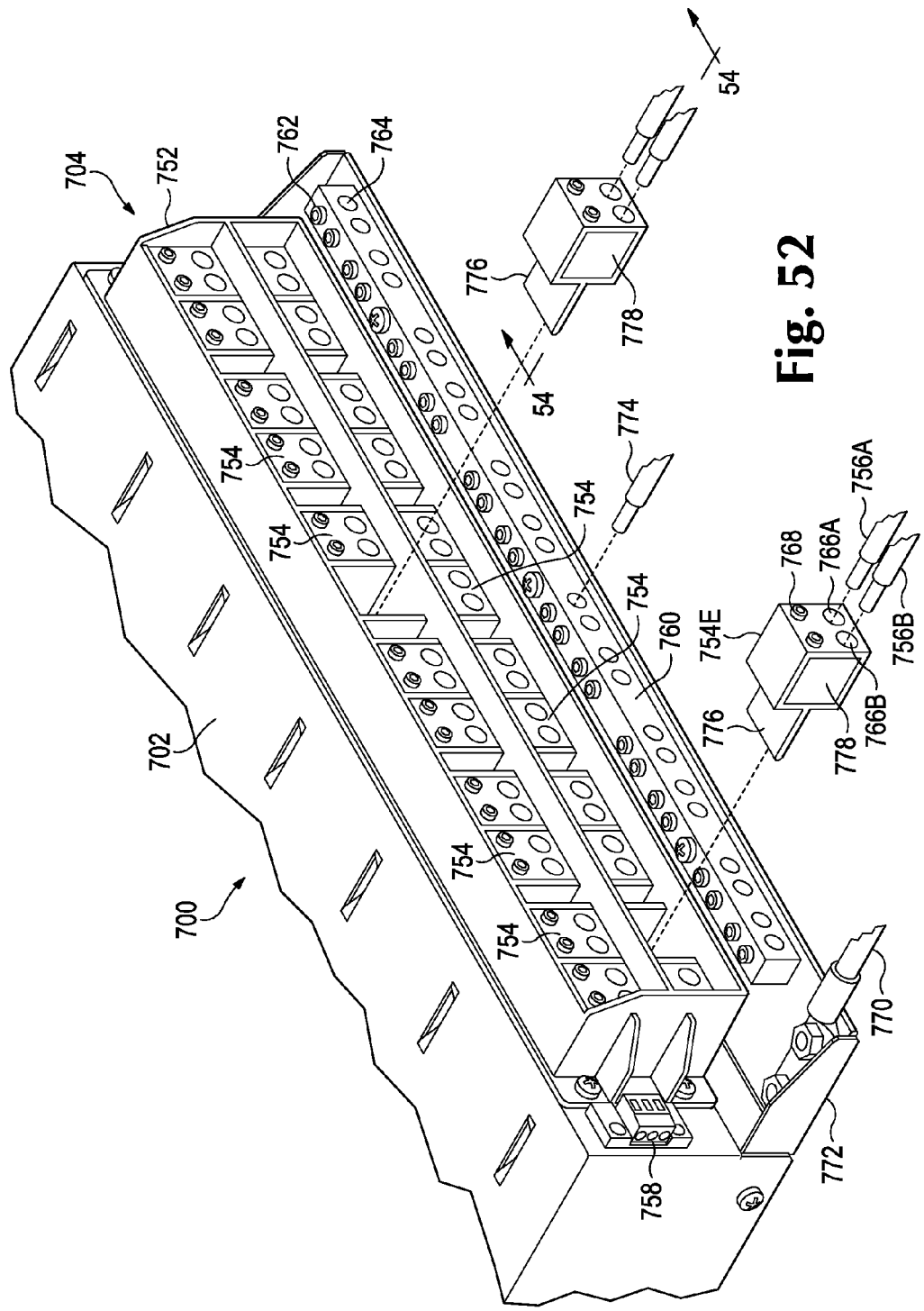
FIG. 52 shows a partially disassembled view of a connection panel.

FIGS. 51 and 52 are rear perspective views of surge suppression unit 700. Connection panel 704 includes a plastic housing 752 that attaches to a back end of chassis 702. A monitor plug 758 is also attached to the back end of chassis 702 for remotely connecting to the monitoring circuitry in monitor card 716 shown in FIG. 47.

Two rows of lugs 754 attach to housing 752. Each lug 754 includes a blade connector 776 integrally formed and extending from a front end of a lug body 778. Two holes 766 extend into a back end of lug body 778 and are configured to receive and electrically connect two power cables 756 with blade connector 776. For example, power cable 756A in FIG. 52 is inserted horizontally into hole 766A of lug 754E and power cable 756B is inserted horizontally into hole 766B of lug 754E. Two screws 768 in lug 754E are configured to secure cables 756A and 756B inside of holes 766A and 766B, respectively. The two power cables 756A and 756B are accordingly electrically connected to blade connector 776 via the conductive body 778 of lug 754E.

Each lug 754 is configured to receive a different power cable or power jumper cable. Each set of two upper and two immediately lower lugs 754 are configured to connect to suppression devices 100 in a same suppression module 706 and provide surge suppression for two different radios 18 in FIG. 1. For example, a first hole in lug 754A in FIG. 51 may connect to a first power cable connected to a first radio. A second hole in lug 754A may connect a jumper power cable 756 connected to DC power supply 28 in FIG. 1. A first hole in lug 754B in FIG. 51 may connect to a first return power cable connected to the first radio and a second hole in lug 754B may connect a first jumper return power cable connected to DC power supply 28.

A first hole in lug 754C in FIG. 51 may connect to a second power cable connected to a second radio. A second hole in lug 754C may connect a second jumper power cable 756 connected to DC power supply 28 in FIG. 1. A first hole in lug 754D in FIG. 51 may connect to a second return power cable connected to the second radio and a second hole in lug 754D may connect a second jumper return power cable that connects to DC power supply 28.

A tray 772 holds a ground strip 760. A ground shield conductor or ground wire 774 in the cables 756 are inserted into the holes 764 in ground strip 760 and held in place by screws 762. All of the conductors or wires 774 are grounded through ground strip 760 and conductive tray 772 to a system ground cable 770.

FIG. 53 shows a side sectional partial cut-away view of surge suppression unit 700. Suppression module 706 is shown fully inserted into chassis 702. Lugs 754 are connected to housing 752 by screws 780. Clips 734 are spread apart by blade connectors 776 as suppression module 706 inserts into chassis 702. In the fully inserted position, clips 734 press against opposite upper and lower sides of blade connectors 776 electrically coupling suppression devices 100 in suppression module 706 with power cables 756 connected to lugs 754. In the fully inserted position, monitor plug 736 in FIG. 49 inserts into monitor receptacle 714 connecting some of monitoring wires 749 in suppression module 706 with monitor card 716 in FIG. 47.

FIGS. 54A and 54B show side sectional views for one of lugs 754. A clamping cam 782 is located within lug body 778 and is shown in a raised position in FIG. 54A. Power cable 756 is inserted into hole 766 below clamping cam 782. In FIG. 54B, screw 768 is screwed further into a threaded hole 784. A front end of screw 768 rotates clamping cam 782 in a counter clockwise downward direction causing a bottom end of clamping cam 782 to press power cable 756 down against a bottom wall of hole 766. Accordingly, power cable 756 is securely fastened against lug body 778 and a secure electrical connection is established between power cable 756 and blade connector 776. The horizontal alignment of hole 766, power cable 756, and screw 768 allow multiple power cables 756 to be independently inserted and clamped down into lugs 754 within a relatively small vertical surface area.

Several preferred examples have been described above with reference to the accompanying drawings and pictures. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A connection lug, comprising:
an electrically conductive body;
an electrically conductive blade connector extending from a first end of the body;
a cable hole located in a second end of the body, wherein the cable hole is configured to receive a cable; and
a clamping cam configured to rotate inside of the body and clamp against the cable;
a screw hole configured to receive a clamping screw, wherein a portion of the clamping cam is configured to extend into the screw hole and a longitudinal end of the clamping screw is configured to push against a top portion of the clamping cam in a first direction and rotate a bottom portion of the clamping cam into the cable hole in a second direction opposite the first direction and wherein the clamping screw is configured to rotate about a first axis and the clamping cam is configured to rotate about a second axis perpendicular to the first axis.

2. The connection lug of claim 1, wherein the body is configured to attach to a housing of a connection panel and the blade connector is configured to slidingly insert into a conductive clip coupled to a surge suppression device.

3. The connection lug of claim 1, wherein the body is substantially square and the blade connector is a substantially flat elongated conductive bus bar extending longitudinally out and across the first end of the body in a direction parallel with a longitudinal axis of the cable hole.

4. The connection lug according to claim 1, wherein the blade connector extends longitudinally out from a front end of the electrically conductive body and extends laterally in-between opposite lateral sides of the body.

5. The connection lug according to claim 1, further comprising a chamber configured to retain the clamping cam, wherein the clamping cam is configured to rotate downward from the chamber into the cable hole.

6. The connection lug according to claim 1, wherein the cable hole extends horizontally inside the body and is configured to longitudinally receive the cable.

7. The connection lug of claim 1, further comprising a chamber located above the cable hole configured to rotatably retain the clamping cam.

8. The connection lug of claim 1, wherein:
a connection panel is configured to attach to a rack mountable surge suppression unit retaining a surge suppression device;
a connector is coupled to the surge suppression device in the connection panel; and
the connection lug is configured to attach to the connection panel and the blade connector is configured to insert into a back end of the connection panel and attach in-line with the connector.

9. The connection lug of claim 8, wherein the connection panel is configured to retain multiple connection lugs in a first row and a second row and the multiple connection lugs vertically aligned with each other in the first row and the second row are configured to connect to a same surge suppression unit.

10. The connection lug of claim 1, wherein:
a chassis has a first end and a second end and is configured to retain surge suppression devices;
a connection panel is attached to the first end of the chassis and is configured to connect to power cables; and
the connection lug is connected to the connection panel and the cable hole extends into a first side configured to longitudinally receive the cable and the electrically conductive blade connector extends out from a second side and is configured to attach to the surge suppression devices retained in the chassis.

11. The connection lug of claim 10, wherein the chassis retains clips coupled to the surge suppression devices and the electrically conductive blade connector for the connection lug comprises a bus bar configured to insert into one of the clips.

12. A connection lug, comprising:
an electrically conductive body;
an electrically conductive blade connector extending from a first end of the body;
a cable hole located in a second end of the body, wherein the cable hole is configured to receive a cable;
a clamping cam configured to rotate inside of the body and clamp against the cable; and
a screw hole configured to receive a clamping screw, wherein a portion of the clamping cam is configured to extend into the screw hole and insertion of the clamping screw into the screw hole is configured to push against the portion of the clamping cam and rotate the clamping cam into the cable hole, and wherein the screw hole is further configured to:
extend from the first end of the body to the second end of the body; and
receive an attachment screw in the first end of the body for attaching the body to a connection panel.

13. A connection lug, comprising:
an electrically conductive body;
an electrically conductive blade connector extending from a first end of the body;
a cable hole located in a second end of the body, wherein the cable hole is configured to receive a cable;
a clamping cam configured to rotate inside of the body and clamp against the cable;
an additional cable hole located adjacent to the cable hole and configured to receive an additional cable; and
an additional clamping cam configured to rotate inside of the body and electrically clamp the additional cable against the body.

14. The connection lug of claim 13, further comprising:
a first screw hole, wherein a portion of the clamping cam is configured to extend into the first screw hole and insertion of a first screw into the first screw hole is configured to push against the portion of the clamping cam and rotate the clamping cam into the cable hole; and a second screw hole, wherein a portion of the additional clamping cam is configured to extend into the second screw hole and insertion of a second screw into the second screw hole is configured to push against the portion of the additional clamping cam and rotate the additional clamping cam into the additional cable hole.

15. The connection lug of claim 14, wherein:

the cable comprises a power cable coupled at a first end through a first surge suppression device to radio circuitry and coupled at a second end to a second surge suppression device; and the additional cable comprises a jumper power cable coupled at a first end to the second surge suppression device and coupled at a second end to a power supply.

* * * * *